(12) United States Patent
Gramm et al.

(10) Patent No.: US 10,874,052 B2
(45) Date of Patent: Dec. 29, 2020

(54) DIFFERENTIAL SPEED STALK ROLLS

(71) Applicant: Kingdom Ag Concepts, Inc., Bremen, IN (US)

(72) Inventors: Rich Gramm, Bremen, IN (US); Corbin Fehr, Morris, MN (US); Austin Bitting, Etna Green, IN (US); Robert Schlipf, Nappanee, IN (US)

(73) Assignee: Kingdom Ag Concepts, Inc., Bremen, IN (US)

( * ) Notice: Subject to any disclaimer, the term of this patent is extended or adjusted under 35 U.S.C. 154(b) by 0 days.

(21) Appl. No.: 16/279,982

(22) Filed: Feb. 19, 2019

(65) Prior Publication Data

US 2019/0174675 A1    Jun. 13, 2019

Related U.S. Application Data

(63) Continuation of application No. PCT/US2017/047863, filed on Aug. 21, 2017.

(60) Provisional application No. 62/447,418, filed on Jan. 17, 2017, provisional application No. 62/377,259, filed on Aug. 19, 2016.

(51) Int. Cl.
   *A01D 45/02* (2006.01)
   *A01D 47/00* (2006.01)

(52) U.S. Cl.
   CPC .......... *A01D 45/025* (2013.01); *A01D 45/028* (2013.01); *A01D 47/00* (2013.01)

(58) Field of Classification Search
   CPC .... A01D 45/025; A01D 47/00; A01D 45/028; A01D 45/021
   See application file for complete search history.

(56) References Cited

U.S. PATENT DOCUMENTS

| 2,103,002 | A | | 12/1937 | Rudolph | |
|---|---|---|---|---|---|
| 3,304,702 | A | | 2/1967 | Russell | |
| 3,462,928 | A | * | 8/1969 | Schreiner | A01D 45/025 56/104 |
| 4,974,402 | A | * | 12/1990 | Ostrup | A01D 45/025 56/102 |

(Continued)

FOREIGN PATENT DOCUMENTS

| CN | 105265095 A | 1/2016 |
|---|---|---|
| CN | 205142891 U | 4/2016 |

(Continued)

OTHER PUBLICATIONS

"Extended European Search Report", Application No. 17842272.1, dated Feb. 27, 2020; 8 pages.

(Continued)

*Primary Examiner* — Arpad Fabian-Kovacs

(74) *Attorney, Agent, or Firm* — Thomas J. Oppold; Larkin Hoffman Daly & Lindgren, Ltd.

(57) ABSTRACT

Differential speed stalk rolls mountable to a row unit of a row crop head. A first stalk roll body has an outer peripheral speed less than the outer peripheral speed of a second stalk roll body in lateral spaced relation. At least one of the first and second bodies includes a knife defining a knife plane normal to the axis of rotation of the first or second stalk roll. The stalk roll bodies may have modular and interchangeable body segments of different configurations.

24 Claims, 44 Drawing Sheets

(56) References Cited

U.S. PATENT DOCUMENTS

| | | | | |
|---|---|---|---|---|
| 5,009,061 A | * | 4/1991 | Heuling | A01D 45/025 56/104 |
| 5,212,935 A | * | 5/1993 | Sanders | A01D 45/021 56/103 |
| 5,404,699 A | * | 4/1995 | Christensen | A01D 45/025 460/31 |
| 5,787,696 A | * | 8/1998 | Wiegert | A01D 45/021 241/260.1 |
| 7,788,890 B2 | * | 9/2010 | Cressoni | A01D 45/025 56/103 |
| 7,886,510 B2 | * | 2/2011 | Calmer | A01D 45/025 56/103 |
| 7,930,870 B2 | * | 4/2011 | Rottinghaus | A01D 45/021 56/104 |
| 9,408,348 B2 | * | 8/2016 | Walker | A01D 45/028 |
| 9,560,804 B1 | * | 2/2017 | Calmer | A01D 45/025 |
| 2004/0123577 A1 | * | 7/2004 | Resing | A01D 45/025 56/104 |
| 2014/0182255 A1 | * | 7/2014 | Calmer | A01D 45/025 56/104 |
| 2014/0260164 A1 | * | 9/2014 | Lohrentz | A01D 45/025 56/104 |
| 2016/0338268 A1 | * | 11/2016 | Calmer | A01D 45/025 |
| 2017/0172067 A1 | * | 6/2017 | Calmer | A01D 45/025 |
| 2017/0311542 A1 | * | 11/2017 | Ehle | A01D 45/025 |

FOREIGN PATENT DOCUMENTS

| | | | | |
|---|---|---|---|---|
| CN | 205648431 U | * | 10/2016 | A01D 45/02 |
| DE | 19855526 A1 | | 6/2000 | |
| EP | 0378779 A1 | | 7/1990 | |
| WO | WO-0030427 A1 | * | 6/2000 | A01D 45/025 |
| WO | 2007051834 A1 | | 5/2007 | |

OTHER PUBLICATIONS

"International Search Report and Written Opinion", Application No. PCT/US2017/047863, dated Jan. 17, 2018, 24 pages.

* cited by examiner

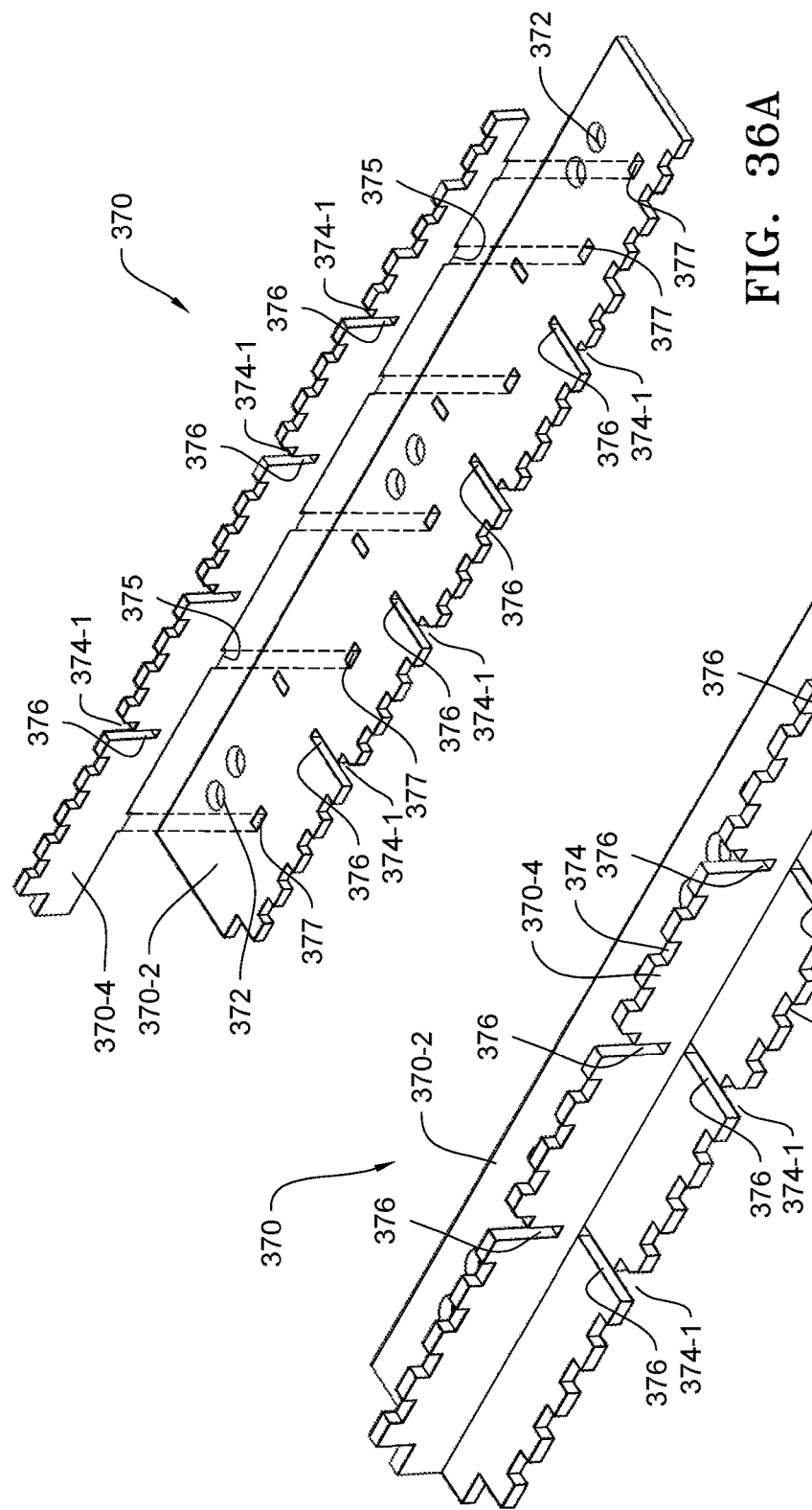
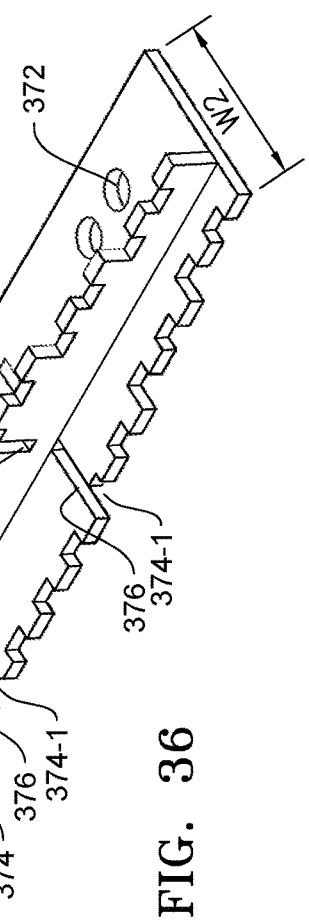
FIG. 36
FIG. 36A

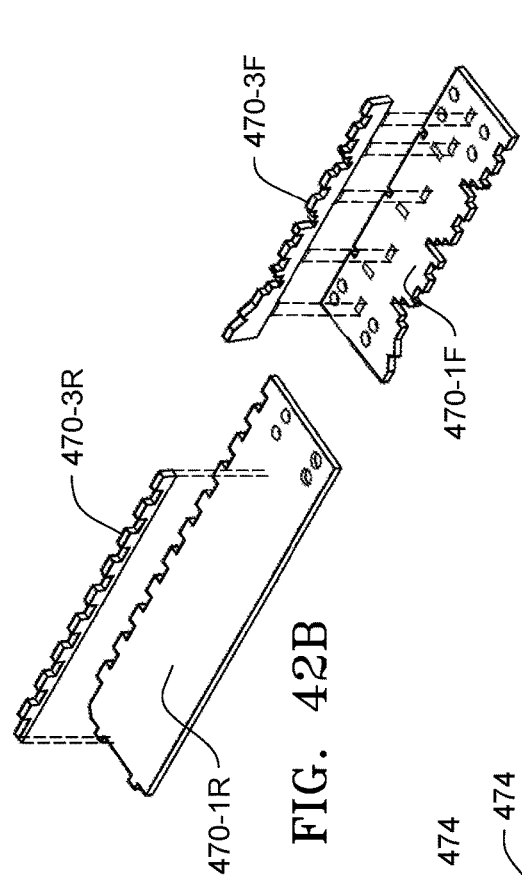
FIG. 42B
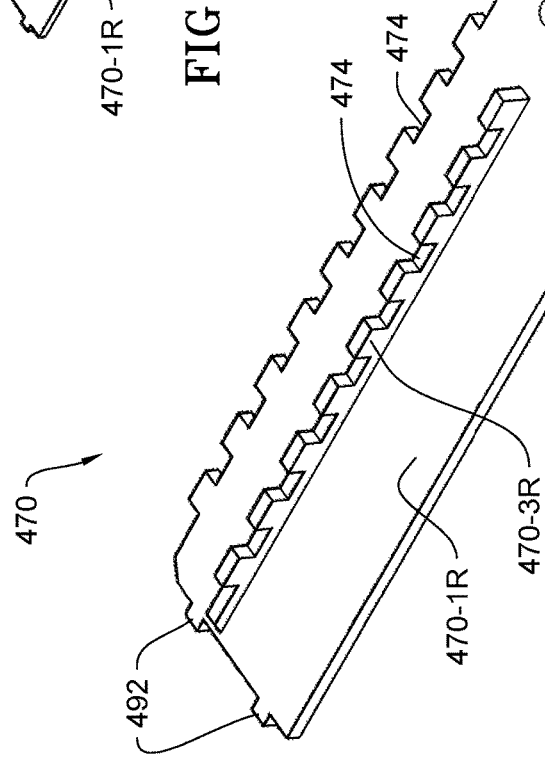
FIG. 42A
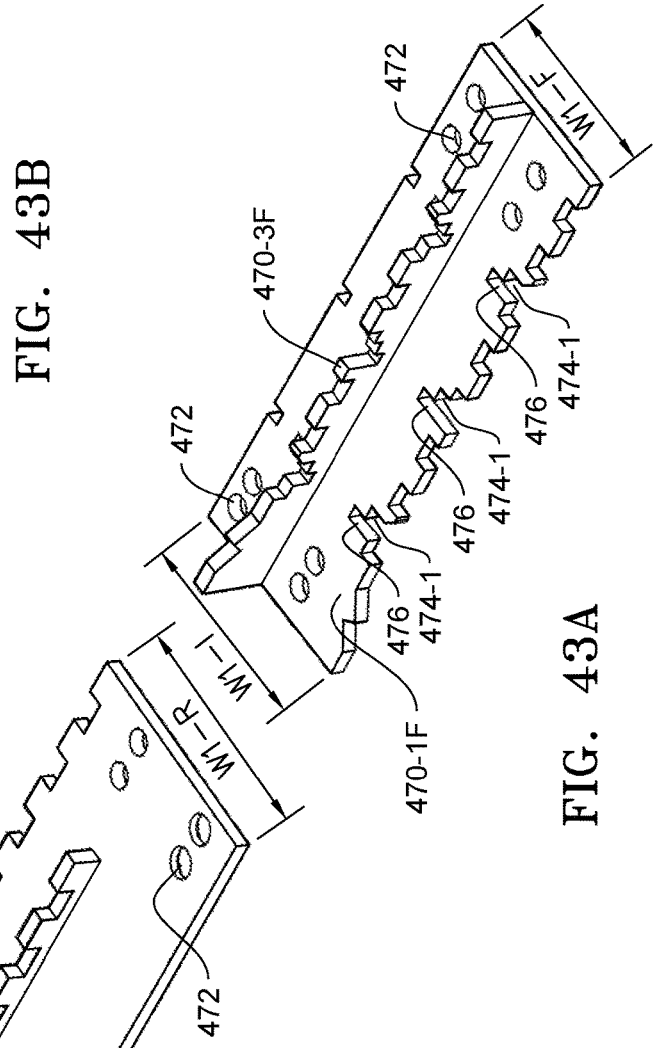
FIG. 43B
FIG. 43A

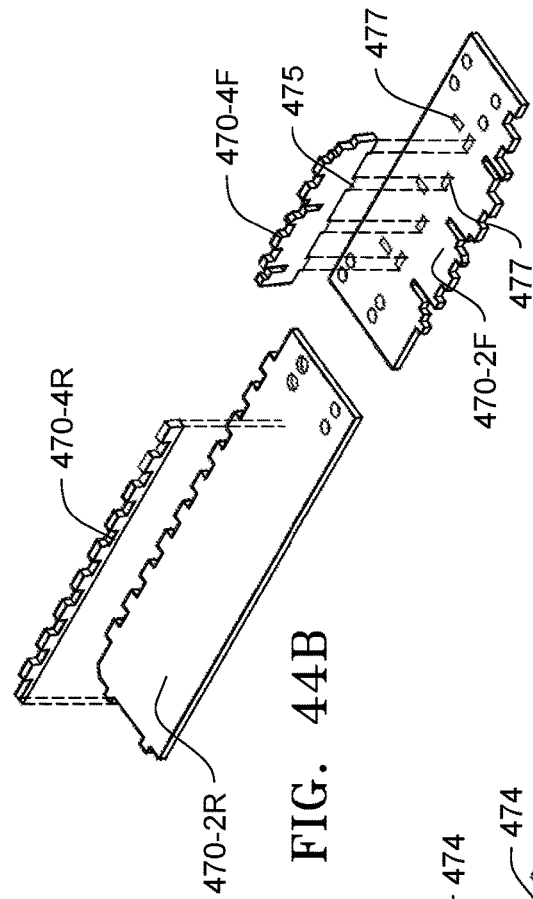
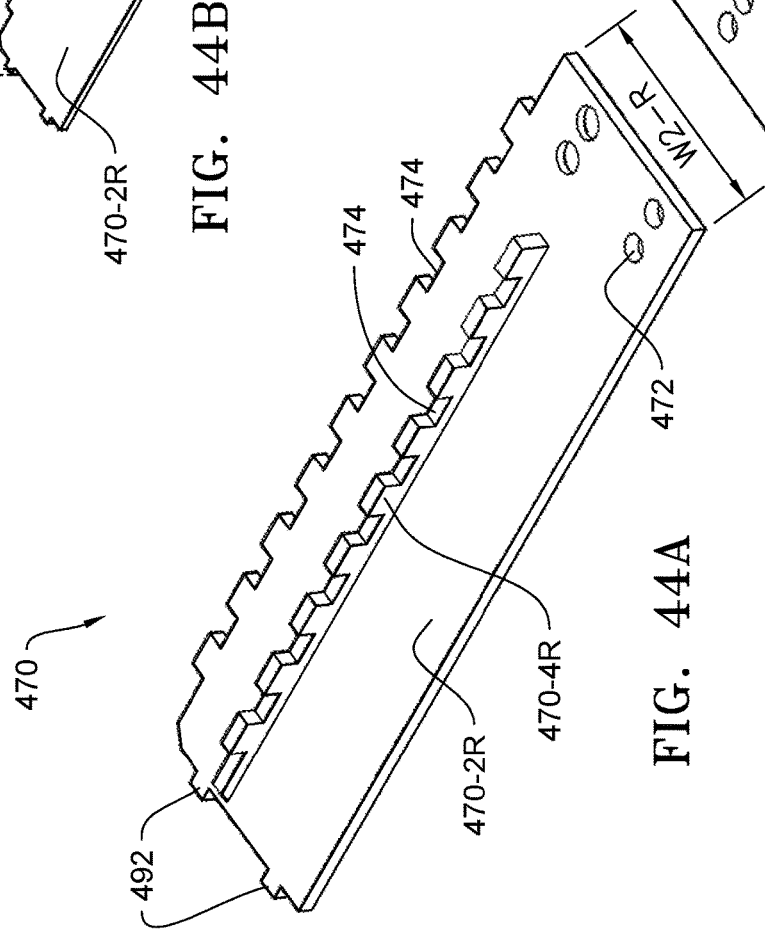
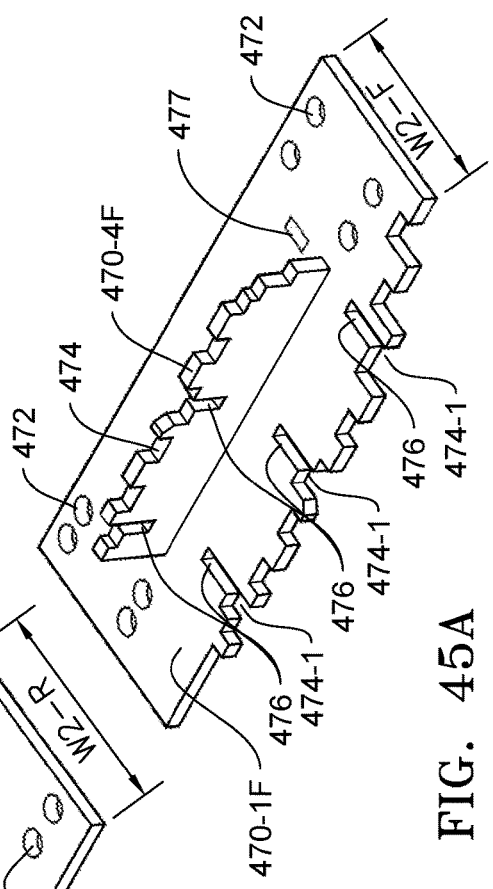
FIG. 44B
FIG. 45B
FIG. 44A
FIG. 45A

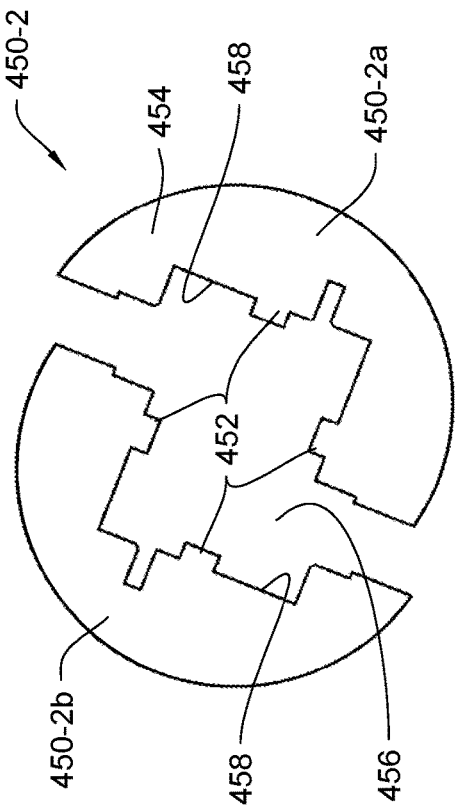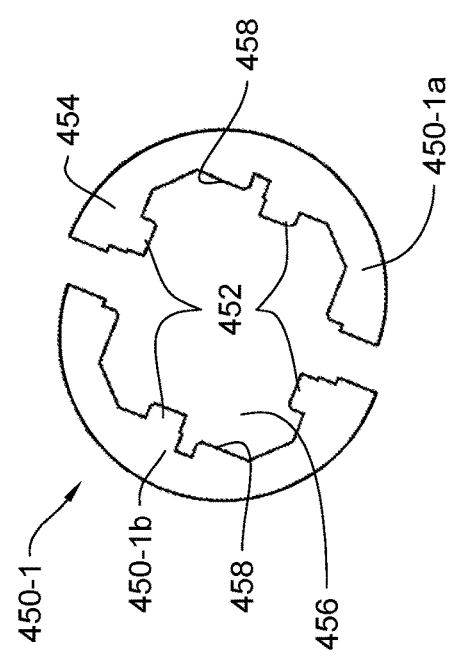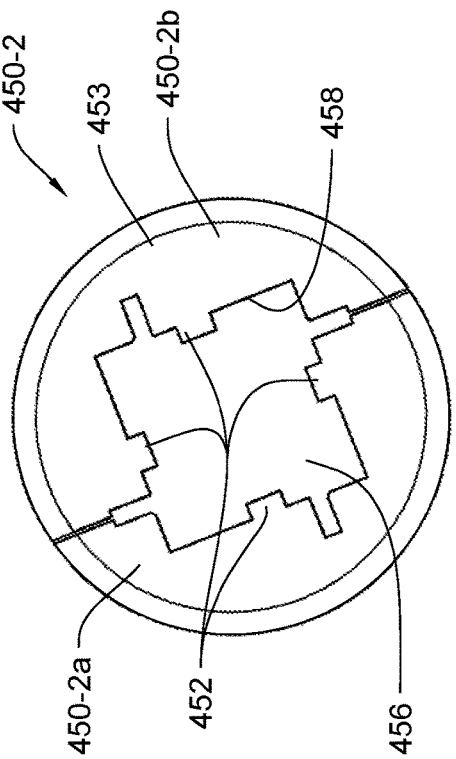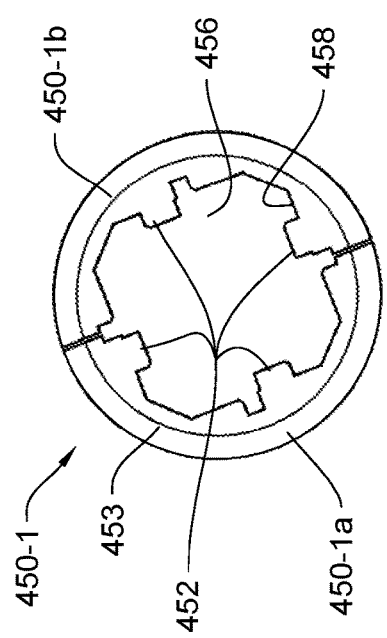

DIFFERENTIAL SPEED STALK ROLLS

CROSS-REFERENCE TO RELATED APPLICATIONS

This application is a Continuation of International Patent Application No. PCT/US2017/047863, filed Aug. 21, 2017, which claims the benefit of U.S. Provisional Application No. 62/377,259, filed Aug. 19, 2016 and U.S. Provisional Application No. 62/447,418, filed Jan. 17, 2017, all of which are incorporated herein in their entireties.

BACKGROUND

Modern conventional agricultural combine harvesters or "combines" utilize removable and interchangeable attachments called "headers" or "heads" which are adapted for harvesting different types of crops. An example of a conventional combine 10 is shown in FIGS. 1-3 having a conventional head 20 attached for harvesting row crops, such as corn. For convenience, and by way of example, when referring to row crop heads for harvesting corn, the row crop head 20 may be referred to as a "corn head". Row crop heads 20 include a plurality of conical shaped crop dividers 22 which extend forwardly and diverge rearwardly. Row unit assemblies 30 are disposed between the adjacent dividers where the rearwardly diverging dividers 22 nearly converge. In FIG. 1, the row crop head or corn head 20 is illustrated with twelve row unit assemblies 30 (e.g., a 12-row corn head) but it should be understood that row crop heads such as corn heads typically range from four rows to twenty-four rows or more.

As illustrated in FIG. 3, during corn harvesting operations, the corn head 20 is positioned with the dividers 22 between adjacent corn rows 12 and below the ears of corn 14 on the cornstalks 16. It should be appreciated that as the combine 10 drives forwardly through the field as indicated by the arrow 18 in FIG. 2, the conical, rearwardly diverging shape of the dividers 22 causes the cornstalks 16 within each row 12 to be guided and directed into the row unit assemblies 30 between the adjacent dividers 22. As explained in more detail below, the row unit assemblies 30 separate the corn ears 14 from the cornstalks 16 and convey the separated ears toward the trough 23 and cross-auger 24. The cross-auger 24 augers the separated ears 14 within the trough 23 toward the opening 27 of the feederhouse 26 in the middle of the corn header 20. The feederhouse 26 conveys the ears 14 into the interior of the combine where the corn kernels are separated from the corncob and husks and remaining portions of the cornstalks. Within the combine, the separated kernels pass over a series of screens which separate unwanted crop material and other residue from the kernels. The clean grain is then carried by elevators to a clean grain holding tank while the corncobs, husks and cornstalks which entered the combine are chopped and discharged through the rear of the combine onto the ground.

While there may be differences between the row unit assemblies 30 of different makes and models of corn heads produced by original equipment manufacturers (OEMs), each row unit assembly 30 has similar components and similar operation. Referring to FIGS. 4 and 5, each row unit 30 typically includes a pair of gathering chains 32, 34 with outwardly extending lugs 36. The gathering chains 32, 34 are continuous loops that extend around drive sprockets 38 and idler sprockets 39 (FIG. 5). Rotation of the drive sprockets 38 causes the gathering chains 32, 34 to rotate in adjacent parallel paths such that as the combine 10 drives forwardly through the field, the outwardly extending lugs 36 draw the cornstalks 16 into the row unit 30. Below the rotating gathering chains is a pair of spaced stripper plates 40, 42. The stripper plates 40, 42 are spaced sufficiently apart to define a slot 44 between them defining a longitudinal path of travel along which corn stalks pass as the row unit moves forwardly through the corn field harvesting corn. The slot 44 is sufficiently wide to permit the corn stalks 16 to enter but which is sufficiently narrow so that the corn ears 14 cannot pass through. A pair of rapidly rotating stalk rolls 50, 52 are positioned below stripper plates 40, 42.

As best illustrated in FIG. 6, during harvesting operations, the rotating stalk rolls 50, 52 rapidly pull the corn stalks 16 downwardly through the slot 44 between the stripper plates 40, 42 such that when the corn ears 14 engage the stripper plates 40, 42, the ears 14 are pulled or stripped from the cornstalks 16. As the stalk rolls 50, 52 rotate, the cornstalk 16 is pulled downwardly through the slot 44 and is returned to the field below the header 20 as the combine drives forwardly (FIG. 2). The stripped ears 14 which remain on the stripper plates 40, 42 after the cornstalk 16 is pulled through the slot 44 are then conveyed by the lugs 36 of the gathering chains 32, 34 upwardly and rearwardly to the trough 23 and cross-auger 24. The cross-auger 24 augers the ears 14 within the trough to the feederhouse 26, and the feederhouse 26 feeds the ears 14 into the interior of the combine for shelling and separating the kernels from the corncob as referenced above and as is known in the art.

The art is replete with various configurations of aftermarket and OEM stalk rolls. While the various configurations may serve their intended purpose of harvesting corn, many stalk rolls do not adequately chop and crush the cornstalks, resulting in long sections of cornstalks substantially intact. These long sections of intact cornstalks become very hard and brittle and will not sufficiently breakdown and decompose before the next planting season, thereby limiting their potential benefit to providing soil nutrients for the next year's crop. Tillage operations in the fall and spring before the next season's planting operations may break up the long cornstalks sections into smaller sections, but tillage operations alone are often insufficient to break up the cornstalks into sufficiently small sections to avoid interfering with the next season's planting operations. For example, if the cornstalk sections are too long, they can interfere with planting operations by preventing row cleaners from moving the long cornstalk sections out of the way of the furrow openers of the planter during the next season's planting operations. This can result in excess cornstalk debris remaining in the furrow, which can affect seed planting depth and seed germination.

To overcome the problems associated with long sections of cornstalks remaining in the field, many farmers will go over the field with stalk choppers or flail mowers after harvesting and prior to tilling. However, this requires a separate pass over the field with another implement resulting in additional time and expense of fuel, not to mention the cost of the stalk chopper implement. An additional drawback associated with stalk choppers is that it leaves behind short stalk stubble which can increase tire wear or puncture tires, further increasing costs. Yet another drawback associated with the use of stalk choppers is that the plant material is chopped so fine that it will blow away in the wind or blow into piles which will leave some areas of the soil bare and subject to erosion while other areas of the soil are covered with a thick pile or mat of plant debris which may prevent uniform drying and warming of the soil in the spring, delaying or hindering the planting of the next season's crops or resulting in non-uniform germination of the seed.

To overcome the disadvantages associated with utilizing a separate stalk chopping implement, many corn heads are fitted with stalk choppers below and rearward of the stalk rolls which chop the stalk as the crop is being harvested. While corn heads equipped with stalk choppers overcome some of the disadvantages associated with using separate stalk chopper implements or flail mowers, heads equipped with stalk choppers require increased horsepower and thus more fuel consumption and increased fuel costs. In addition to increased costs, heads equipped with stalk choppers can result in the same disadvantages identified above when the stalks are chopped too finely and producing sharp stalk stubble that can increase tire wear or puncture tires. Additionally, many head mounted stalk choppers produce a buildup of crop debris to one side or the other leaving some areas of the soil bare and while other areas have excess crop debris producing a mat of debris that can trap moisture and suffocate the soil.

Accordingly, there is a need for a stalk roll that will cut or chop the stalks into sufficiently short sections and which crushes or partially shreds the cornstalk so the stalk sections are opened up permitting the stalks to break down and decompose quickly, but that does not chop or shred the stalks so finely as to encourage wind erosion of the formation of detrimental mats of plant material debris. There is also a need for a stalk roll that achieves the advantages of a head mounted stalk chopper by avoiding the need for a separate pass of a stalk chopping implement, but which does not result in short, sharp stubble that can increase tire wear or puncture tires.

BRIEF DESCRIPTION OF THE DRAWINGS

FIG. 36 is a perspective view of an embodiment the body segments of the larger diameter stalk roll with intermediate plates attached thereto.

FIG. 36A is an exploded perspective view of the body segment plate of FIG. 36.

FIGS. 42A and 43A are perspective views of an embodiment the body segments of the smaller diameter stalk roll with intermediate plates attached thereto FIGS. 42B and 43B are exploded perspective views of the body segment plates of FIGS. 42A and 43A, respectively.

FIGS. 44A and 45A are perspective views of an embodiment the body segments of the smaller diameter stalk roll with intermediate plates attached thereto FIGS. 44B and 45B are exploded perspective views of the body segment plates of FIGS. 44A and 45A, respectively.

FIG. 46A is a front elevation view of an embodiment of the knife blade of the smaller diameter stalk roll of FIG. 39 showing the knife blade segments together.

FIG. 46B is a rear elevation view of the knife blade segments of FIG. 46A shown separated.

FIG. 47A is a front elevation view of an embodiment of the knife blade of the larger diameter stalk roll of FIG. 31 showing the knife blade segments together.

FIG. 47B is a rear elevation view of the knife blade segments of FIG. 47A shown separated.

DESCRIPTION

Figure 1:
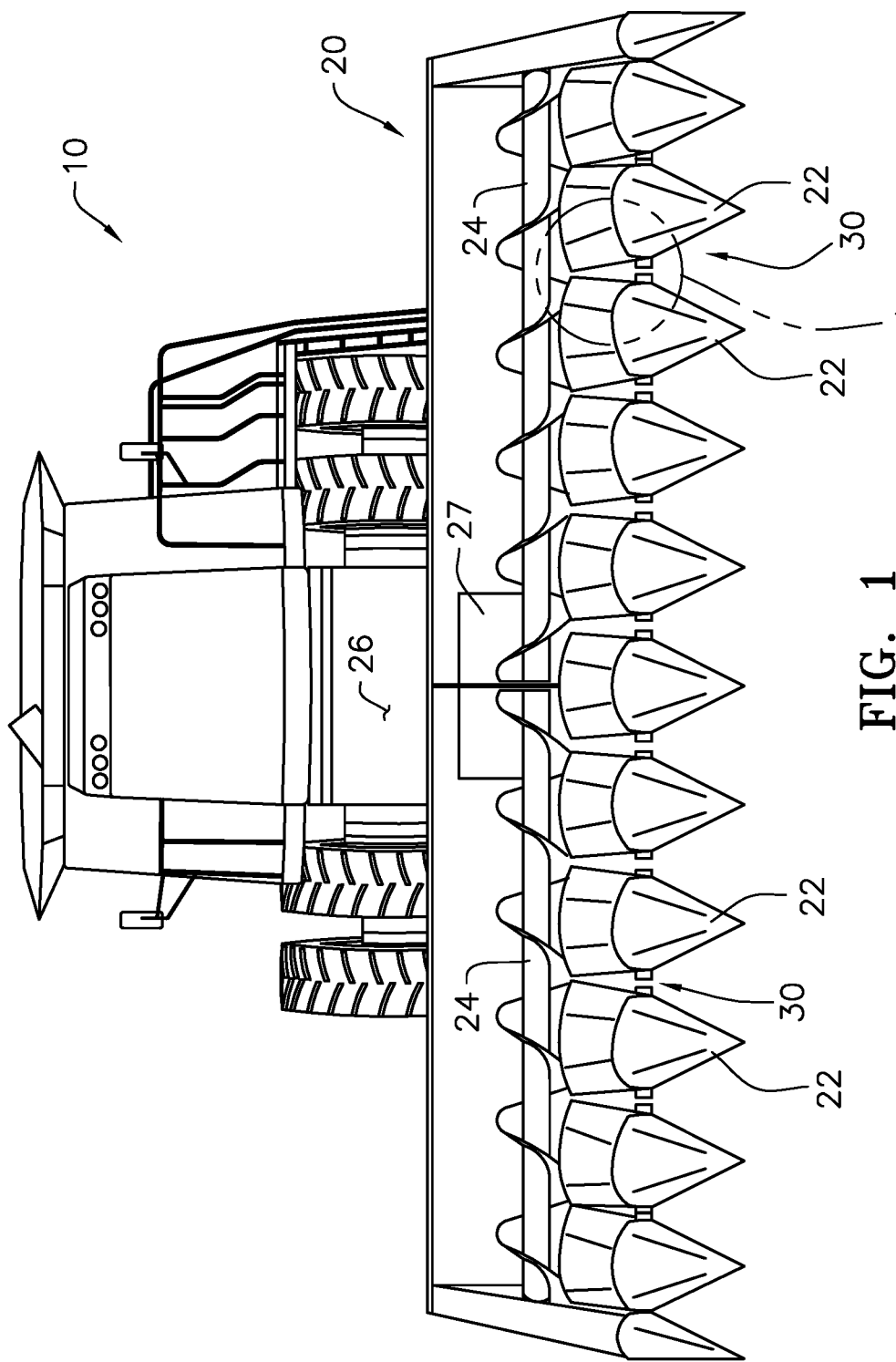
FIG. 1 is a front elevation view of an embodiment of a modern conventional agricultural combine harvester with a corn head attachment.
Figure 2:
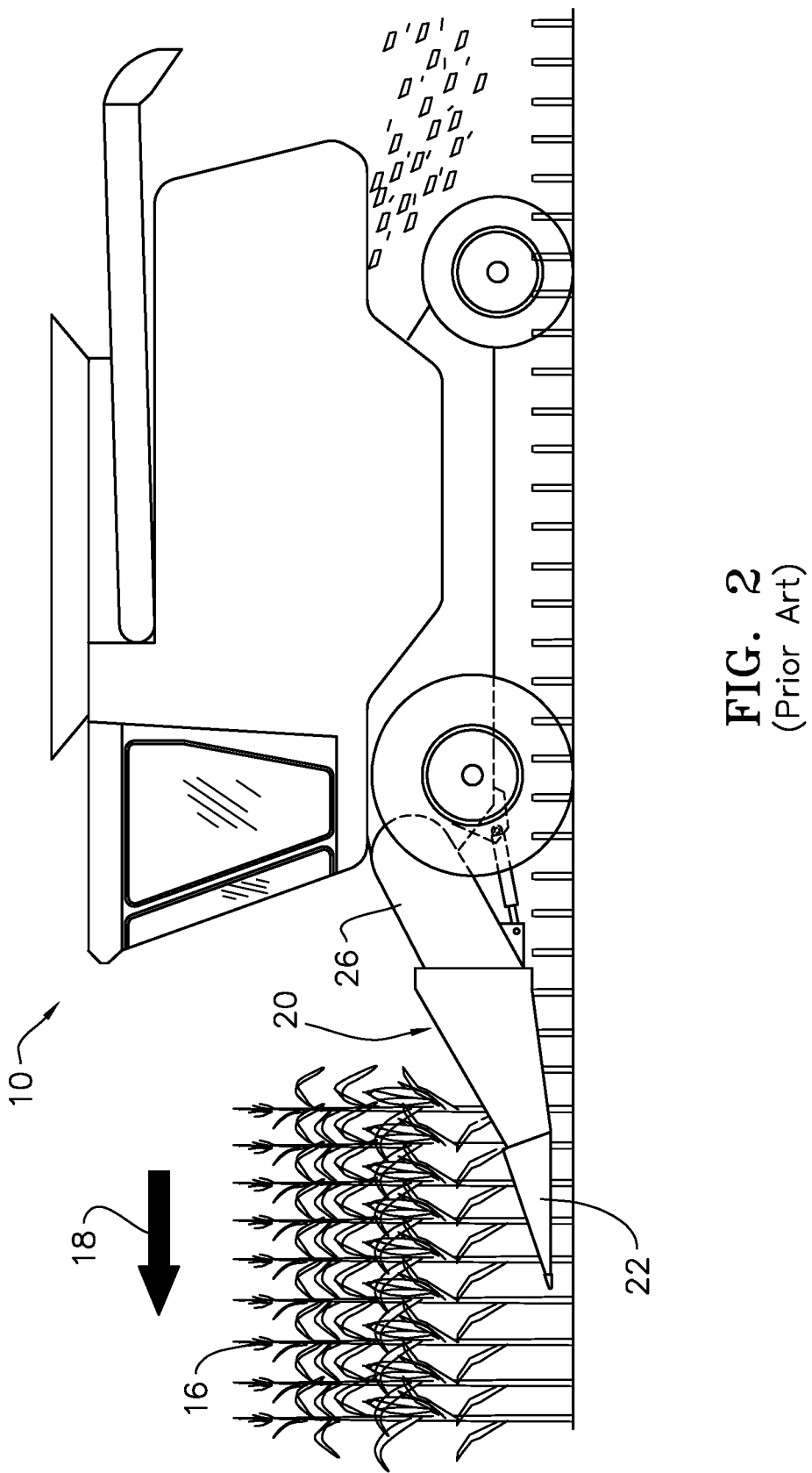
FIG. 2 is a side elevation view of the combine harvester and corn head of FIG. 1.
Figure 3:
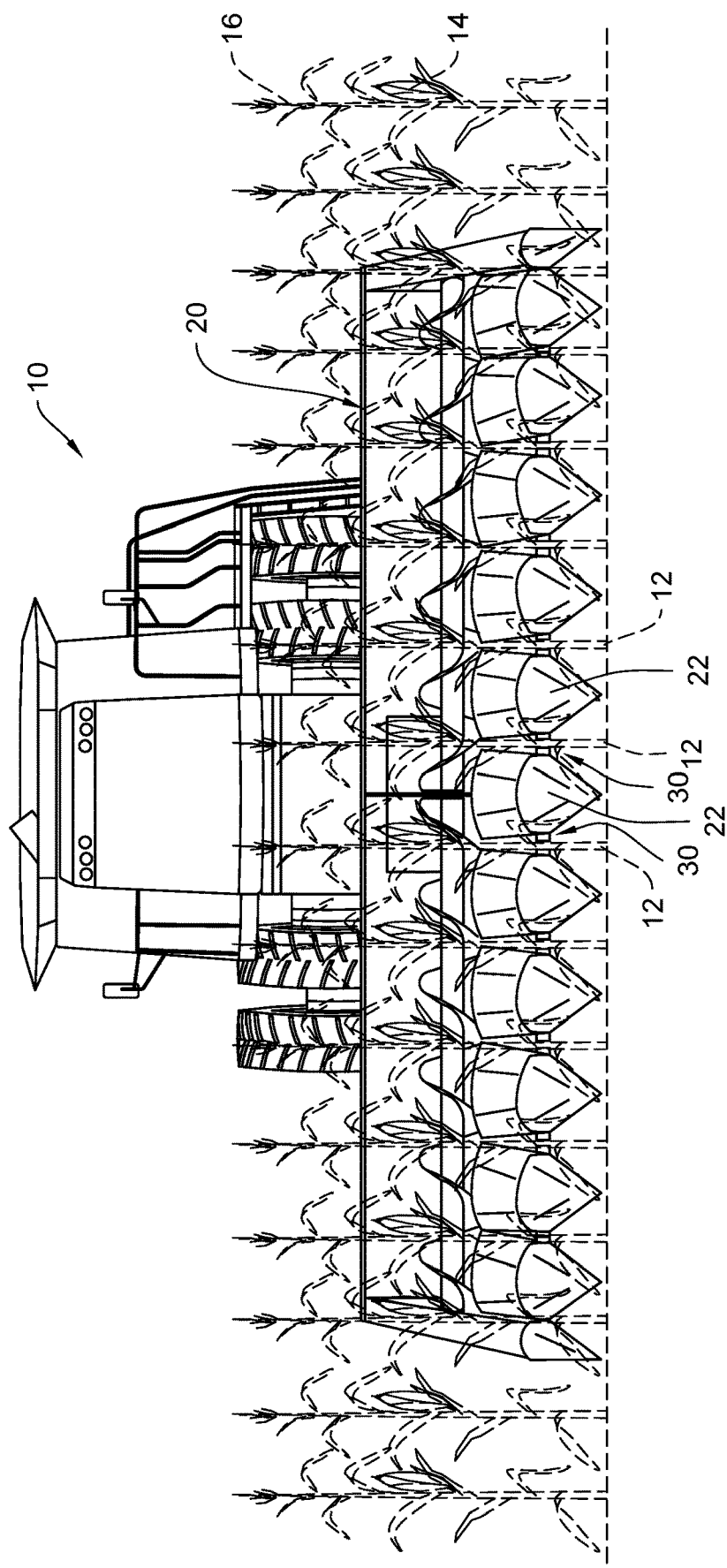
FIG. 3 is the same front elevation view of the combine harvester and corn head of FIG. 1, but shown in a cornfield in harvesting position.
Figure 4:
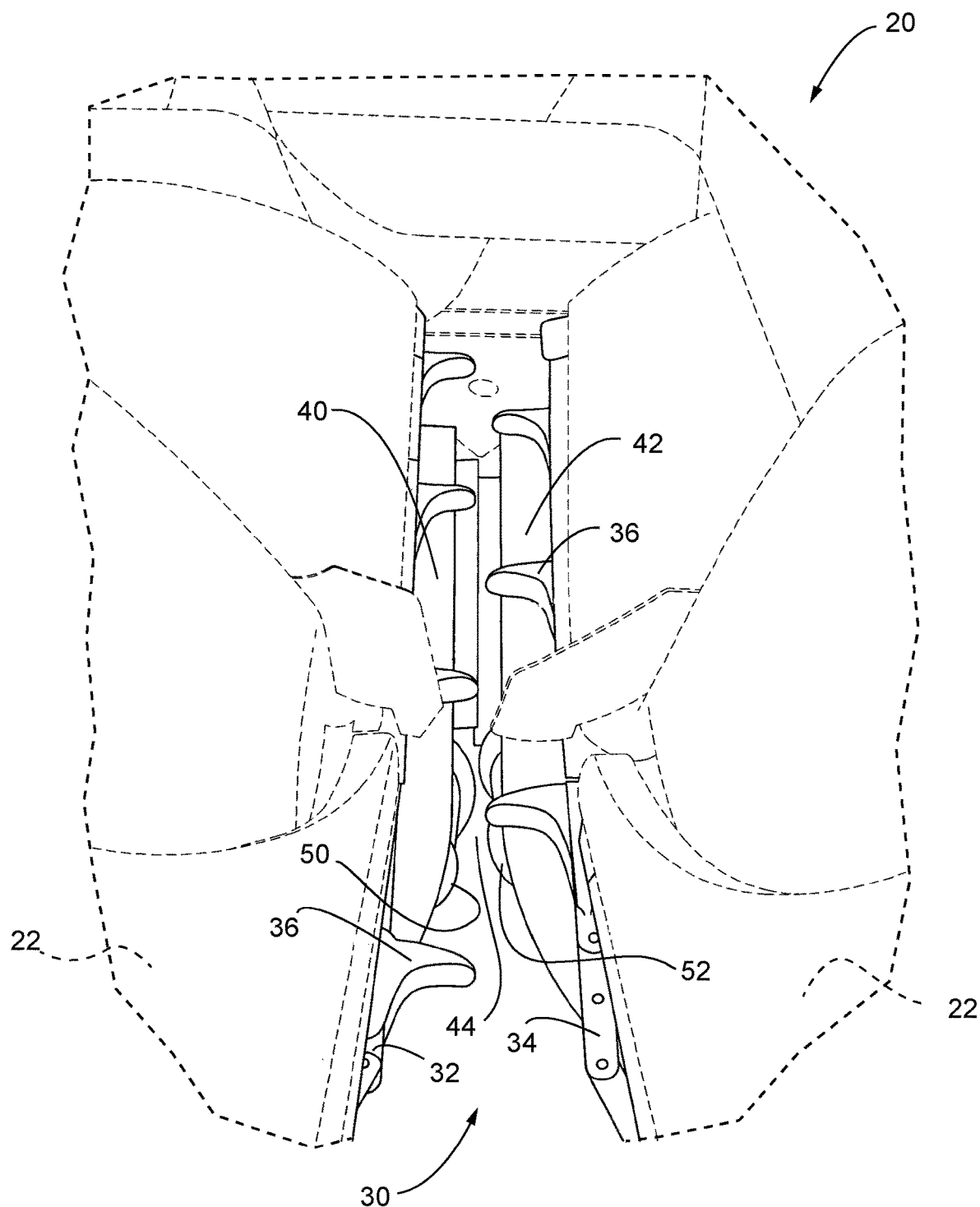
FIG. 4 is an enlarged view of the portion of the row unit assembly circled in FIG. 1 showing parts of the row unit assembly between the crop divider points.
Figure 5:
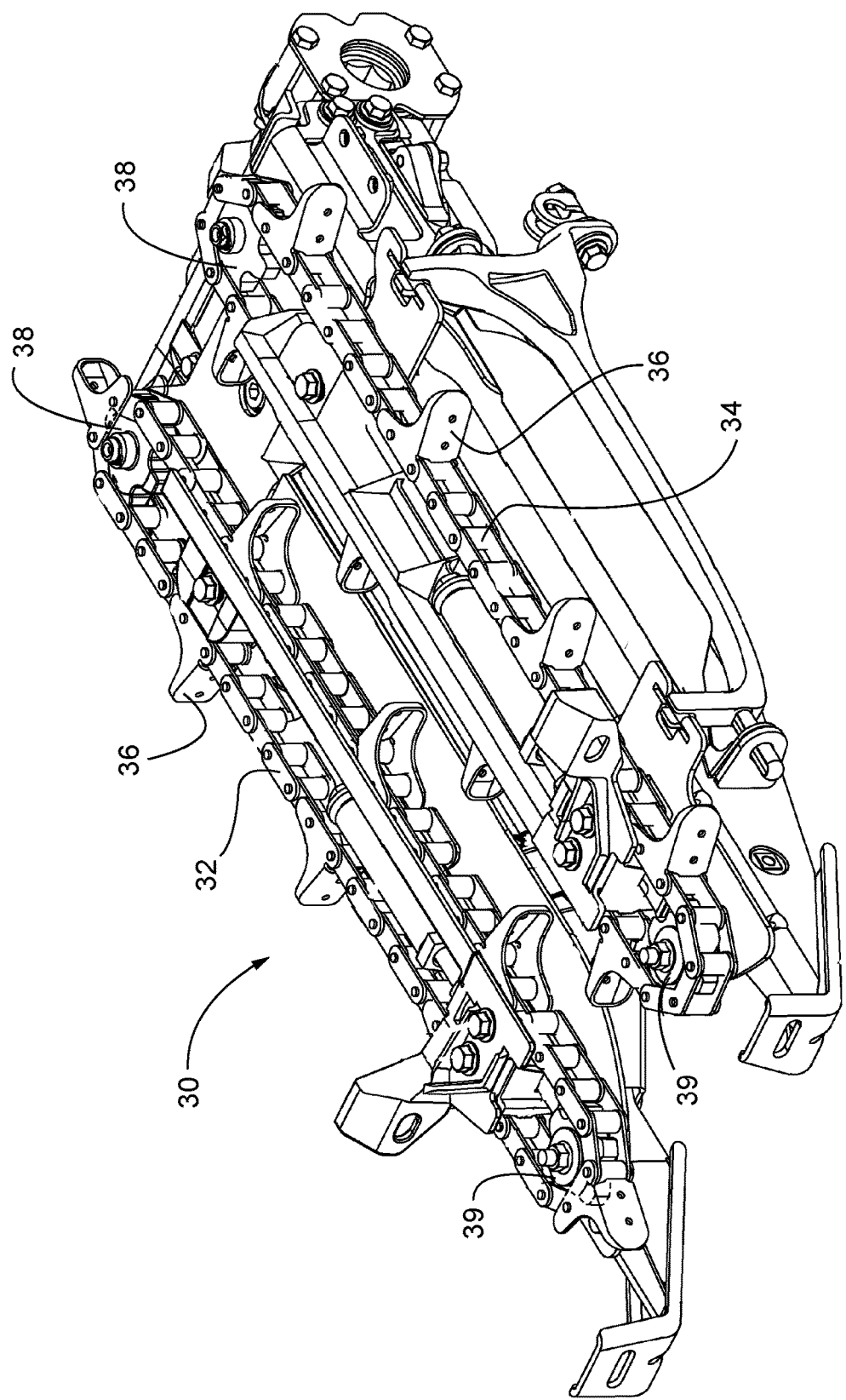
FIG. 5 is a perspective view of a row unit assembly with the crop dividers removed.
Figure 6:
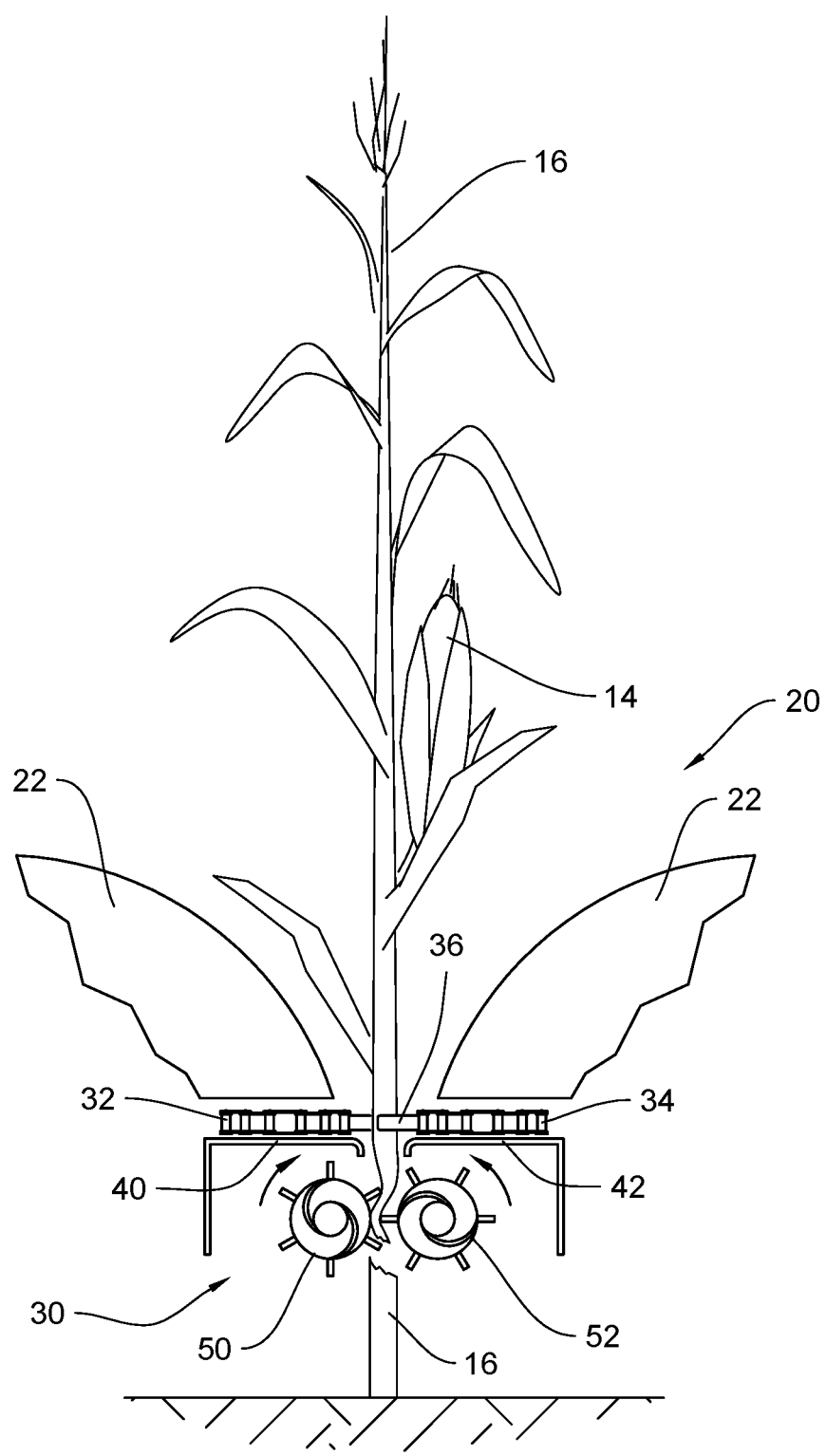
FIG. 6 is a partial front elevation view of the row unit assembly of FIG. 5 depicting the relationship of the row unit relative to a cornstalk during harvesting operations.
Figure 7:
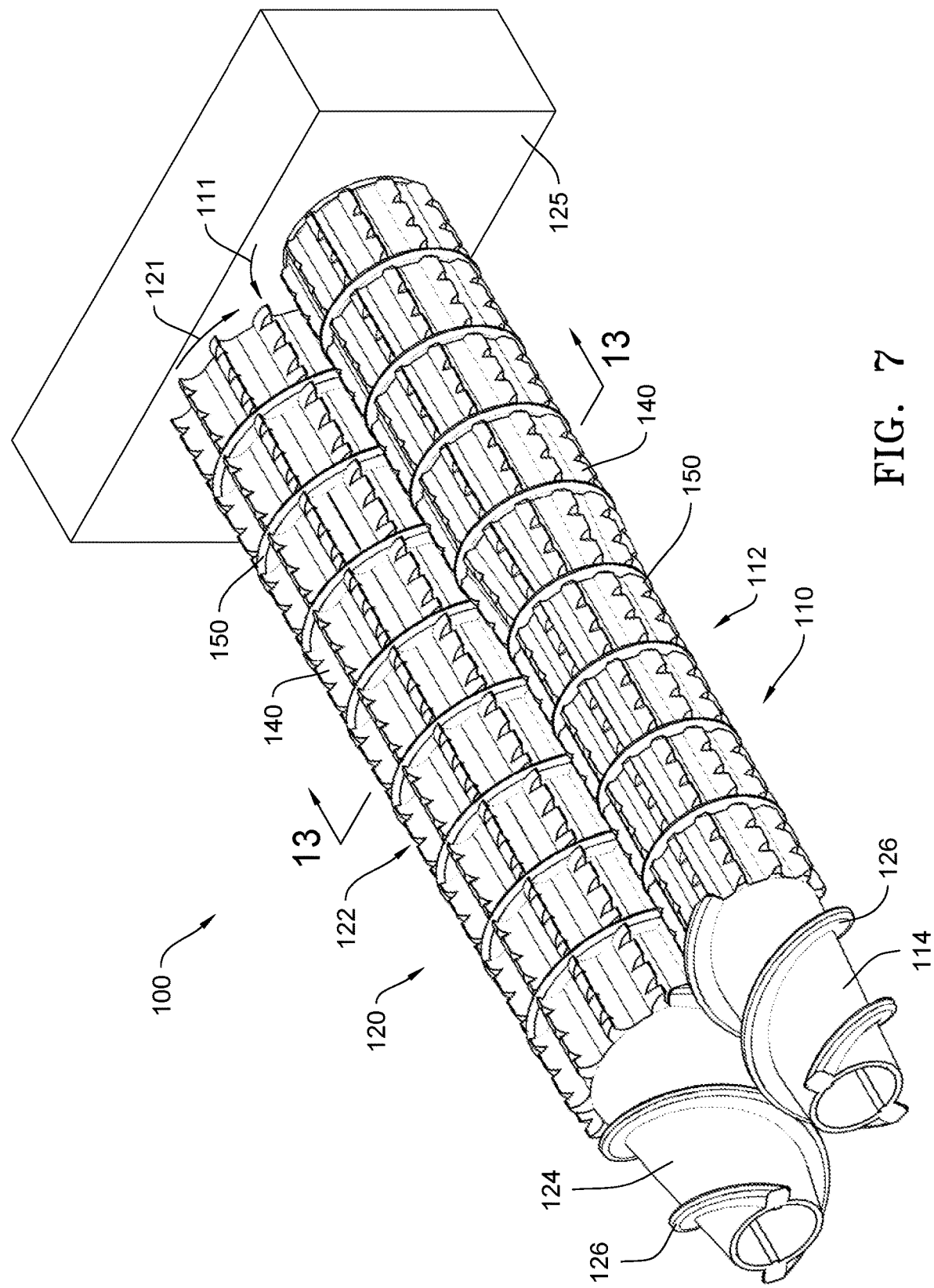
FIG. 7 is a front perspective view of one embodiment of a differential speed stalk roll assembly.
Figure 8:
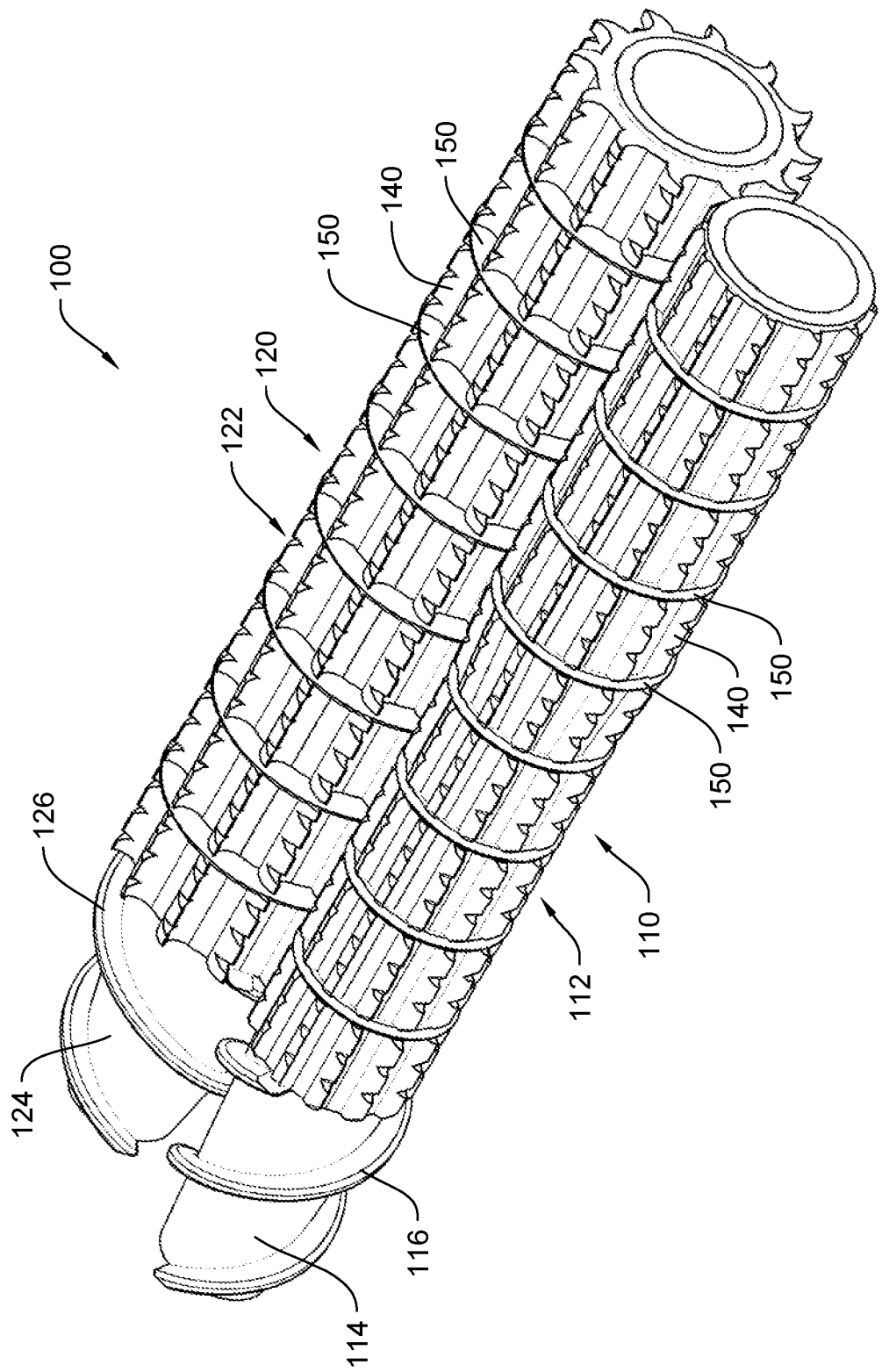
FIG. 8 is a rear perspective view of the differential speed stalk roll assembly of FIG. 7.

Referring now to the drawings wherein like reference numerals designate the same or corresponding parts throughout the several views, FIG. 7 shows an embodiment of a differential speed stalk roll assembly 100, comprising a pair of stalk rolls 110, 120. Each stalk roll 110, 120 is comprised of a main body 112, 122 and a head or nose 114, 124. The head 114, 124 may have helically arranged flights 116, 126 which function as augers to pull the cornstalk rearwardly between the main bodies 112, 122 as the stalk rolls rotate counter to one another as indicated by arrows 111 and 121. Each stalk roll 110, 120 may be formed as a single cast, forged or machined unit with the head 114, 124 and main body 112, 122 formed as integral unit. Alternatively, each stalk roll 110, 120 may be formed by casting, forging, or machining the main body 112, 122 separate from the head 114, 124. Alternatively, each stalk roll 110, 120 may be fabricated from plate steel or bar stock and welded or bolted together as well known in the art. In still other embodiments, each stalk roll body 112, 122, may comprise modular body segments (discussed later) with each modular body segments cast, forged, machined or otherwise fabricated as an interchangeable unit.

Figure 14A:
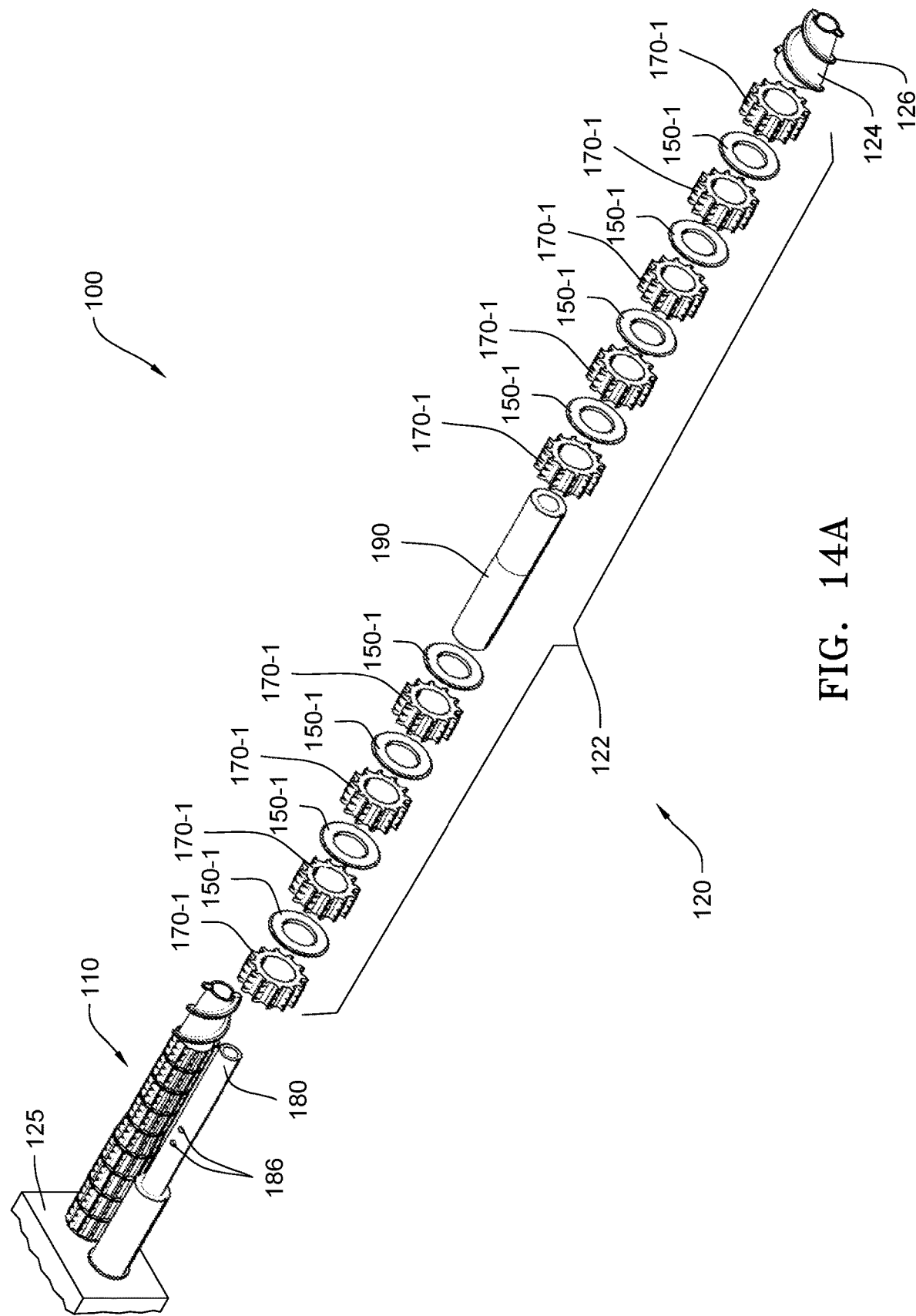
FIG. 14A is a partially exploded perspective view of the differential speed stalk roll assembly of FIG. 7.
Figure 14B:
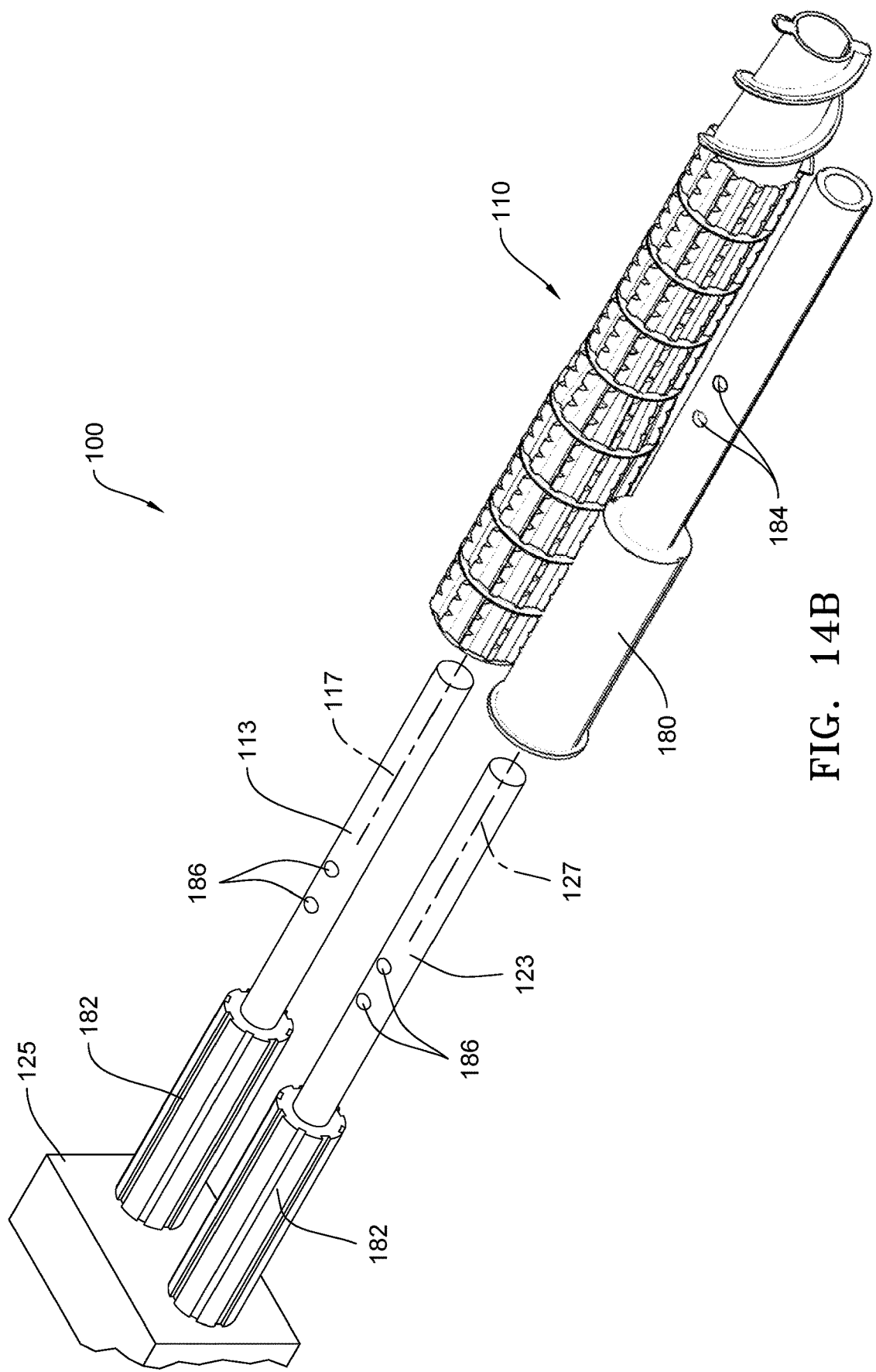
FIG. 14B is an enlarged partial exploded perspective view of the differential speed stalk roll assembly of FIG. 7 showing the shafts.

As best illustrated in FIG. 14B, each stalk roll 110, 120 receives and is rigidly secured to laterally spaced shafts 113, 123 coupled to a gearbox 125 which drives rotation of the shafts 113, 123 about their respective longitudinal axis 117, 127. The gearbox 125 of each row unit 30 is operably driven by the combine 10 to which the head 20 is mounted as understood by those of skill in the art. The shafts 113, 123 may be cantilevered from the gearbox 125 such that their forward ends are unsupported, or the forward ends of the shafts 113, 123 may be supported from brackets or frame members on the head 20. The gearbox 125 may be configured to drive the shafts 113, 123 such that they rotate together, but in opposite direction, at the same speed of rotation or revolutions per minute (RPM). Alternatively, the gearbox 125 may be configured so each shaft 113, 123 is capable of rotating at different RPMs.

The stalk rolls 110, 120 may include an internal cavity that is keyed to matingly receive splines on the outer periphery of the shafts 113, 123 so the stalk rolls are rotationally fixed to the shafts and longitudinally restrained with respect to the shafts by roll pins, or threaded connectors extending through the main body and into the shafts 113, 123. Alternatively, or in addition, the stalk rolls 110, 120 may be longitudinally restrained with respect to the shafts 113, 123 by threaded connectors which extend through bores in the forward ends of the heads 114, 124 and are threadably received by internally threaded bores in the forward ends of the shafts 113, 123.

In one embodiment of the differential speed stalk roll assembly 100, one of the stalk rolls (the first stalk roll 110) has a smaller diameter than the other stalk roll (the second stalk roll 120). Either stalk roll comprising the pair of stalk rolls may be the larger diameter stalk roll. It should be appreciated that if shafts 113, 123 rotate at the same RPM, both the shaft and the stalk roll rotationally secured thereto, will have the same RPMs, but the outer periphery of the stalk roll bodies 112, 122 (having larger outer diameters), will move at a greater speed than the outer periphery of the smaller diameter shafts 113, 123. Likewise, even though both stalk roll bodies 112, 122 are rotating at the same RPM, it should be appreciated that the outer peripheral speed of the larger diameter stalk roll body will be greater than the outer peripheral speed of the smaller diameter stalk roll body.

It has been found that when two adjacent stalk rolls are rotating with a differential in outer peripheral speeds, cornstalks passing between the differential speed stalk rolls will be more effectively shredded or opened up along the length of the cornstalk which exposes the core and fractures the hard outer hull or shell of the cornstalk, thereby promoting faster breakdown and decomposition of the cornstalk than if the cornstalk is simply cut or chopped into smaller pieces but leaving the hard hull or shell of the cornstalk unfractured or unshredded. Furthermore, it has been found that when using differential speed stalk rolls, the portion of the stalk stubble that remains projecting above the ground is partially exploded or shredded well below the point that the stalk is broken or snapped off by the stalk rolls, such that the remaining stalk stubble will not cause as much tire wear and is less likely to puncture tires due to the partially exploded or shredded stubble ends. This also allows faster breakdown and decomposition of the stalk stubble.

It should be appreciated that a differential speed between the stalk rolls can also be achieved using the same diameter stalk rolls by modifying the gearbox 125 to cause one of the shafts 113, 123 to have a greater RPM than the adjacent shaft 113, 123. The stalk roll attached to the shaft 113, 123 having a greater RPM will necessarily have a greater outer peripheral speed than the same diameter stalk roll mounted to the other shaft 113, 123 rotating at a slower RPM.

It has been determined that a pair of stalk rolls having a differential speed between their respective outer peripheries within a range of about ten percent (10%) to about fifty percent (50%) produces desirable shredding of the cornstalks. A ratio between the smaller diameter stalk roll and the larger diameter stalk between a range of 1:1.1 and 1:1.6 will produce the differential speeds within the above range.

The outer peripheries of the main bodies 112, 122 include radially spaced flutes 140 which serve to bite into or grip the cornstalk as the flutes rotate to pull the cornstalk downwardly toward the stripper plates 40, 42 for stripping the ears 14 from the stalks 16. As the flutes 140 grip and bite into the stalks, the differential speeds of the rotating stalk rolls rip, shred and crush the stalks as the stalks pass between the outer peripheries or outer surfaces of the adjacent stalk rolls. The flutes 140 may be continuous or longitudinally intermittent. The outer tip or edge of the flutes 140 may include a plurality of spaced notches or teeth 174 (see e.g., FIGS. 17, 19-21) resulting in serrated edge flutes. The spacing, width and depth of the notches or teeth 174 may vary. It has been found that serrated edge flutes produce more effective shredding of the cornstalks than straight edge or non-serrated edge flutes, and that deeper and wider notches will produce more aggressive shredding. It may be desirable to provide deeper and wider notches 174 on the stalk roll with the greater outer peripheral speed to produce more aggressive shredding. Additionally, the flutes 140 may be curved or hooked or radially straight. Thus, it should be appreciated that the particular configuration of the flutes 140 may vary depending on crop moisture levels, brittleness of the stalks, weather and other crop conditions.

Figure 13:
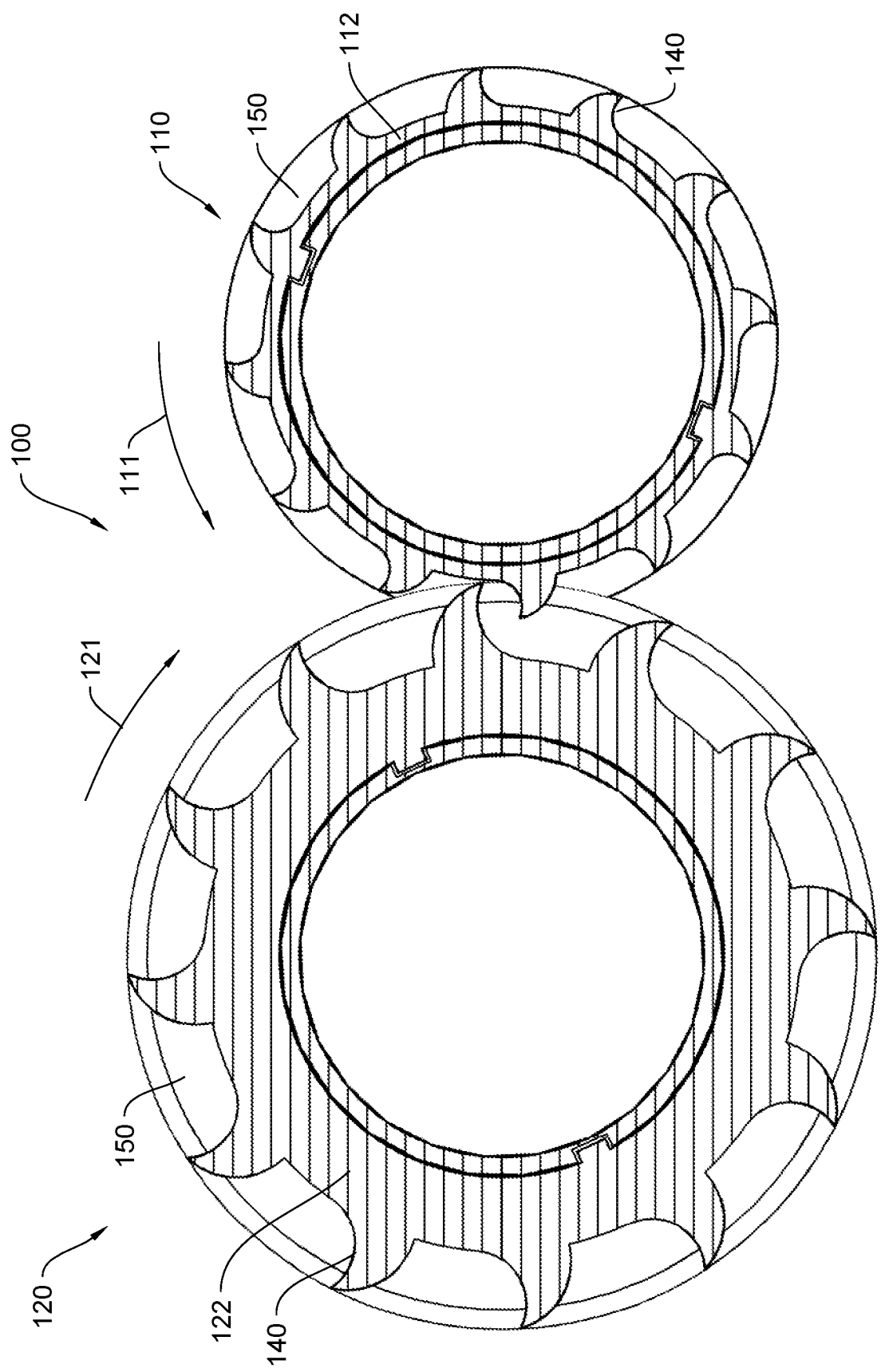
FIG. 13 is a cross-sectional view of the stalk rolls as viewed along lines 13-13 of FIG. 7.

FIG. 13 is a cross-sectional view of the stalk roll assembly 100 as viewed along lines 13-13 of FIG. 7 to best illustrate one particular configuration of the flutes 140 on the pair of stalk rolls 110, 120. In this embodiment, the first stalk roll 110 includes a plurality of radially spaced flutes 140 that are curved upwardly or away from the direction of rotation of the first stalk roll 110 as indicated by arrow 111. The plurality of radially spaced flutes 140 of the second stalk roll 120 are curved downwardly or toward the direction of travel of the stalk roll 120 as indicated by arrow 121. In this embodiment, it should be appreciated that the tips of the downwardly curved flutes 140 of the second stalk roll 120 (having the greater outer peripheral speed due to its larger diameter) will grip or bite into one side of the cornstalk as the second stalk roll 120 rotates, while the tips of the upwardly curved flutes 140 of the first stalk roll 110 (rotating at a slower outer peripheral speed due to the smaller diameter stalk) will grip or bite into the opposite side of the cornstalk producing an internal shearing force within the cornstalk. Thus, this differential speed and opposing gripping action of the flutes 140 between the first and second stalk rolls 110, 120 results in a more aggressive shredding of the cornstalk to more thoroughly open up or fracture the outer hull or shell of the cornstalk along its length resulting in more efficient breakdown and decomposition of the cornstalk.

It should be appreciated that in embodiments in which the lateral spacing of the stalk rolls 110, 120 and the size of the respective bodies 112, 122 are such that the flutes 140 of the first and second stalk rolls 110, 120 overlap one another, the number of flutes 140 and the radial spacing of the flutes may be matched and oriented such that the flutes are timed to avoid the flutes contacting or interfering with one another as they rotate. Additionally, or alternatively, the notches 174 of the flutes 140 may be longitudinally offset between the adjacent stalk rolls such that the projecting notches of the flutes 140 of one of the stalk rolls are received within the valleys of the notches of the adjacent stalk roll.

Figure 9:
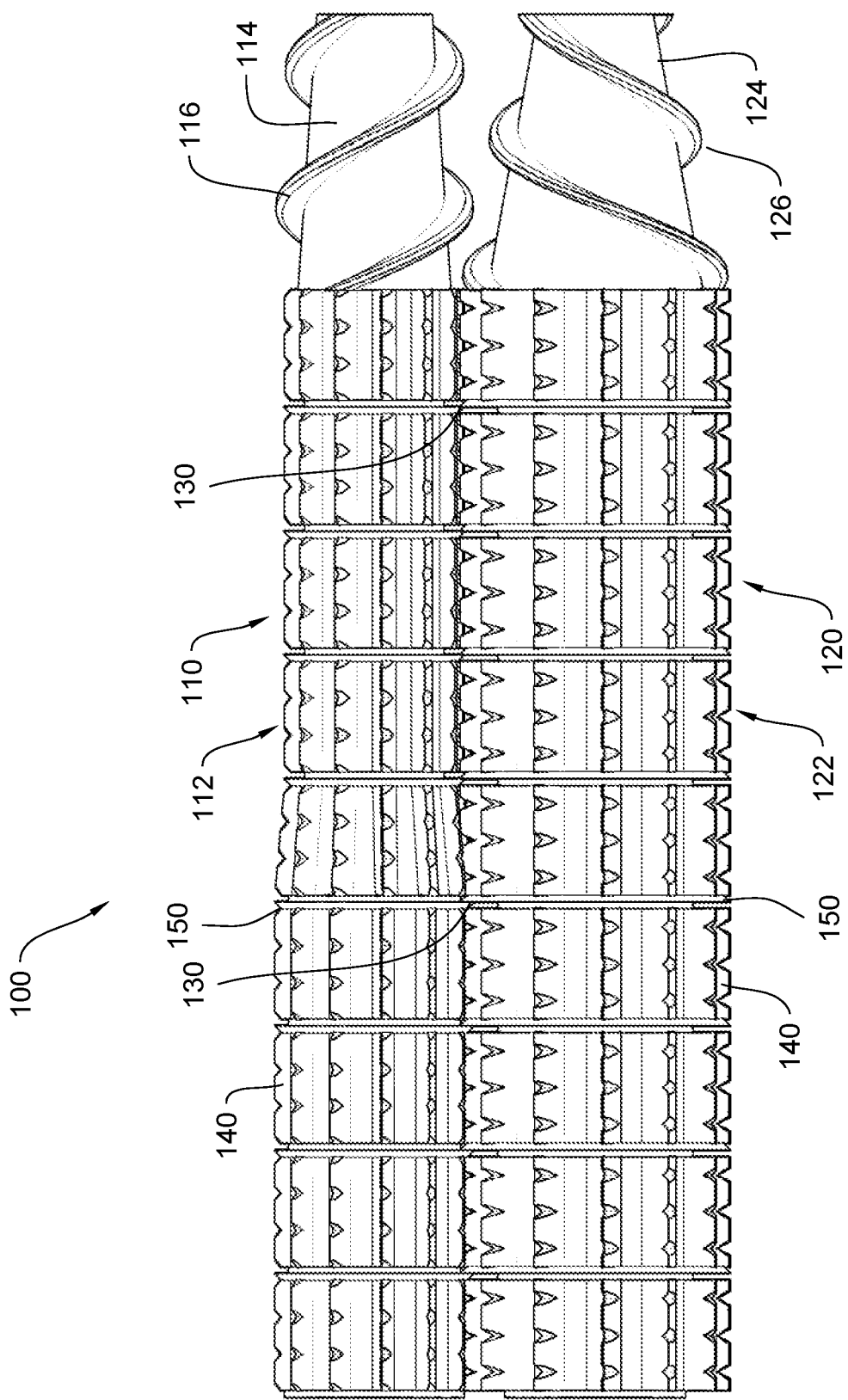
FIG. 9 is a top view of the differential speed stalk roll assembly of FIG. 7.
Figure 10:
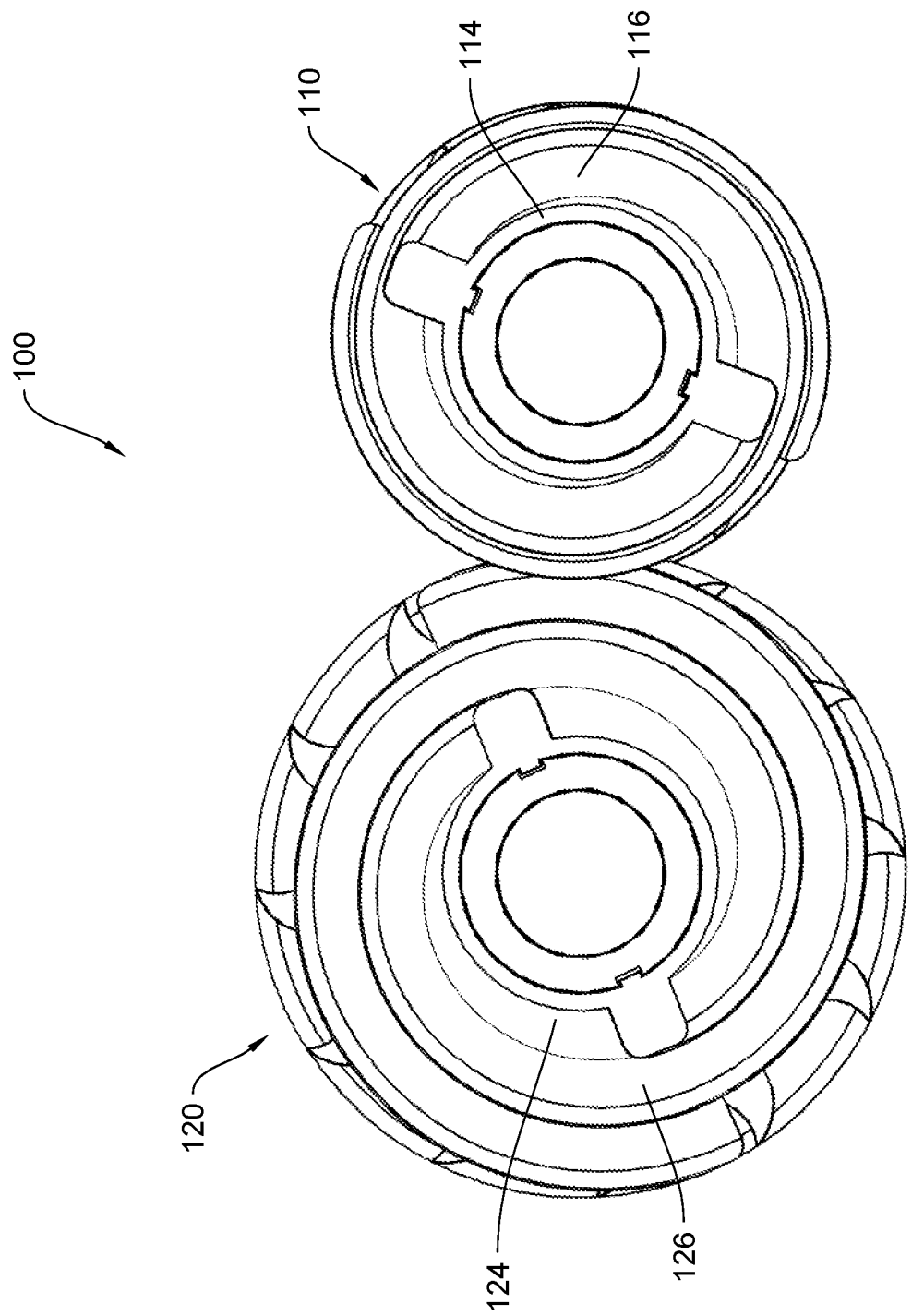
FIG. 10 is a front elevation view of the differential speed stalk roll assembly of FIG. 7.
Figure 11:
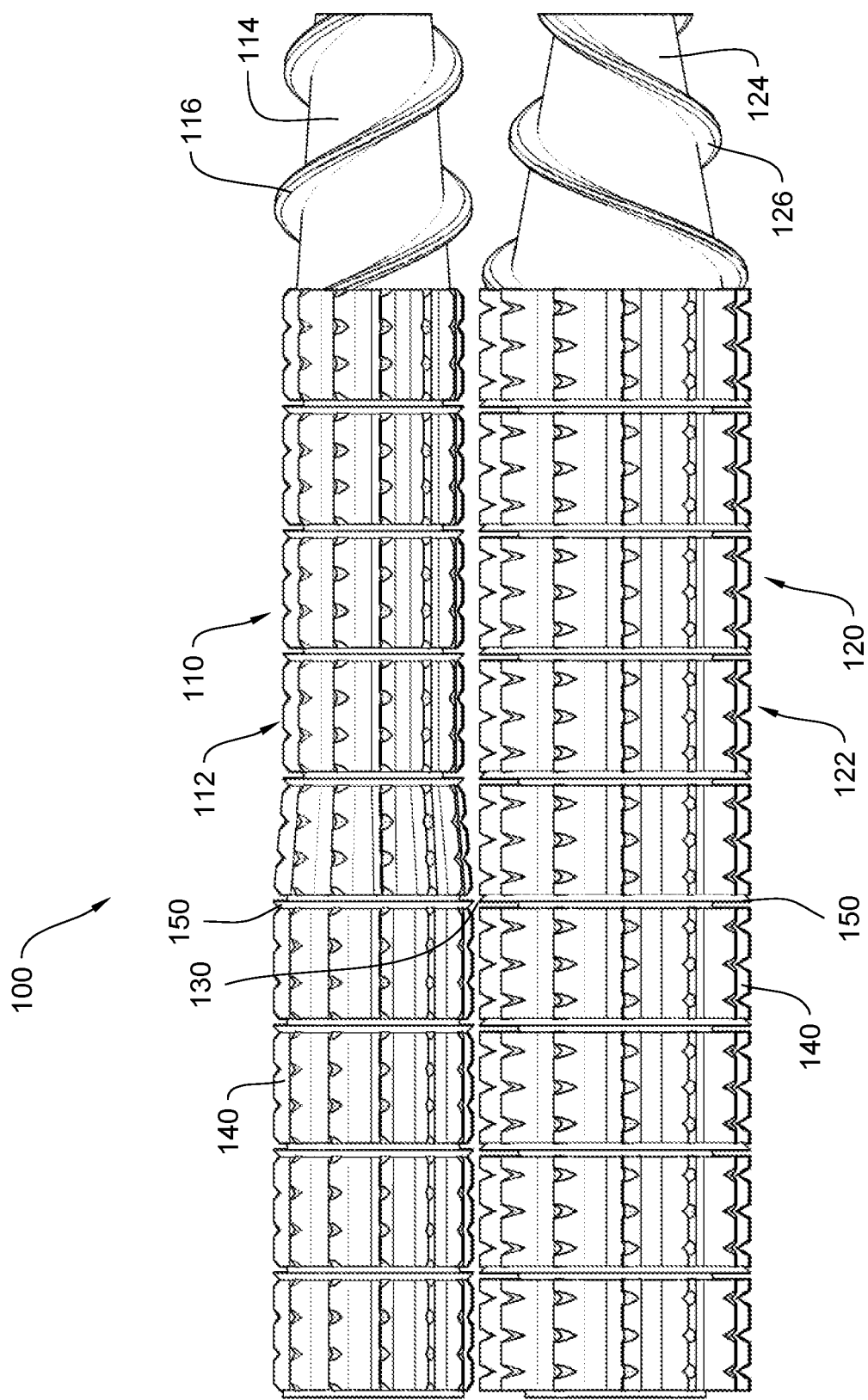
FIG. 11 is a top view of the differential speed stalk roll assembly of FIG. 7 with the stalk rolls having a greater laterally spacing.
Figure 12:
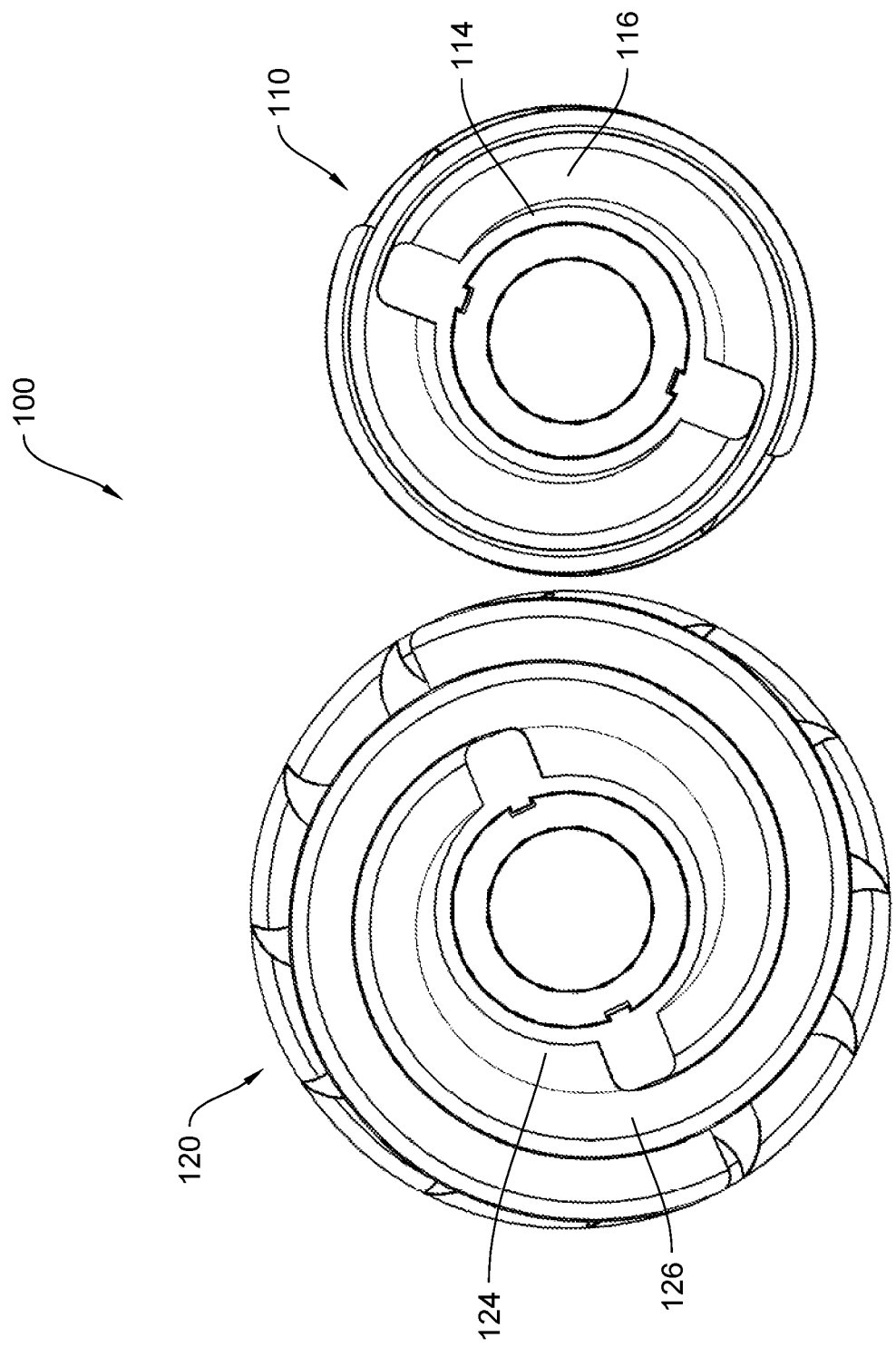
FIG. 12 is a front elevation view of the differential speed stalk roll assembly of FIG. 11.

Furthermore, it may be desirable to have a wider spacing between the main bodies 112, 122 of the stalk rolls stalk rolls (e.g., compare FIGS. 9 and 10 with FIGS. 11 and 12), or to have a wider spacing at the forward or leading end of the stalk roll bodies and a narrow spacing or overlapping flutes at the rearward or trailing end of the stalk roll bodies to ensure that the thinner tassel ends of the stalks are shredded as effectively as the larger stalk sections as the stalks move downwardly and rearwardly along the length of the stalk rolls as the header advances forward.

Additionally, it may be desirable to have more or less speed differential between the rotating stalk rolls depending on crop conditions or it may be desirable to have varying speed differentials along the length of the stalk rolls by varying the diameters between the respective first and second stalk rolls, or switching along the length of the stalk rolls between sides having the greater outer peripheral speeds.

While many of these variables can be achieved by swapping and interchanging the entire stalk roll or the main bodies of the stalk rolls with replacement stalk rolls or main bodies having the desired diameters, flute configurations, etc., in the embodiment discussed in more detail later, the main body may comprise a plurality of modular body segments that are separately interchangeable and replaceable to achieve the desired stalk roll configurations to achieve the best results based on varying crop conditions and other variables.

In addition to a stalk roll assembly that shreds the stalk along its length, it is also desirable to cut, chop or pinch the stalk into sections that are approximately four to twelve inches in length because such lengths are sufficiently long that they can be readily swept away by row cleaners during planting operations but yet are sufficient short that the sections will readily break down and decompose provided there is at least some fracturing or shredding of the hard outer shell of the cornstalk along the section.

To achieve the desirable stalk section lengths, pinch points 130 are spaced along the length of the main body, to pinch off, cut or sever the stalks as they are pulled downwardly and rearwardly between the stalk rolls. One embodiment of a pinch point 130 is provided by longitudinally aligned knives or blades 150 which form a cutting plane substantially normal to the longitudinal axis 117, 127 of the shafts 113, 123. Depending on the construction of the stalk rolls, the knives 150 may be cast as an integral part with the main body and subsequently machined to produce a sharp cutting edge. Alternatively, for fabricated constructions, the knives 150 may be fabricated and welded to the structure comprising the main body of the stalk rolls. In yet another alternative embodiment, and as discussed in more detail later, the knives 150 may be modular annular blades disposed between body segments or received within slots of body segments.

Referring to FIG. 13, in one embodiment, the knives 150 have an outer diameter that is substantially the same as the outer diameter of the tips of the flutes. It has been found that if the outer diameter of the knives 150 is greater than the outer diameter of the tips of the flutes, the knives may act as a wall obstructing the rearward movement of the cornstalks between the stalk rolls.

Figure 15:
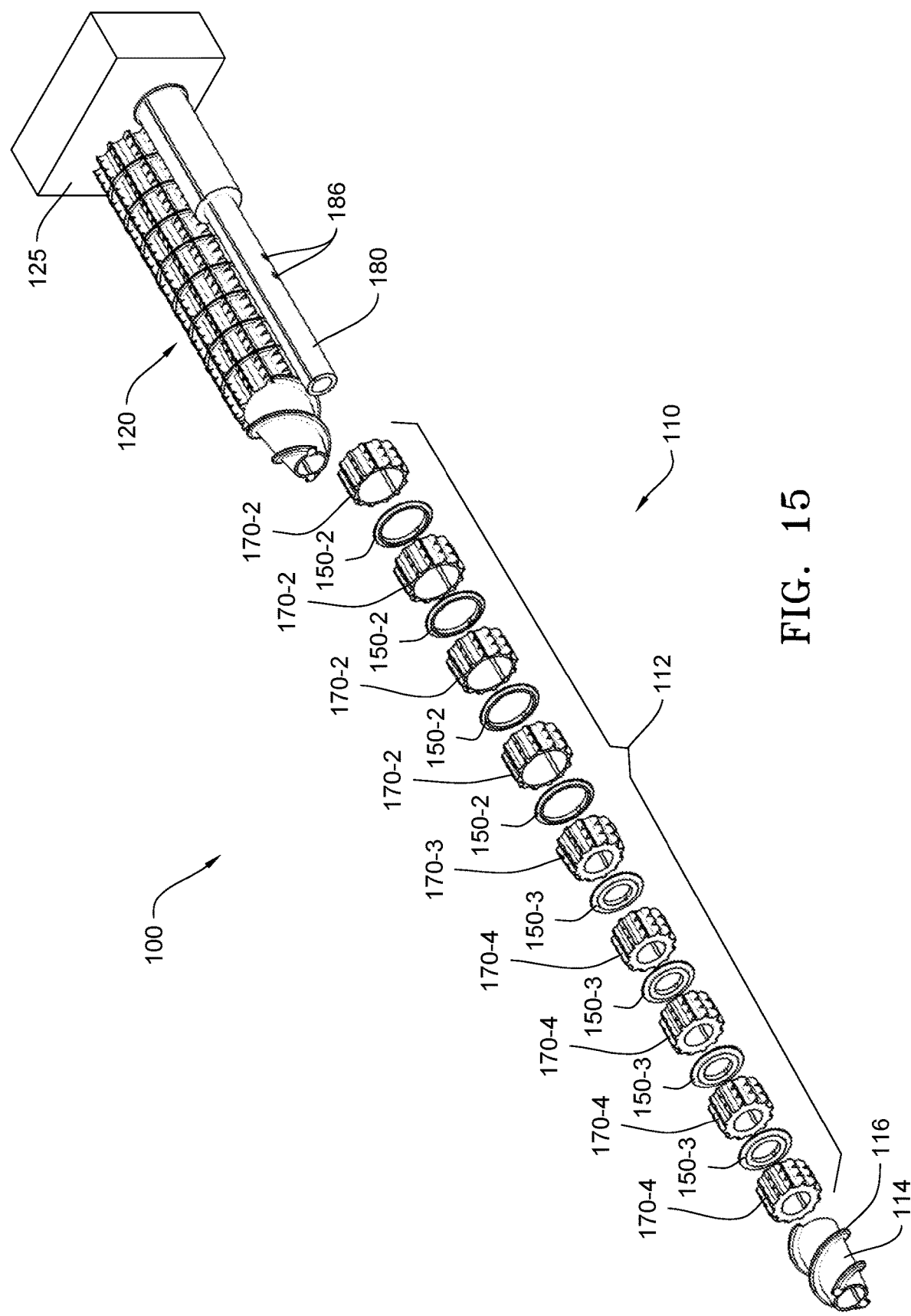
FIG. 15 is another partially exploded perspective view of the differential speed stalk roll assembly of FIG. 7.

FIGS. 14A, 14B and 15 are exploded views of the stalk rolls 110, 120 showing one embodiment in which the stalk rolls comprise a plurality of body segments 170 disposed between annular knives 150. Enlarged views of each of the various body segments 170-1, 170-2, 170-3, 170-4 and the annular knives 150-1, 150-2, 150-3 as identified in FIGS. 14A, 14B and 15 are provided in FIGS. 17-23. The body segments 170 and annular knives 150 are received onto a sleeve 180. The sleeve 180 has an internal configuration (not shown) that matingly receives the external configuration of the shafts 113, 123, including a keyed internal periphery that matingly receives external splines 182 on the shafts, such that the sleeve 180 is rotationally restrained with respect to the shafts 113, 123. The sleeve 180 is also longitudinally restrained with respect to the shaft by roll pins or threaded connectors received through apertures 184 in the sleeve 180 that are received through aligned apertures 186 in the shafts 113, 123.

Figure 16:
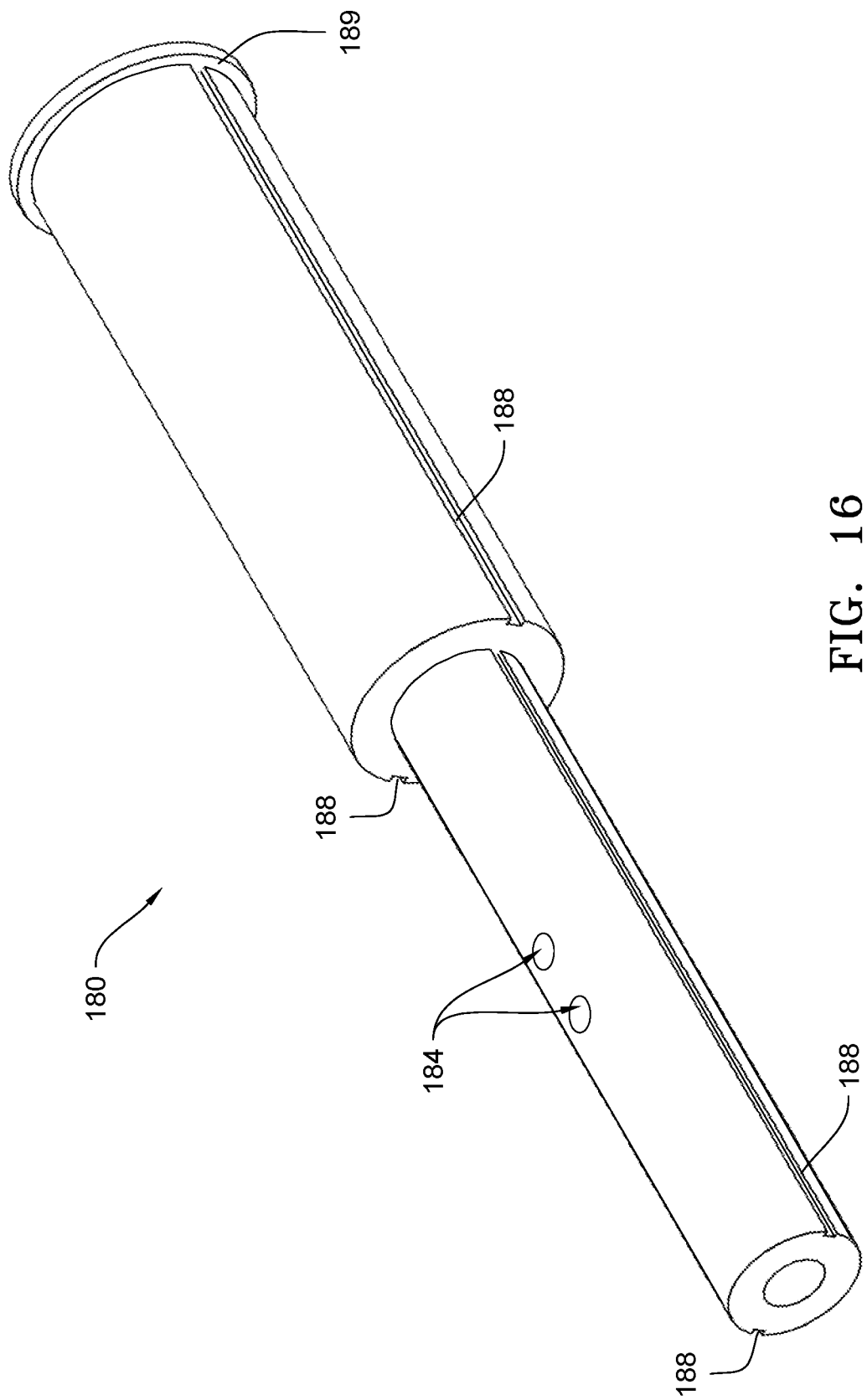
FIG. 16 is an enlarged perspective view of the sleeve depicted in FIGS. 14 and 15.
Figure 17:
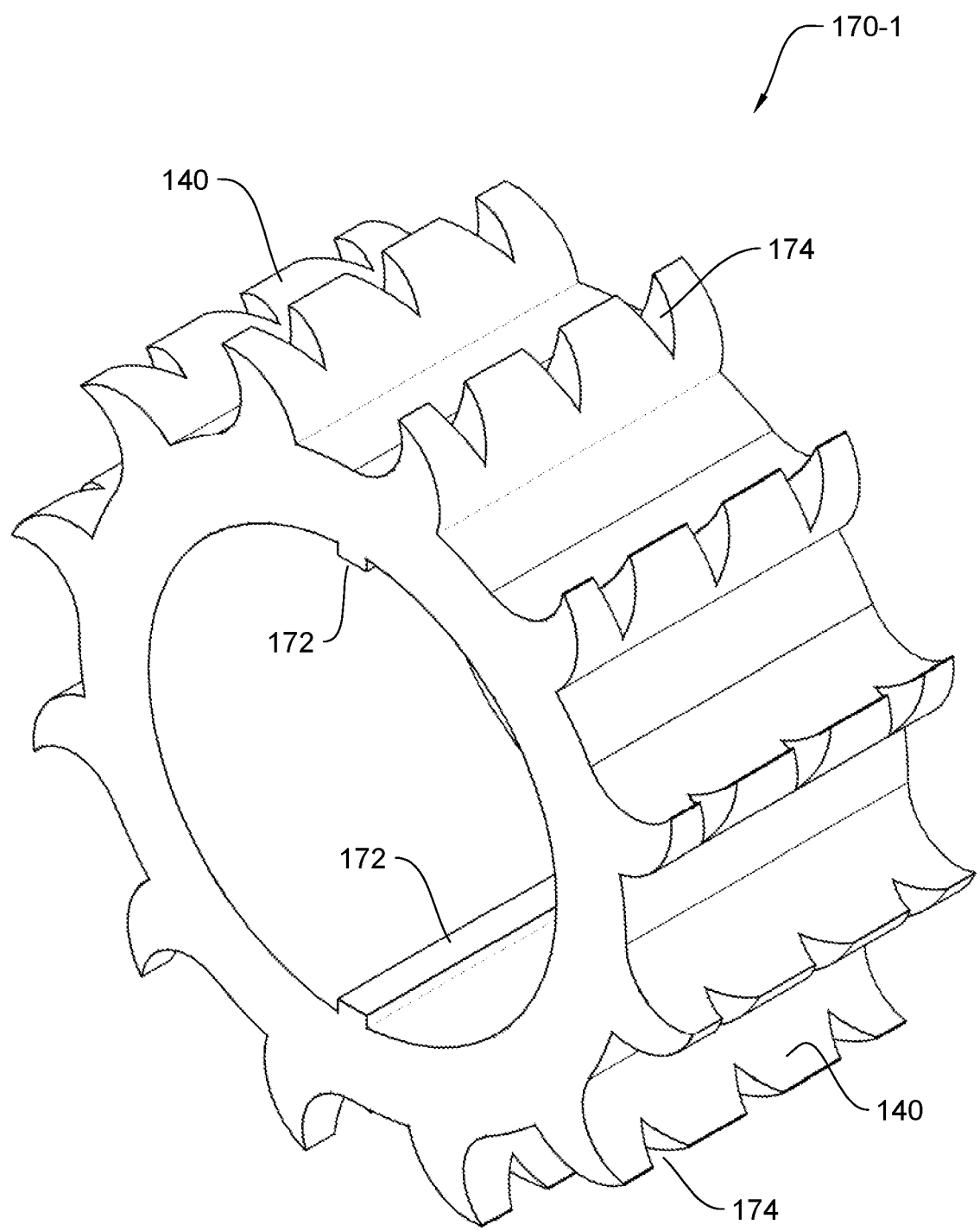
FIG. 17 is an enlarged perspective view of an embodiment of one of the body segments depicted in FIG. 14.

The sleeve 180 includes one or more external slots 188 (FIG. 16) which matingly align with inwardly projecting tabs 172 (see FIGS. 17, 19-20) on the internal diameters of the body segments 170. The mating slots 188 and tabs 172 rotationally restrain the body segments 170 to rotate with the sleeve 180, which in turn rotates with the respective shafts 113, 123. It should be appreciated that the internal diameter of the body segments 170 is sized such that that the body segments 170 easily slide onto the sleeves 180, while ensuring that the tabs 172 are still received within the slots 188 to maintain rotational restraint.

Referring, to FIG. 14A, some OEM row units may have stalk roll shafts with different diameters along their length. Accordingly, a bushing 190 may be provided that is the length of the smaller diameter shaft portion. The bushing 190 has an internal diameter and the same inwardly projecting tabs (not visible in FIG. 14A) as the body segments 170, such that the bushing 190 is rotationally restrained with respect to the sleeve 180 and the shaft 113. The bushing also has an external slot 192 that matingly receives the tabs 172 of the body segments 170 and the tabs 152 of the annular knives 150. The bushing 190 minimizes the wall thickness of the body segments 170 that would otherwise be required for the body segments to be slidably received over the smaller diameter portion of the sleeve 180.

Figure 18B:
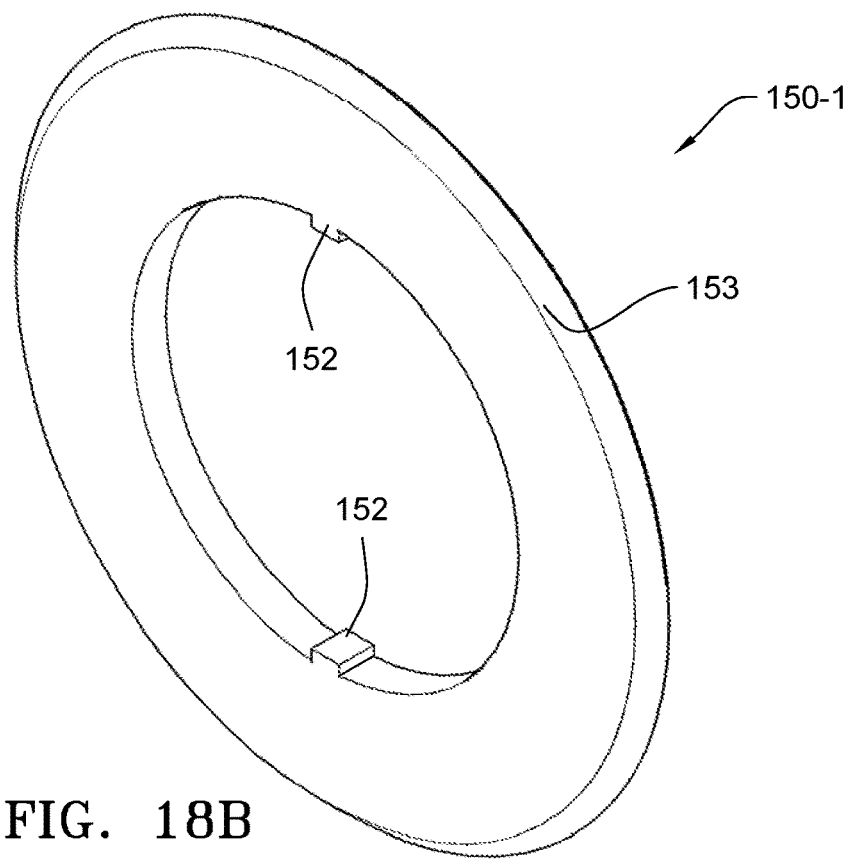
FIGS. 18A and 18B are enlarged front and rear perspective views, respectively, of an embodiment of one of the knives depicted in FIG. 14.
Figure 18A:
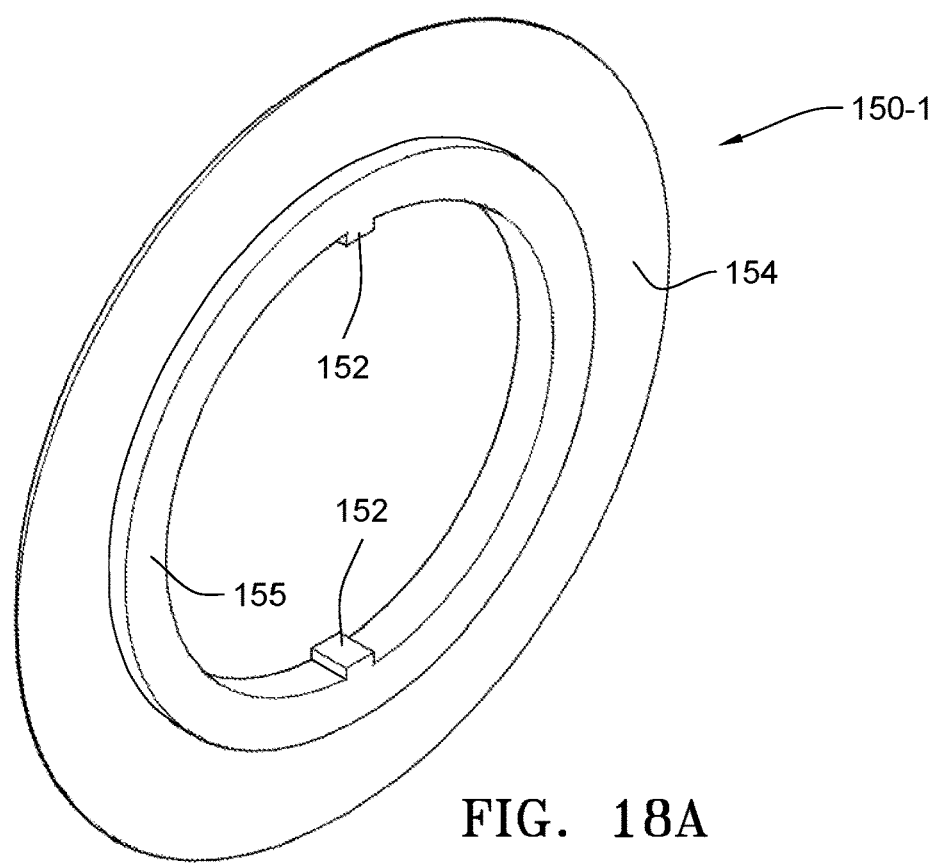
Figure 19:
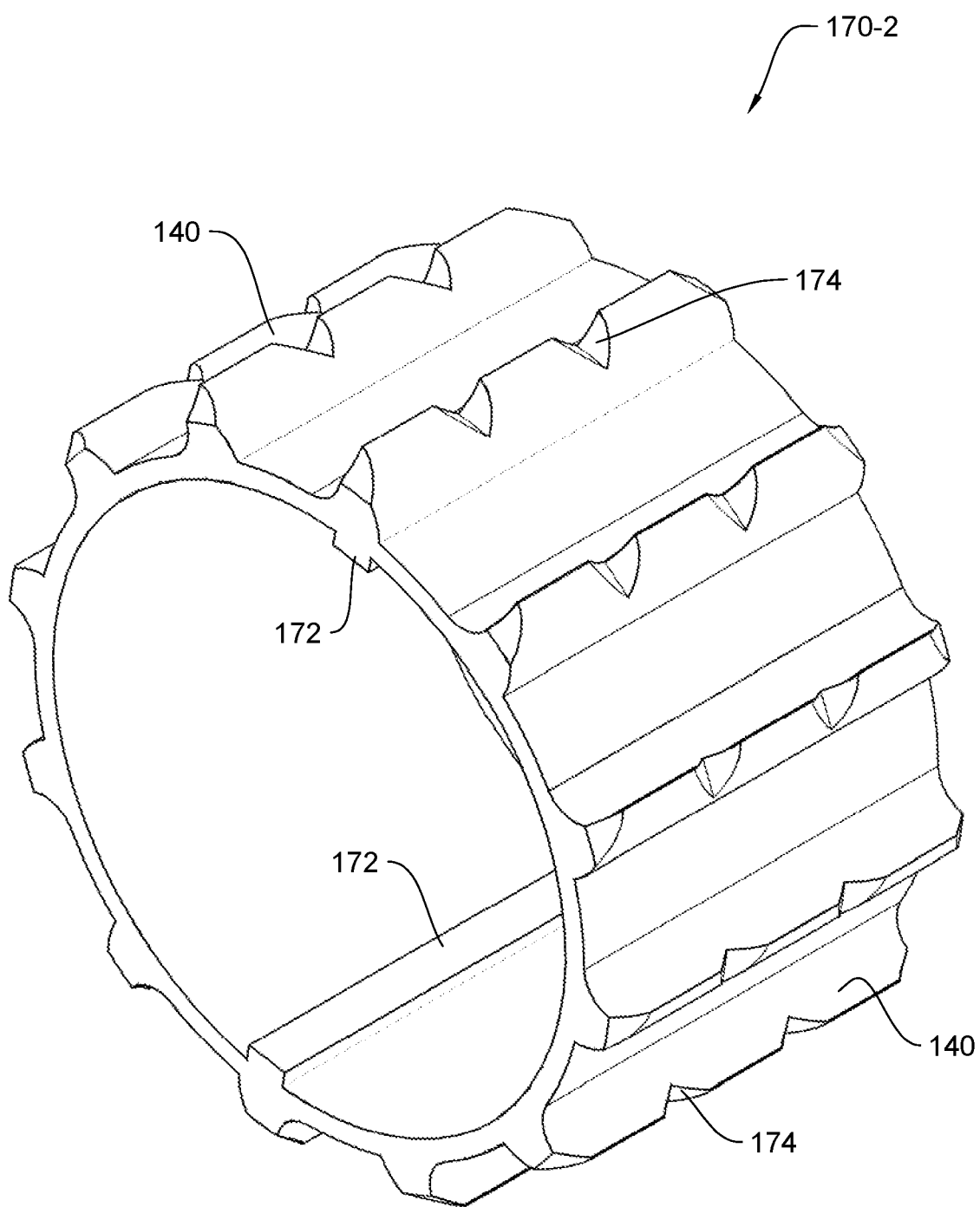
FIG. 19 is an enlarged perspective view of an embodiment of one of the body segments depicted in FIG. 15.
Figure 20:
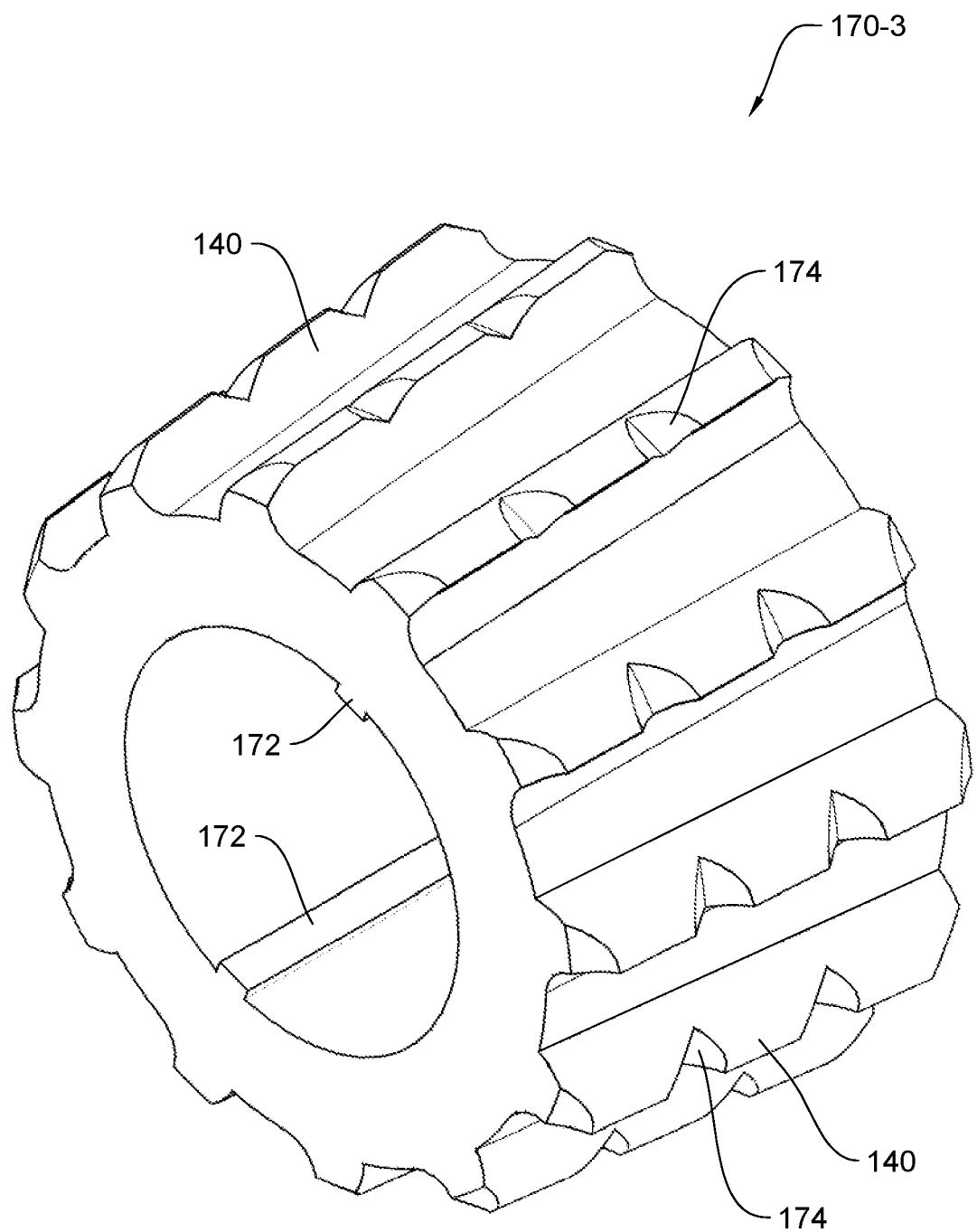
FIG. 20 is an enlarged perspective view of an embodiment of another of the body segments depicted in FIG. 15.
Figure 21:
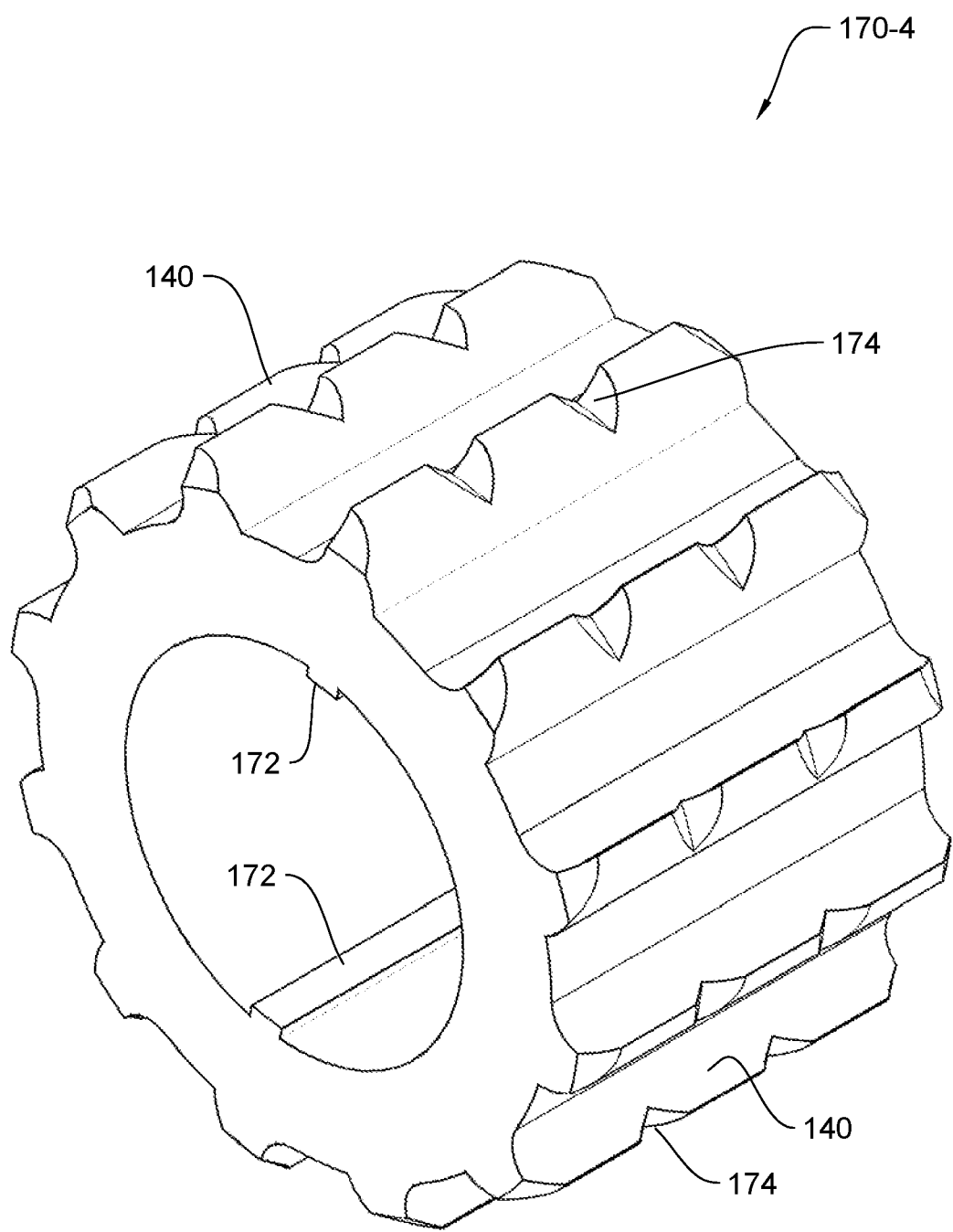
FIG. 21 is an enlarged perspective view of an embodiment of another of the body segments depicted in FIG. 15.
Figure 22B:
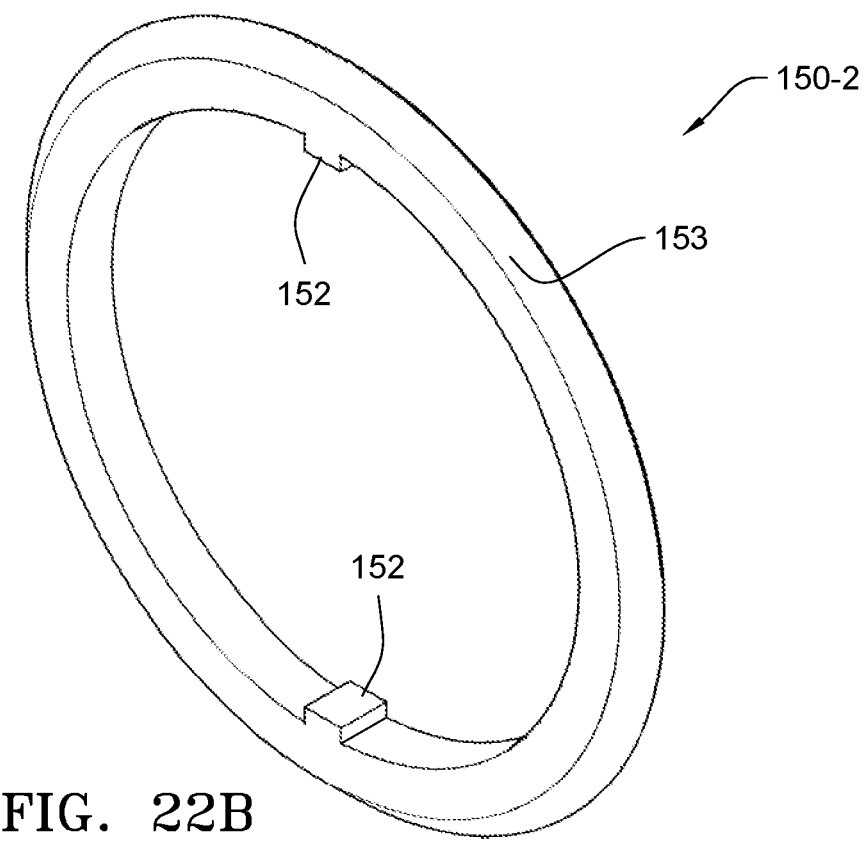
FIGS. 22A and 22B are enlarged front and rear perspective views, respectively, of an embodiment of one of the knives depicted in FIG. 15.
Figure 22A:
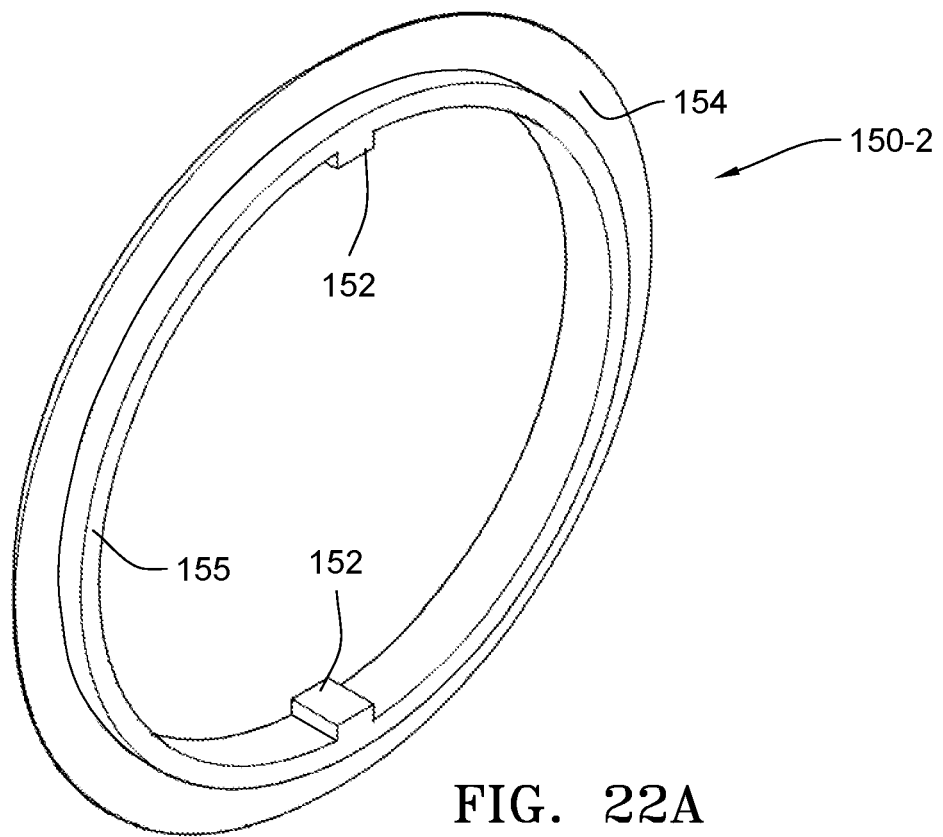
Figure 23B:
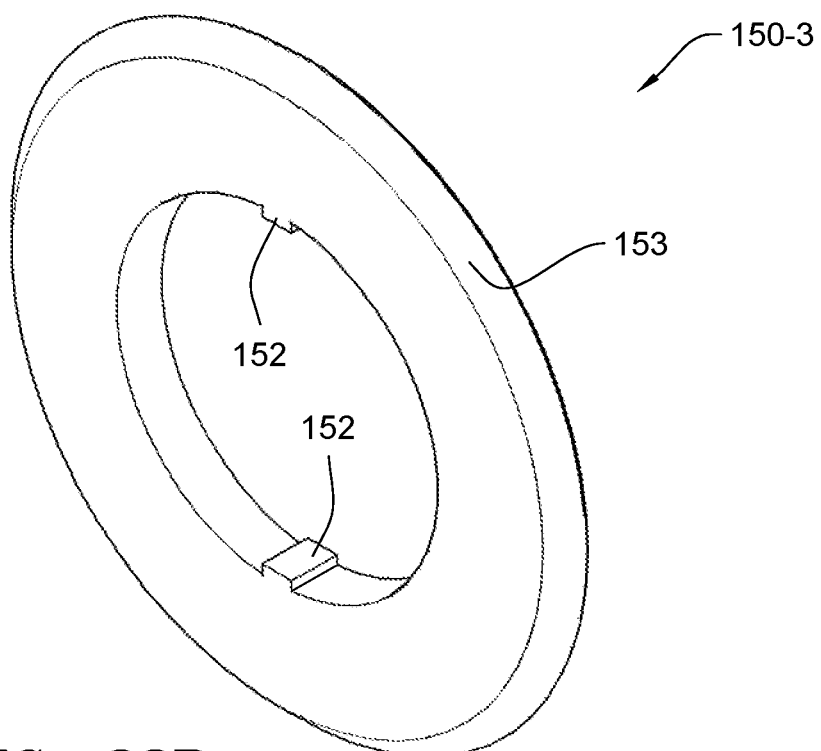
FIGS. 23A and 23B are enlarged front and rear perspective views, respectively, of an embodiment of another knife depicted in FIG. 15.
Figure 23A:
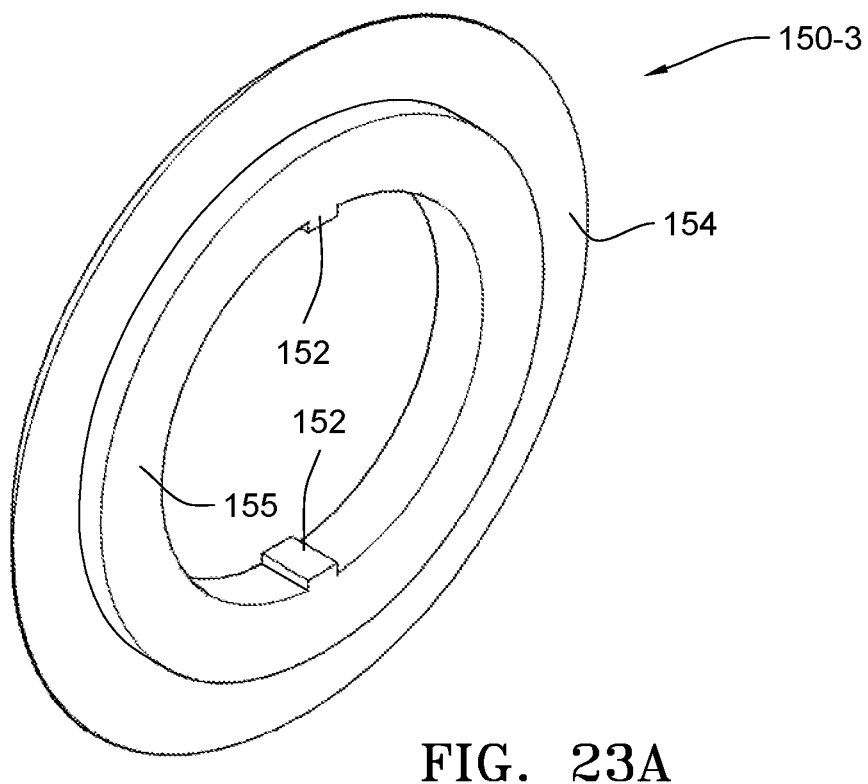

Referring to FIGS. 18 and 22-23, each knife 150-1, 150-2, 150-2 has a beveled face 153 and a flat face 154. The knives 150 are oriented on the respective stalk rolls such that their flat faces 154 are back-to-back, thereby forming a cutting plane. The knives 150 may include a projecting flange 154 that serves as a spacer between the abutting body segments 170. While both of the main bodies 112, 122 are shown comprising a plurality of longitudinally spaced knives 150 along their length, each stalk roll body 112, 122 may include only one knife 150. Additionally, one or more knives 150 may be utilized on only one of the stalk rolls 110, 120.

The body segments 170 and the knives 150 are longitudinally restrained on the sleeve 180 at the rearward end by flange 189 of the sleeve 180 and by the heads 114, 124 on the forward end. The heads 114, 124 are attached to the shafts 113, 123 by bolts (not shown) or other suitable fastening means received in the open forward end of the heads 114, 124 which is threadably received with the internally threaded bore 115 in the forward end of the shafts 113, 123.

It should be understood that the configuration of the body segments 170 shown in FIGS. 7-12, 15, 17 and 19-21, including their lengths, diameters, etc. and the shapes and configurations of the flutes 140 on the body segments 170 are intended as examples only and are not intended to limit the present disclosure of the bodies 110, 120 of the differential stalk roll assembly 100. Likewise the knives 150 shown in FIGS. 7-12, 15, 18 and 22-23 are provided as examples only and are not intended to limit the present disclosure of the bodies 112, 122 of the stalk rolls 110, 120 of the differential stalk roll assembly 100. Various other configurations of body segments 170 and various other configurations of knives 150 may be provided.

Figure 24:
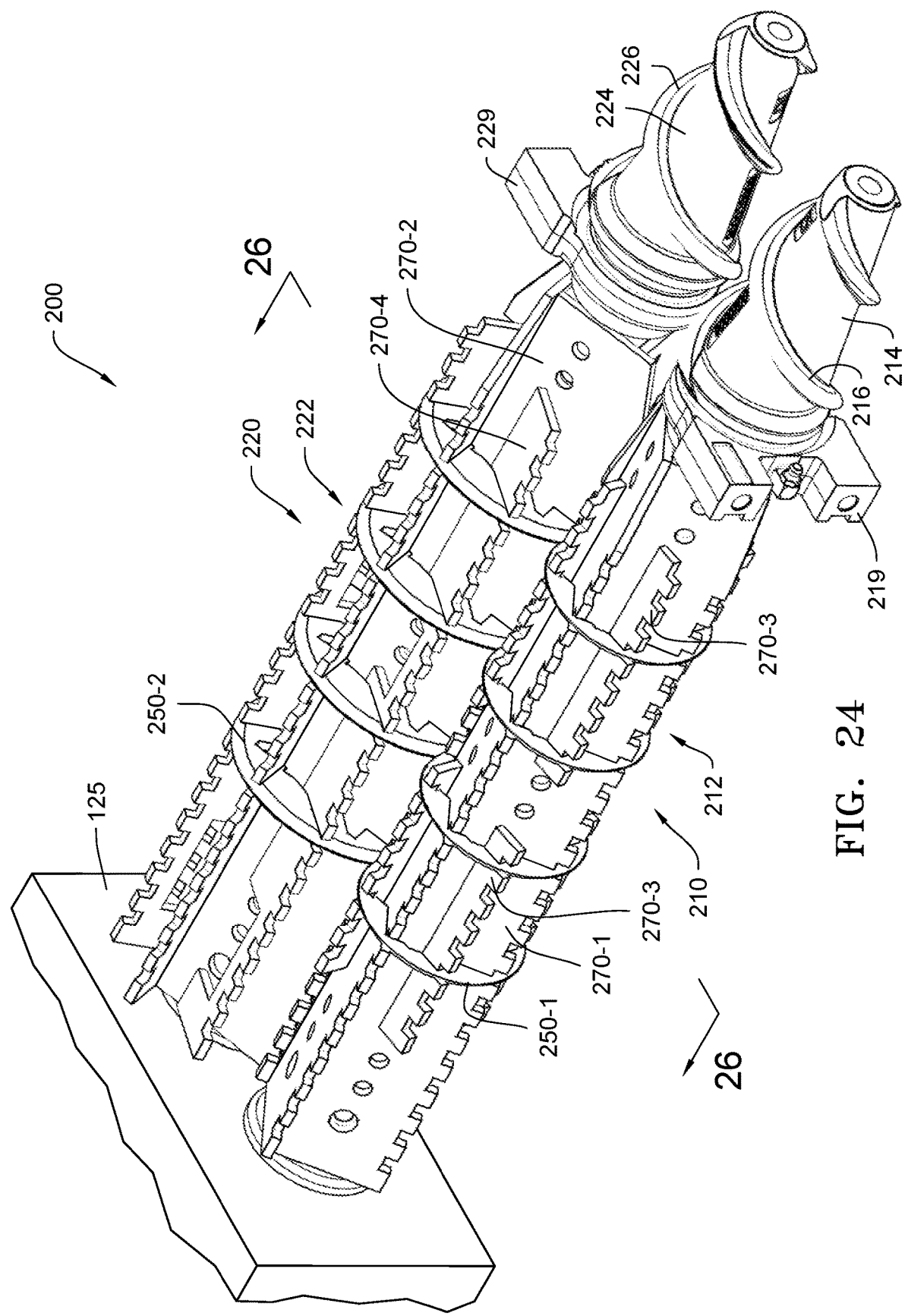
FIG. 24 is a front perspective view of another embodiment of a differential speed stalk roll assembly.

FIG. 24 is a front perspective view of another embodiment of a differential speed stalk roll assembly 200. As with the previous embodiment, this embodiment of the stalk roll assembly 200 comprises laterally spaced first and second stalk rolls 210, 220 each having a main body 212, 222 and a head or nose 214, 224. However, in this embodiment, the main bodies 212, 222 of the stalk rolls 210, 220 are comprised of interchangeable modular body segments 270 in the form of steel plates 270-1, 270-2, 270-3, 270-4, which when assembled form radially spaced longitudinally disposed flutes 240. One or both of the main bodies 212, 222 may include one or more knives 250 spaced longitudinally along their length and defining one or more knife planes normal to the axes of rotation 217, 227 of the stalk rolls 210, 220.

The embodiment of the stalk roll assembly 200 is depicted as being adapted for use the type of row unit 30 produced by the Brazilian OEM, Vence Tudo, which utilizes stalk roll shafts 213, 223 (FIG. 25) supported by forward brackets 219, 229 which mount to frame members (not shown) of the row unit 30 to rotationally support the forward ends of the stalk rolls 210, 220 as opposed to the cantilevered configuration of the previous embodiment. However, it should be appreciated that the features of the stalk roll assembly 200 as described in more detail below are suitable for use with any OEM row unit and adapted to the particular stalk roll shaft configurations of such OEM's row units.

Figure 25:
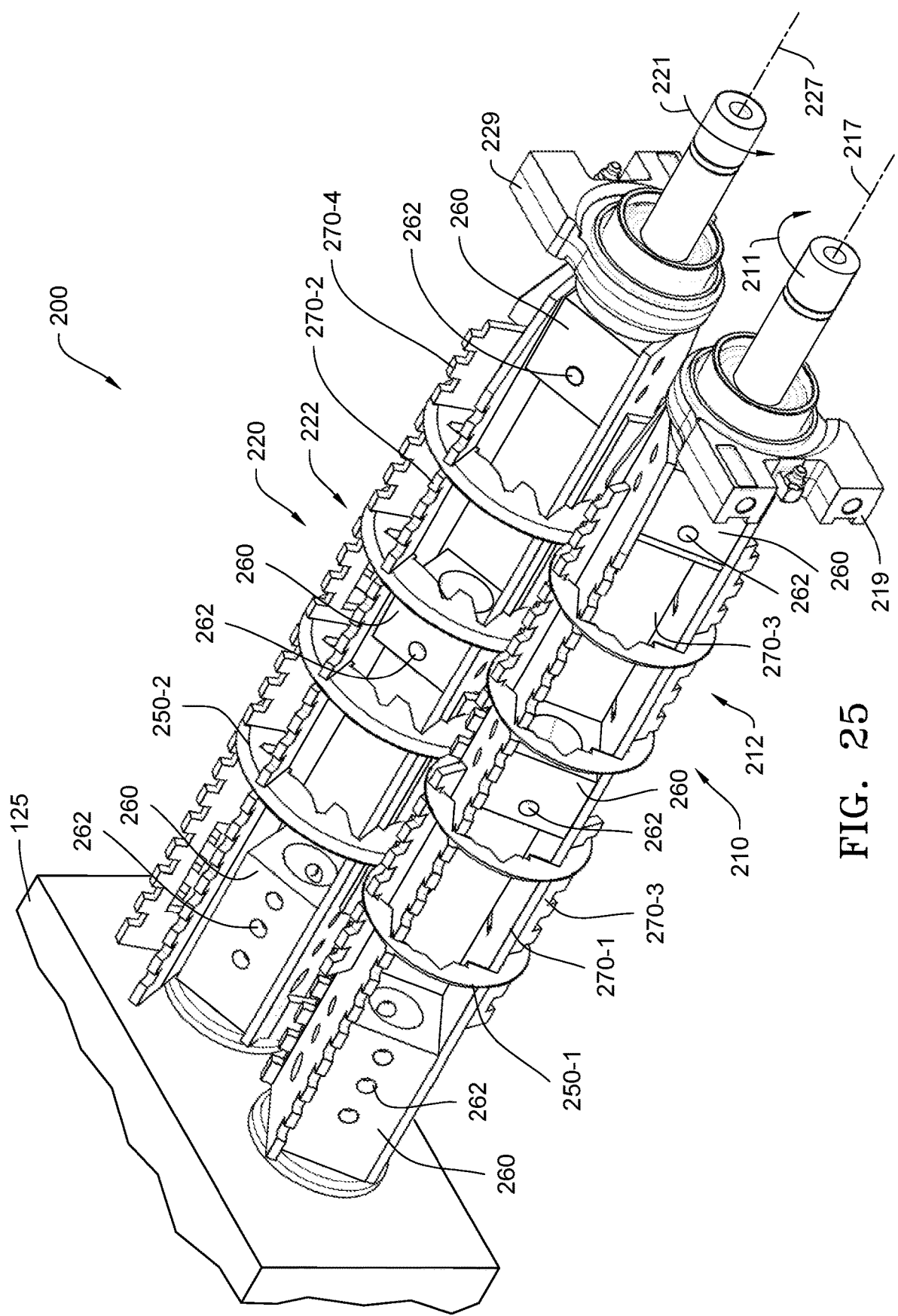
FIG. 25 is a perspective view of the differential speed stalk roll assembly of FIG. 24 with some of the modular body segments removed to show the interior of the stalk rolls.
Figure 26:
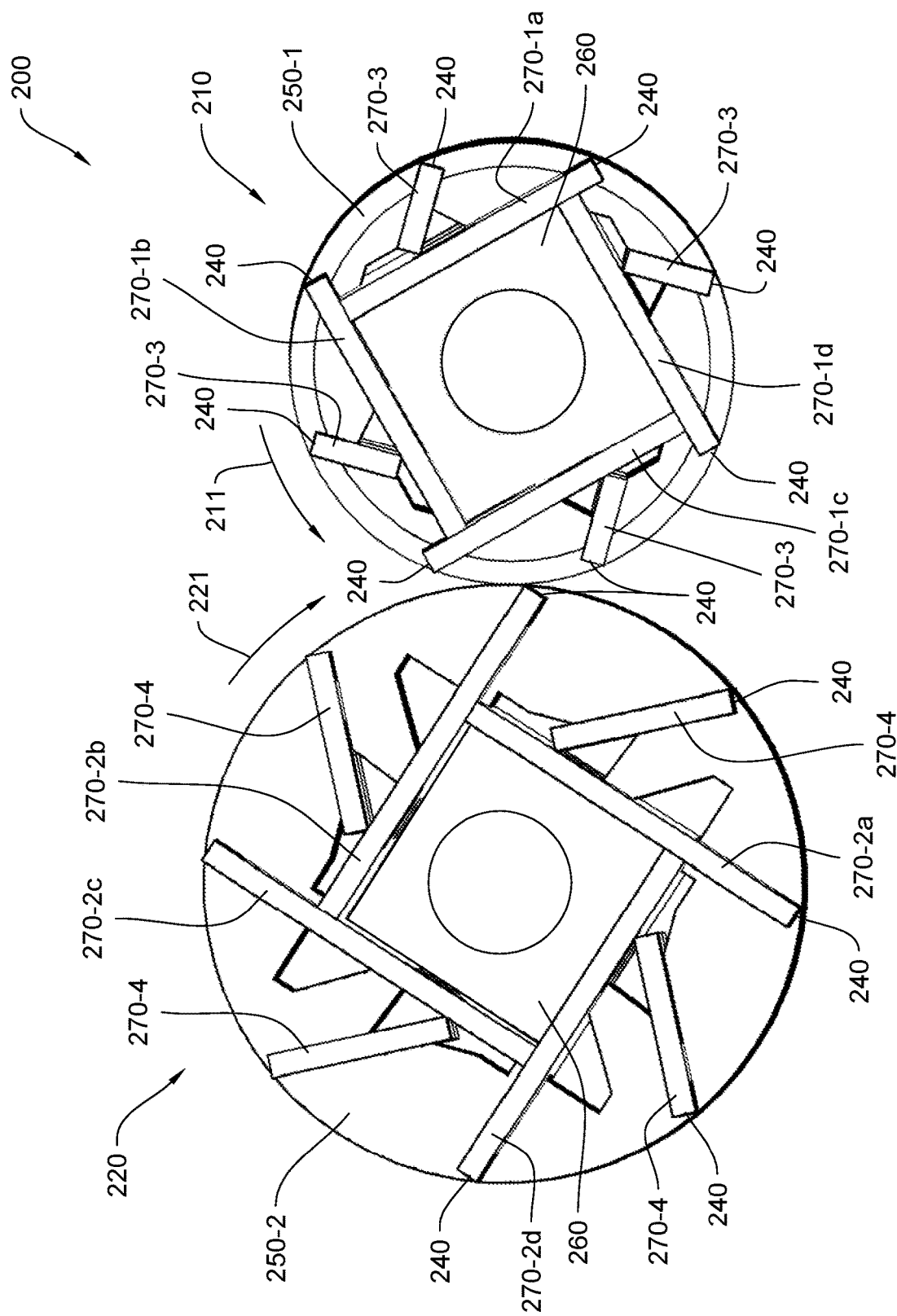
FIG. 26 is a cross-sectional view of the stalk roll assembly as viewed along lines 26-26 of FIG. 24.

FIG. 26 is cross-sectional view of the differential speed stalk roll assembly 200 as viewed along lines 26-26 of FIG. 24. The head 214, 224 may have helically arranged flights 216, 226 which function as augers to pull the cornstalk rearwardly between the main bodies 212, 222 as the stalk rolls rotate counter to one another as indicated by arrows 211, 221. As best viewed in FIG. 25, like the previous embodiment, each stalk roll 210, 220 receives and is rigidly secured to laterally spaced shafts 213, 223 coupled to the gearbox 125 which drives rotation of the shafts about their respective longitudinal axis 217, 227.

Continuing to refer to FIG. 25, it should be appreciated that one of the modular body segments 270 is removed to show the interior of each of the stalk rolls 210, 220. Referring to FIGS. 25-28, the body segment plates 270-1, 270-2 include apertures 272 which align with mating apertures 262 of internal blocks 260 disposed at the rearward, intermediate and forward ends of the stalk rolls 210, 220. Bolts (not shown) threadably secure the steel plates 270-1, 270-2 to the blocks 260 through the apertures 272, which align with internally threaded apertures 262 in the blocks 260. The blocks 260 at the rearward ends are rotationally fixed to the shafts 213, 223 so as to rotate therewith. The blocks 260 at the forward end are rotationally fixed to forward shafts 213, 223 rotationally supported by the forward brackets 219, 229. The blocks 260 may have three, four, five, six or more sides depending on the desired configuration of the stalk rolls 210, 220 and the modular body segments 270 will vary in shape accordingly. As best viewed in FIG. 26, in one embodiment the stalk roll 210 comprises four modular segments 270-1a, 270-1b, 270-1c, 270-1d secured to each side of the four sided block 260. Likewise the stalk roll 220 comprises four modular segments 270-2a, 270-2b, 270-2c, 270-2d secured to each side of the four sided block 260.

Figure 27:
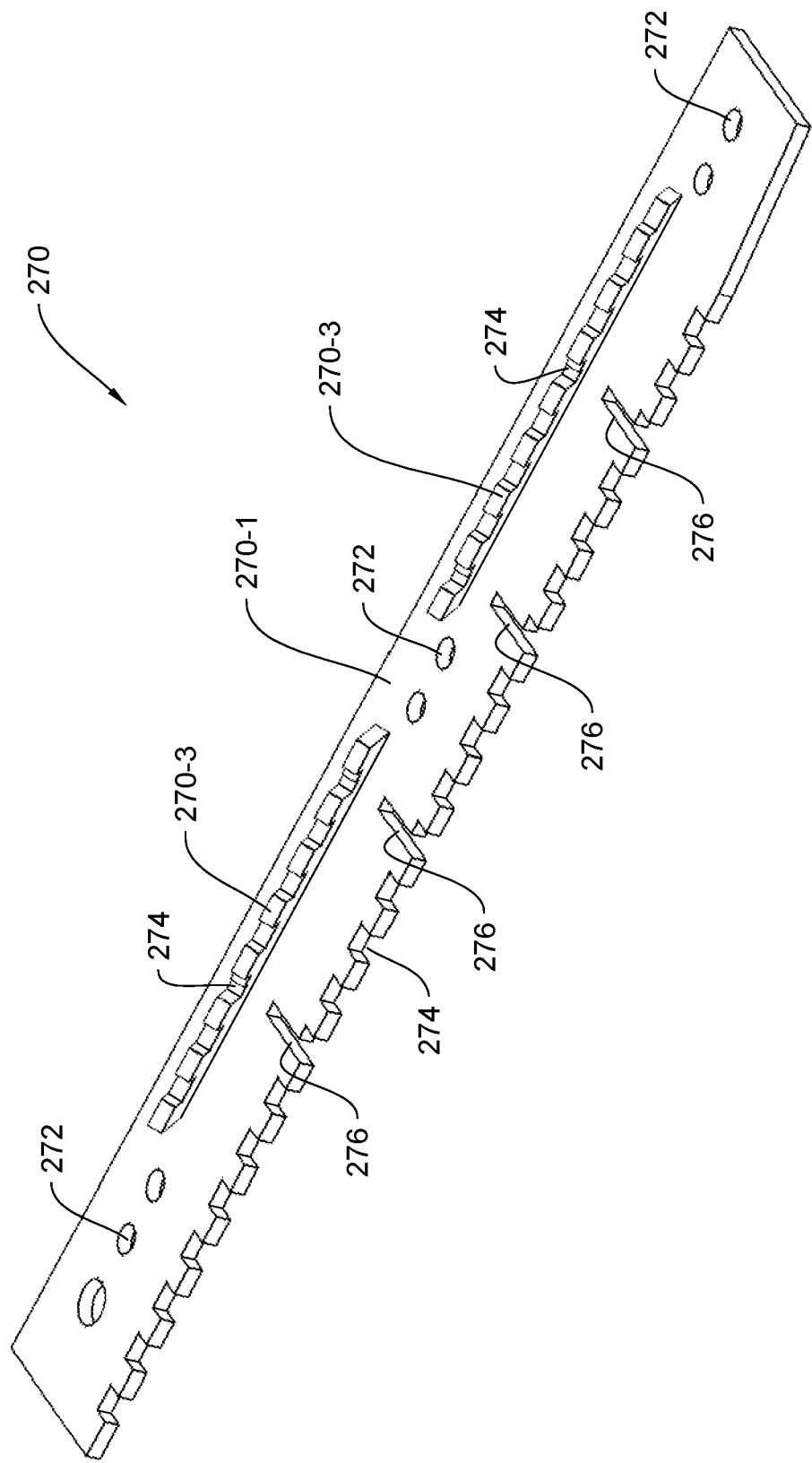
FIG. 27 is a perspective view of an embodiment the body segments of the smaller diameter stalk roll with intermediate plates attached thereto
Figure 28:
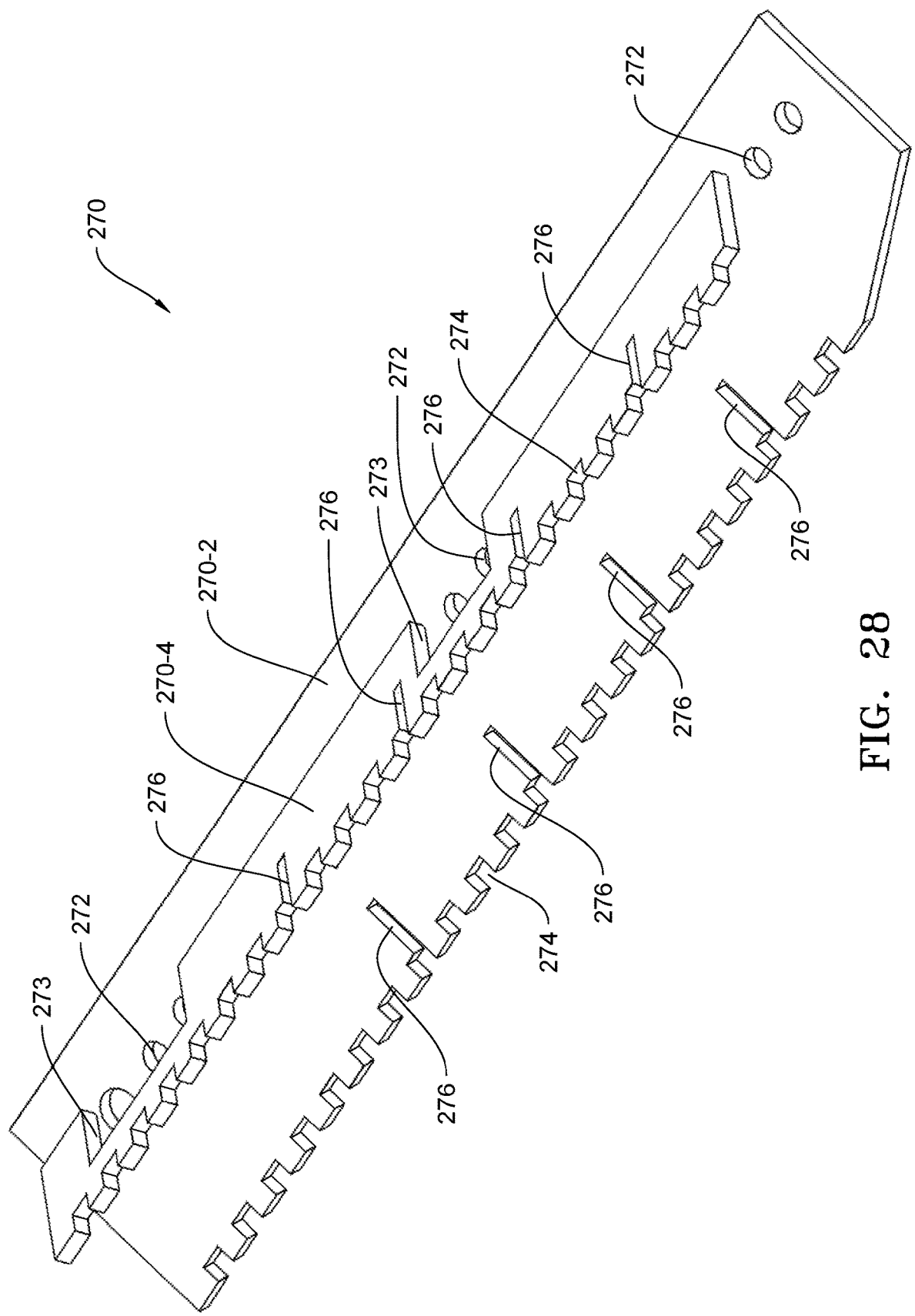
FIG. 28 is a perspective view of an embodiment the body segments of the larger diameter stalk roll with intermediate plates attached thereto.
Figure 29C:
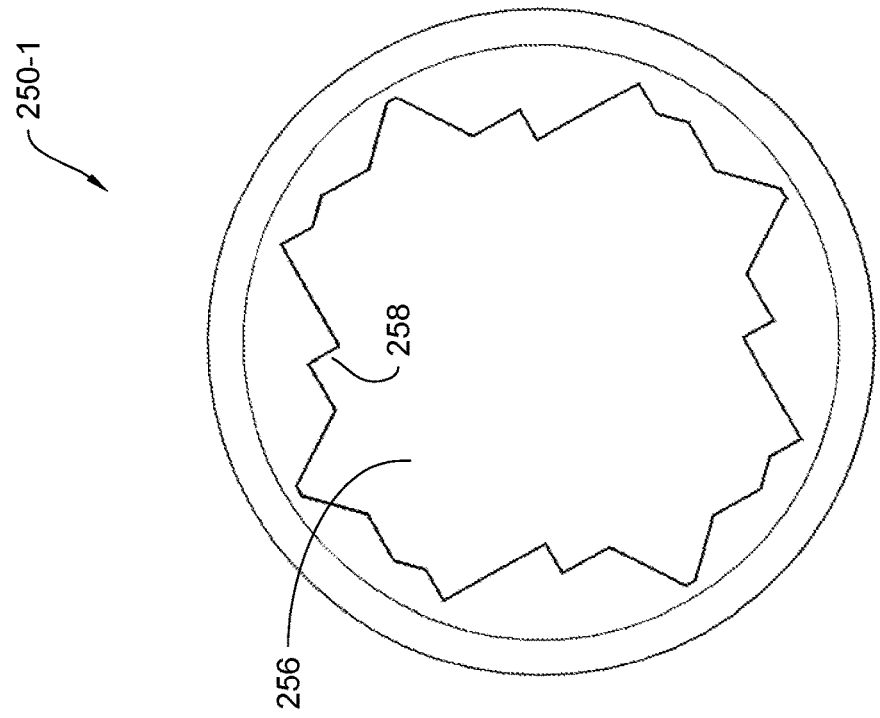
FIGS. 29A-29C are perspective and plan views of the annular knife of the smaller diameter stalk roll of FIG. 24.
Figure 29A:
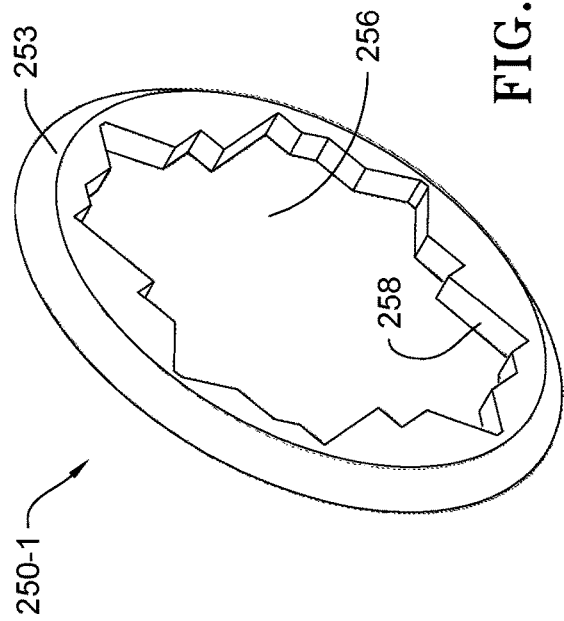
Figure 29B:
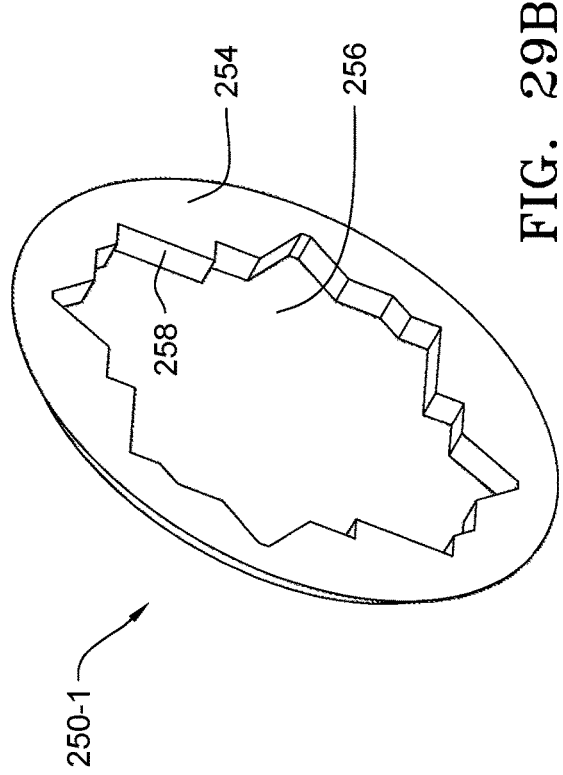
Figure 30C:
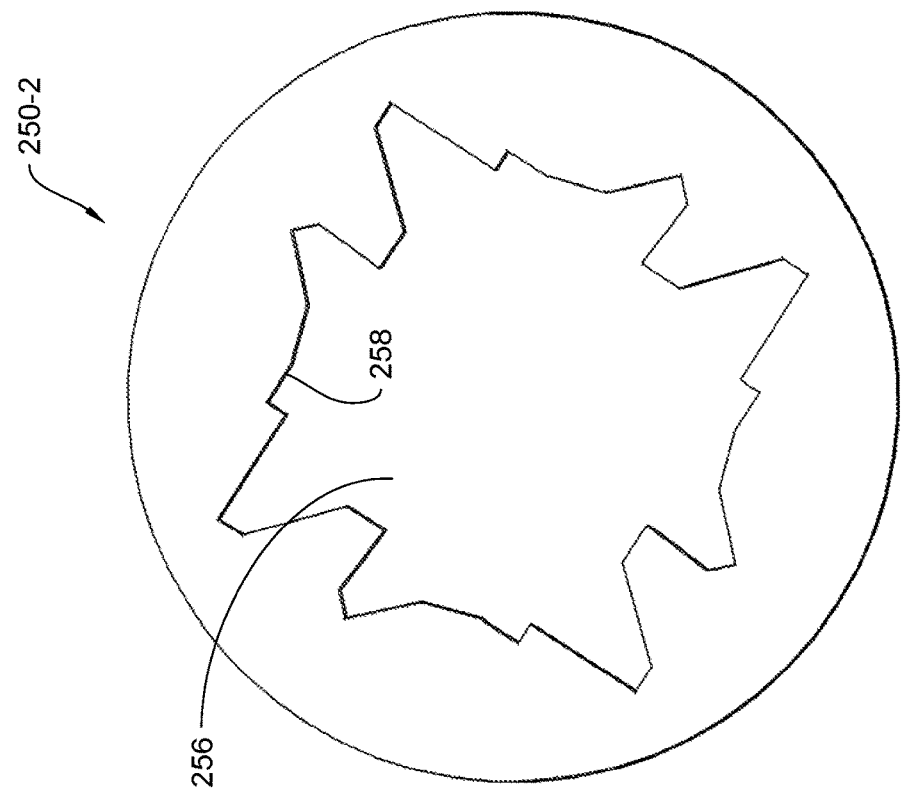
FIGS. 30A-30C are perspective and plan views of the annular knife of the larger diameter stalk roll of FIG. 24.
Figure 30A:
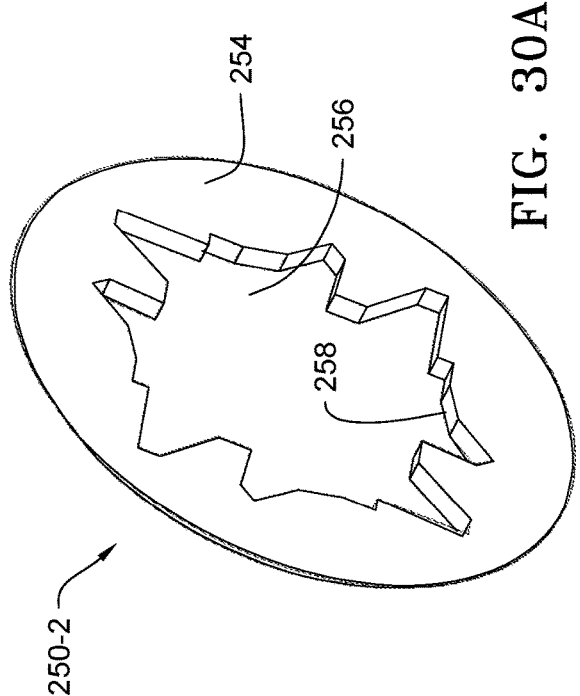
Figure 30B:
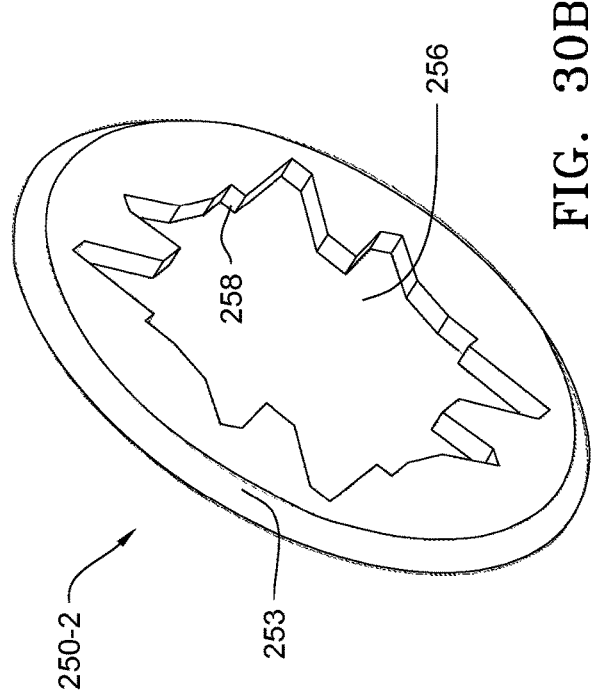

FIG. 27 is a perspective view of an embodiment of the modular body segment plates 270-1 of the first stalk roll 210. FIG. 28 is a perspective view of an embodiment of the modular body segment plates 270-2 of the second stalk roll 220. The modular body segment plates 270-1, 270-2 may have intermediate plates 270-3, 270-4 welded at an angle thereto such that when the body segment plates 270-1, 270-2 are mounted to the blocks 260 as shown in cross-sectional view of FIG. 26, the outer ends of the body segment plates 270-1, 270-2, 270-3, 270-4 are substantially equally radially spaced. The lengths of the intermediate plates 270-3, 270-4 are sized to avoid interference with the bolts securing the plates 270-1, 270-2 to the blocks 260. Alternatively, the intermediate plates 270-1, 270-2 may include cutouts 273 so the bolts can be inserted or removed without interference.

The plate segments 270-1 comprising the first stalk roll body 212 have a substantially uniform width from the rearward end to the forward end until slightly tapering to a narrower width at the forward most end (see FIG. 27). The plate segments 270-2 comprising the second stalk roll body 222 also have a substantially uniform width from rearward end to the forward end until tapering at a sharper slope at the forward most end (see FIG. 28). The different widths of the plates 270-1, 270-2 result in the first stalk roll body 212 having a smaller diameter (as defined by circumscribing a circle around the outermost ends of radially spaced plates 270-1) than the diameter of second stalk roll body 222 (as defined by circumscribing a circle around the outermost ends of radially spaced plates 270-2). This difference in diameters between the first and second stalk roll bodies 212, 222 results in a differential speed between the first and second stalk rolls 210, 220 which produces the desired shredding of the cornstalks 16 during harvesting as described above in connection with the stalk roll assembly 100. It should also be appreciated that the tapered forward most ends of the plate segments 270-1, 270-2 results in a wider spacing between the flutes 240 of the stalk roll bodies 212, 222 at the forward end such that the larger diameter portions of the cornstalks toward the ground surface are able to feed more readily into the stalk roll assembly 200. Additionally, the tapered forward ends of the stalk roll bodies 212, 222 results in less of a differential speed between the first and second stalk rolls 210, 220 at their forward most ends which also allows the cornstalks to enter the stalk roll assembly 200 before the action of the differential speeds becomes aggressive.

It should be appreciated that if more or less differential speed is desired between the adjacent first and second stalk rolls 210, 220, the widths of the plate segments 270 comprising their main bodies 212, 222 may varied to achieve the desired differential speed ratio of between 1:1.1 and 1:1.6 as previously identified to produce the differential speeds between their respective outer peripheries within a range of about ten percent (10%) to about fifty percent (50%).

The outer ends of the body segment plates 270-1, 270-2, 270-3, 270-4 forming the radially spaced longitudinal flutes 240 may include notches or teeth 274 which serve to bite into or grip the cornstalk as the flutes rotate to pull the cornstalk downwardly toward the stripper plates 40, 42 for stripping the ears 14 from the stalks 16. As the teeth 274 grip and bite into the stalks, the differential speeds of the rotating stalk rolls rip, shred and crush the stalks as the stalks pass between the outer peripheries or outer surfaces of the adjacent stalk rolls. As with the previous embodiments, the spacing, width, depth and shape of the notches 274 may vary among the modular body segments so the appropriate body segment may be selected and interchanged depending on crop moisture levels, brittleness of the stalks, weather and other crop conditions. For example rather than square notches, the notches may be v-shaped to form pointed teeth, or the notches may be rounded or any combination thereof. Additionally, the plates may be bent along the length of the notched end thereby forming hooked flutes.

It should be appreciated that in embodiments in which the lateral spacing of the stalk rolls 210, 220 and the size of the respective body segments 270 are such that the flutes 240 of the first and second stalk rolls 210, 220 overlap one another, the number of flutes 240 and the radial spacing of the flutes may be matched and oriented such that the flutes are timed to avoid the flutes contacting or interfering with one another as they rotate. Additionally, or alternatively, the notches 274 of the flutes 240 may be longitudinally offset between the adjacent stalk rolls such that the projecting notches of the flutes 240 of one of the stalk rolls are received within the valleys of the notches of the adjacent stalk roll.

FIGS. 29A-29C and FIGS. 30A-30C show embodiments of the knives 250-1, 250-2 for the stalk rolls 210, 220. The respective knives 250-1, 250-2 have an outer diameter that is substantially the same as the outermost circumscribed diameter of the respective stalk roll bodies 212, 222 to avoid the knives forming a wall as described in connection with the previous embodiment. Each knife 250-1, 250-2 has a beveled face 253 and a flat face 254. As best viewed in FIGS. 24-26, the knives are oriented on the respective stalk rolls such that their flat faces 254 are back-to-back thereby forming a cutting plane. Each knife 250-1, 250-2 has an aperture 256 with an internal periphery 258. The internal peripheries 258 are configured to permit the body segments 270-1, 270-2, 270-3, 270-4 to be inserted through the apertures 256 one at a time and rotated in place. For example, when assembling the first stalk roll body 212, one body segment 270-1a is first bolted to the blocks 260. The knives 250-1 are placed over the forward end of the shaft 213 and the first plate 270-1a through the apertures 256 of the knives 250-1 and the knives 250-1 are then fitted into the slots 276 of the first plate 270-1a. The second plate 270-1b is inserted through the apertures 256 of each of the knives 250-1 and rotated in place with the knives 250-1 received in the slots 276 of the second plate 270-1b. Each additional body segment 270-1c, 270-1d is sequentially inserted through the blade apertures 256 and rotated into place with each of the knives 250-1 being received within the slots 276 of the body segments 270-1c, 270-1d. Each body segment 270-1 is bolted to the blocks 260 through the aligned apertures 272 in the plates with the apertures 262 in the blocks 260.

Figure 31:
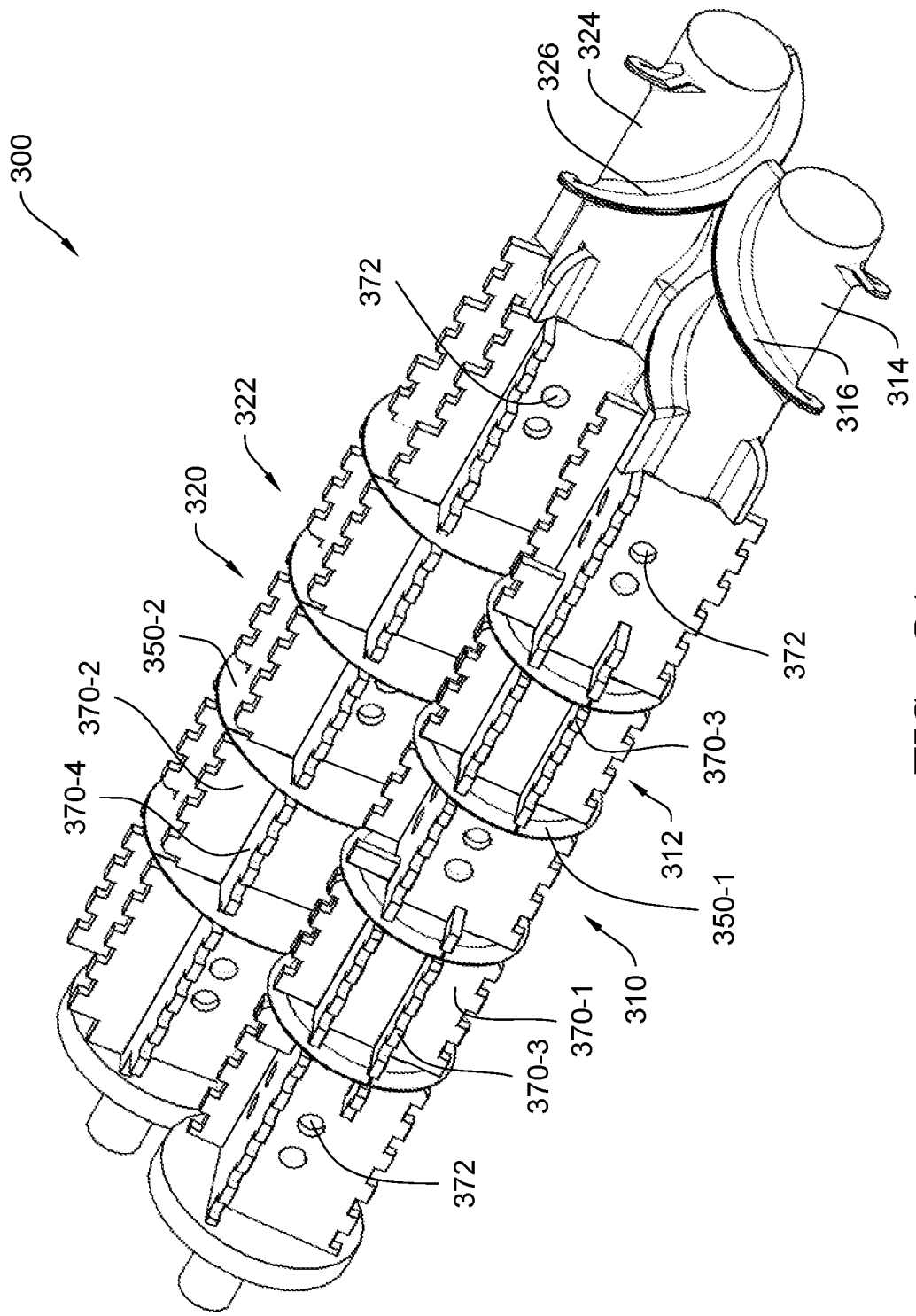
FIG. 31 is a front perspective view of another embodiment of a differential speed stalk roll assembly.

FIG. 31 is a front perspective view of another embodiment of a differential speed stalk roll assembly 300. As with the previous embodiments, the stalk roll assembly 300 comprises first and second laterally spaced stalk rolls 310, 320 each having a main body 312, 322 and a head or nose 314, 324. In this embodiment, the main bodies 312, 322 of the stalk rolls 310, 320 are also comprised of interchangeable modular body segments 370 in the form of steel plates 370-1, 370-2, 370-3, 370-4, which when assembled form radially spaced longitudinally disposed flutes 340. One or both of the main bodies 312, 322 may include one or more knives 350 spaced longitudinally along their length and defining one or more knife planes normal to the axes of rotation 313, 323 of the main bodies 312, 322.

Figure 32:
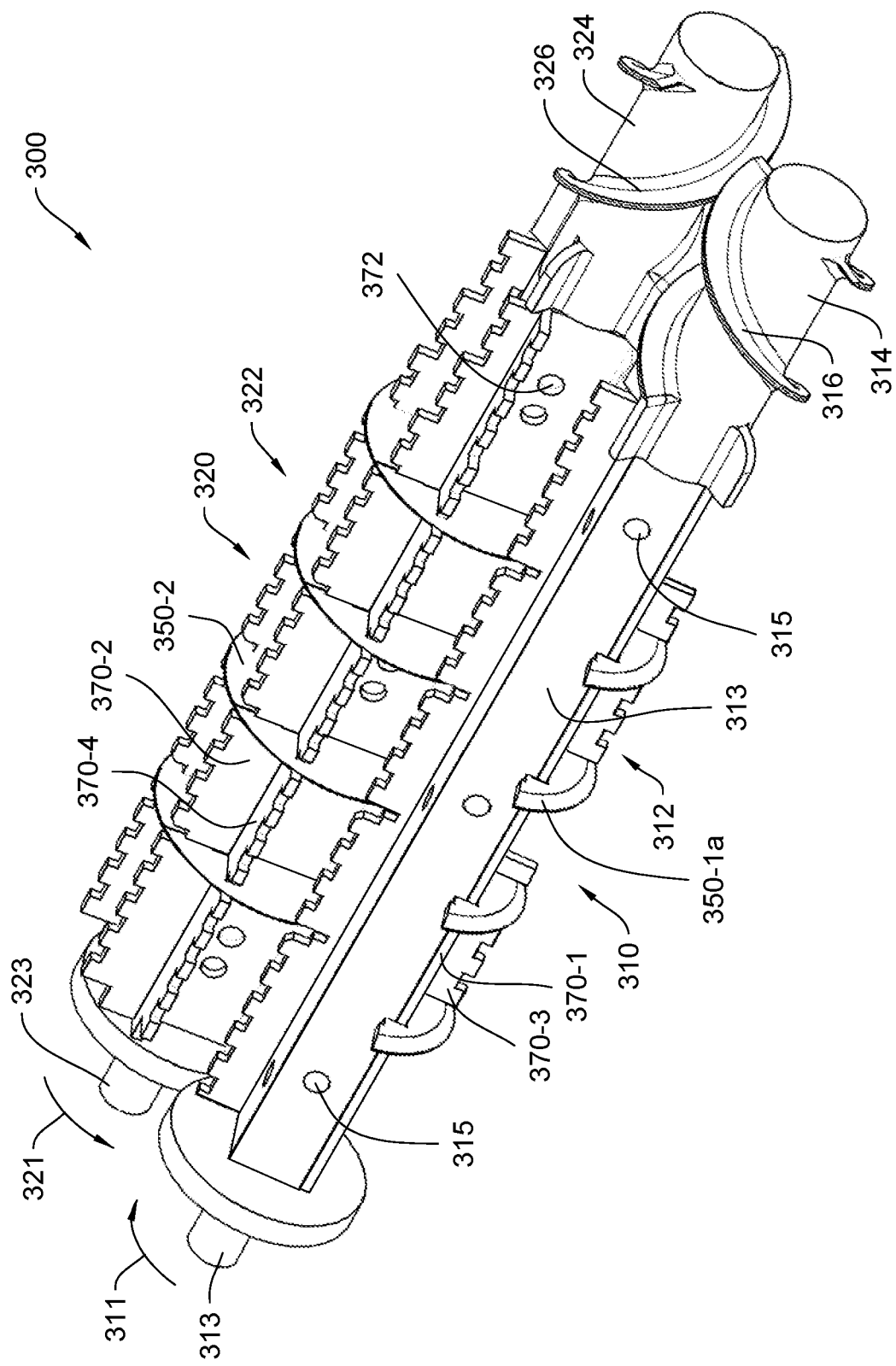
FIG. 32 is a perspective view of the differential speed stalk roll assembly of FIG. 31 with some of the modular body segments removed to show the interior of the stalk rolls.

The embodiment of the stalk roll assembly 300 is depicted as being adapted for use the type of row unit 30 produced by the German OEM, Geringhoff, which utilizes square stalk roll shafts 313, 323 (FIG. 32). Again, it should be appreciated that the features of the stalk roll assembly 300 as described in more detail below are suitable for use with any OEM row unit and adapted to the particular stalk roll shaft configurations of such OEM row units.

Figure 33:
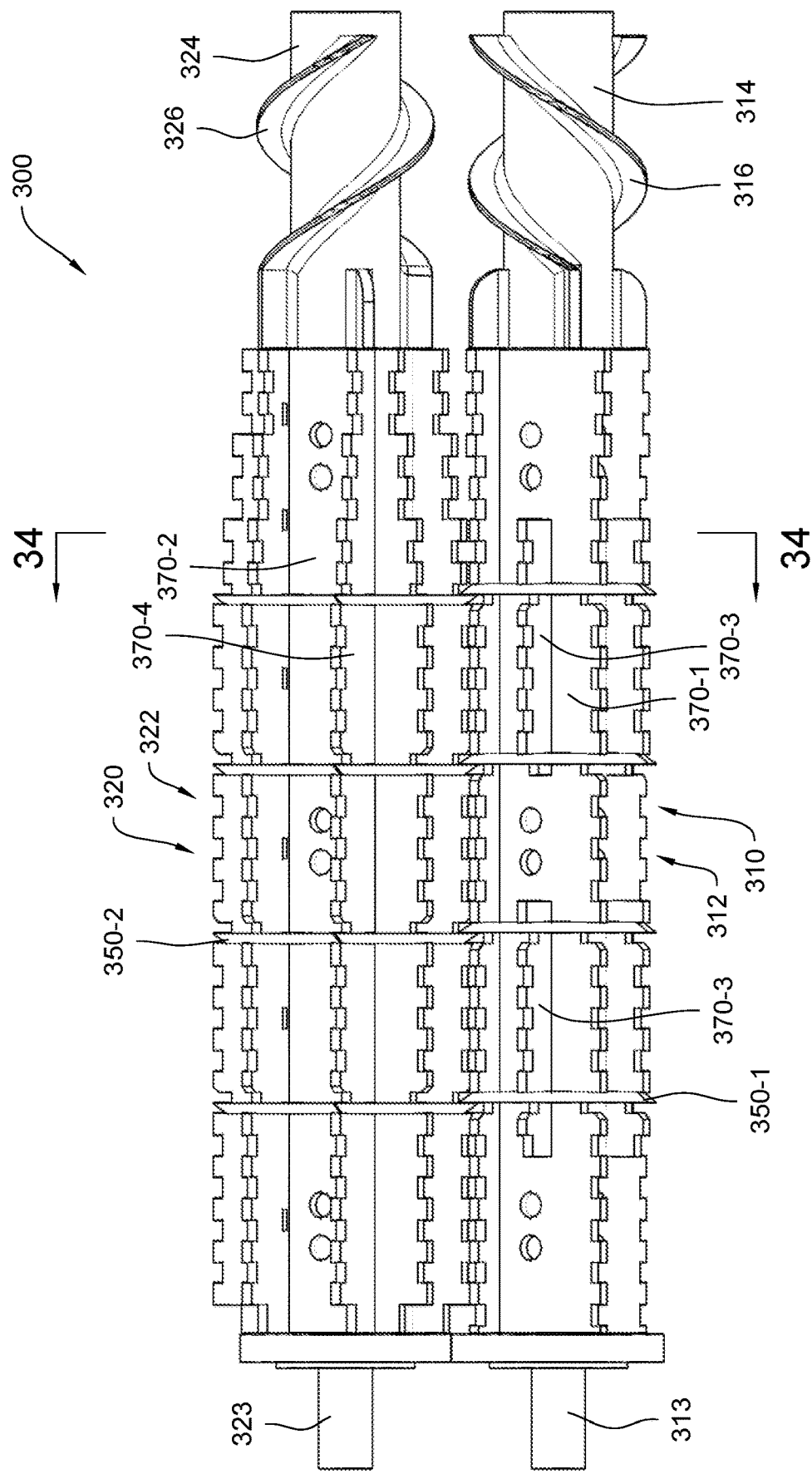
FIG. 33 is a top plan view of the stalk roll assembly of FIG. 31.
Figure 34:
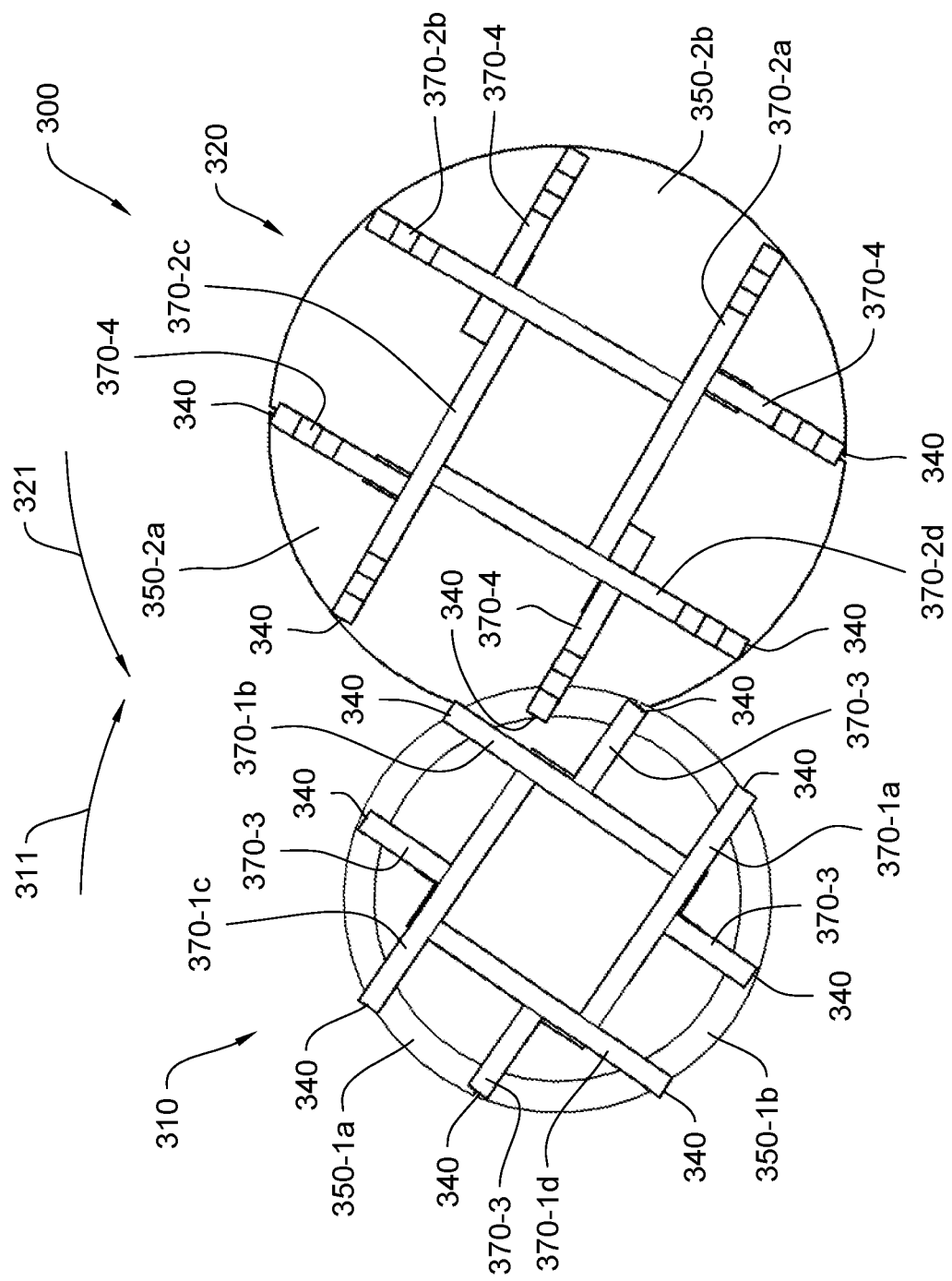
FIG. 34 is a cross-sectional view of the stalk roll assembly as viewed along lines 34-34 of FIG. 33

FIG. 34 is cross-sectional view of the differential speed stalk roll assembly 300 as viewed along lines 34-34 of FIG. 33. The head 314, 324 may have helically arranged flights 316, 326 which function as augers to pull the cornstalk rearwardly between the main bodies 312, 322 as the stalk rolls rotate counter to one another as indicated by arrows 311, 321. As best viewed in FIG. 32, like the previous embodiment, each stalk roll 310, 320 receives and is rigidly secured to laterally spaced shafts 313, 323 coupled to the gearbox 125 which drives rotation of the shafts about their respective longitudinal axis 317, 327.

Continuing to refer to FIG. 32, it should be appreciated that one of the modular body segment plates 370 is removed to show the interior of the smaller diameter stalk roll 310. The interior of the larger diameter stalk roll 320 is the same. Referring to FIGS. 31-38, the body segment plates 370-1, 370-2 include apertures 372 which align with mating apertures 315 of the stalk roll shafts 313, 323. Nuts and bolts (not shown) threadably secure the steel plates 370-1, 370-2 to the stalk roll shafts 313, 323 through the apertures 372 in the plates and apertures 315 in the stalk roll shafts 313, 323. As best viewed in FIG. 34, in one embodiment the stalk roll 310 comprises four modular segments 370-1a, 370-1b, 370-1c, 370-1d secured to each side of the four-sided stalk roll shaft 313. Likewise the stalk roll 320 comprises four modular segments 370-2a, 370-2b, 370-2c, 370-2d secured to each side of the four-sided stalk roll shaft 323. It should be appreciated that if the OEM stalk roll shafts 313, 323 had a different number of sides, the size and shape of the modular body segments plates 370 would be sized and configured accordingly.

Figure 35:
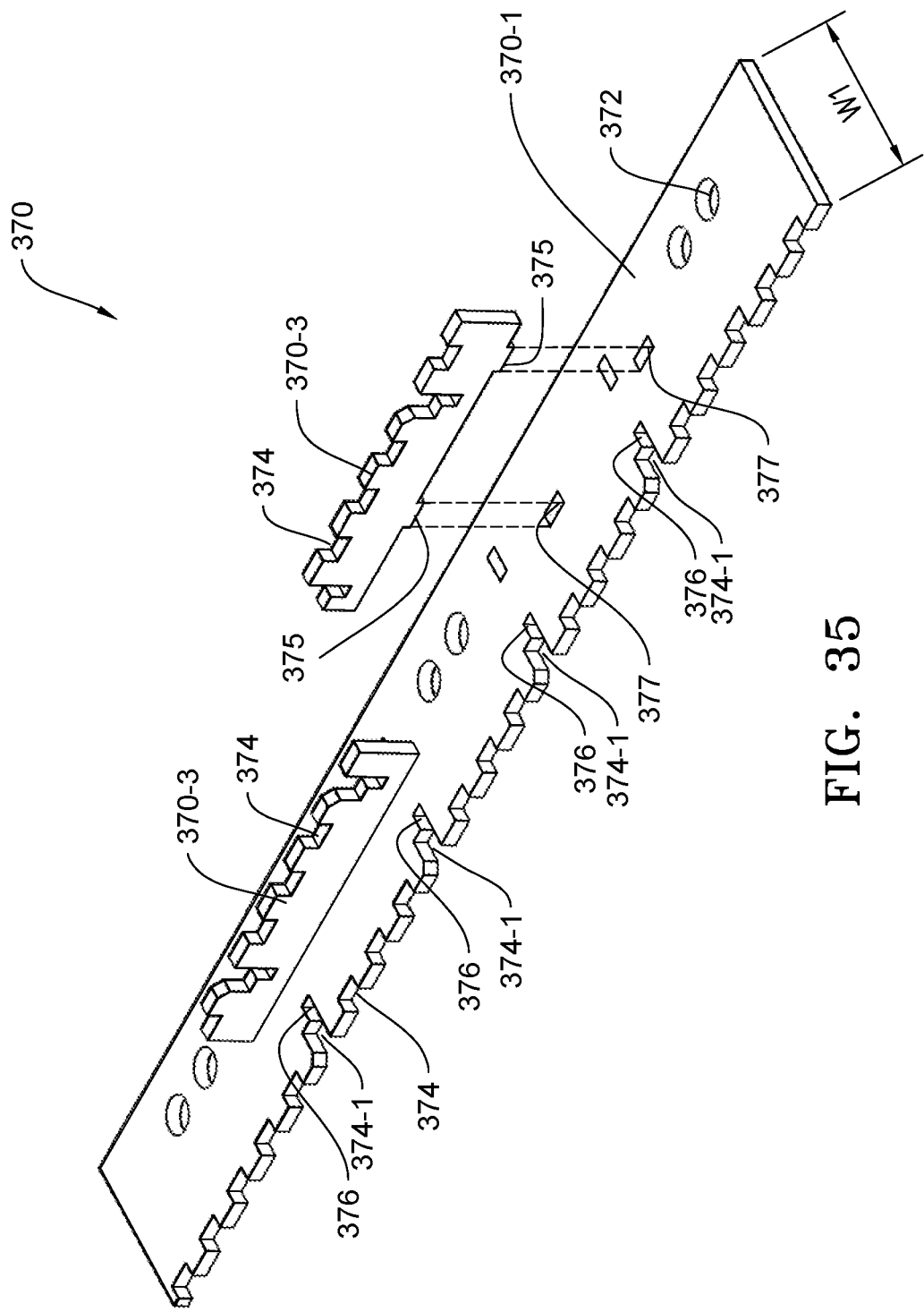
FIG. 35 is a perspective view of an embodiment the body segments of the smaller diameter stalk roll with intermediate plates attached thereto
Figure 38A:
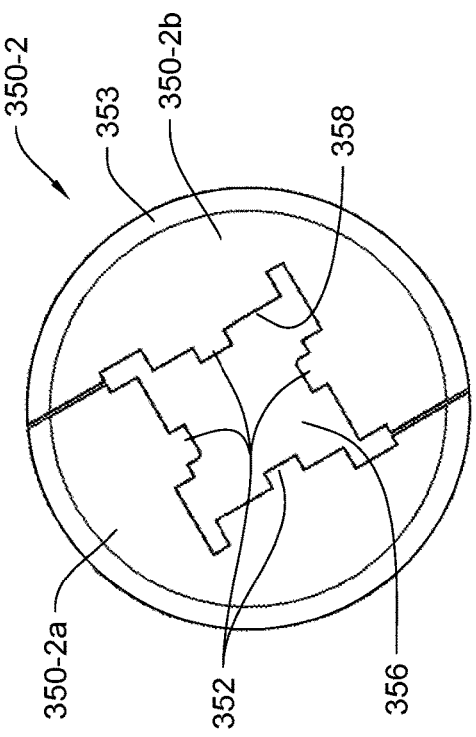
FIG. 38A is a front elevation view of an embodiment of the knife blade of the larger diameter stalk roll of FIG. 31 showing the knife blade segments together.
Figure 38B:
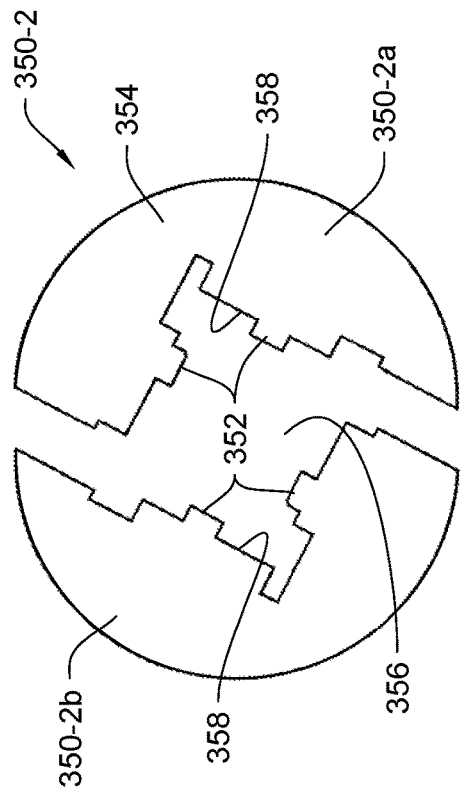
FIG. 38B is a rear elevation view of the knife blade segments of FIG. 38A shown separated.
Figure 37A:
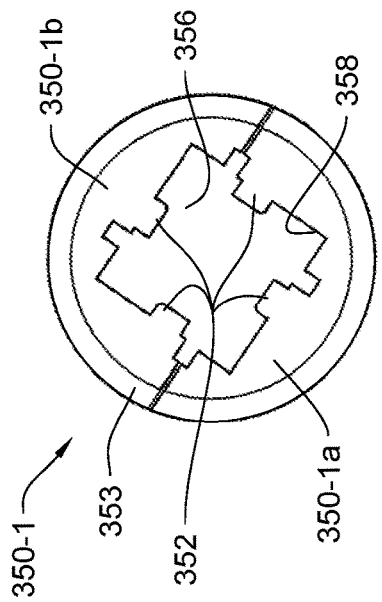
FIG. 37A is a front elevation view of an embodiment of the knife blade of the smaller diameter stalk roll of FIG. 31 showing the knife blade segments together.
Figure 37B:
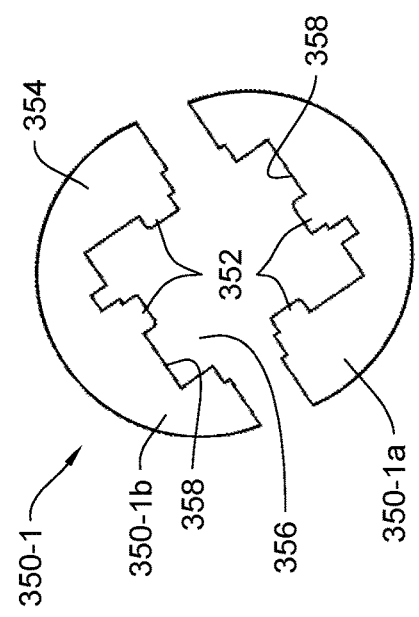
FIG. 37B is a rear elevation view of the knife blade segments of FIG. 37A shown separated.

FIG. 35 is a perspective view of an embodiment of the modular body segment plates 370-1 of the first stalk roll 310. FIG. 36 is a perspective view of an embodiment of the modular body segment plates 370-2 of the second stalk roll 320. The modular body segment plates 370-1, 370-2 may have intermediate plates 370-3, 370-4 welded thereto such that when the body segment plates 370-1, 370-2 are mounted to the stalk roll shafts 313, 323 as shown in cross-sectional view of FIG. 34, the outer ends of the body segment plates 370-1 and 370-3 and the outer ends of body segment plates 370-2, 370-4 are substantially equally radially spaced. The lengths of the intermediate plates 370-3, 370-4 are sized to avoid interference with the bolts securing the plates 370-1, 370-2 to the stalk roll shafts 313, 323. To aid in proper placement of the intermediate plates 370-3, 370-4 onto the respective main body plates 370-1, 370-2, the intermediate plates 370-3, 370-4 may include tabs 375 which are received within mating openings 377 in the main body plates 370-1, 370-2.

The plate segments 370-1 comprising the first stalk roll body 312 have a substantially uniform width from the rearward end to the forward end (see FIG. 35). The plate segments 370-2 comprising the second stalk roll body 322 also have a substantially uniform width from rearward end to the forward end until tapering toward the forward most end (see FIG. 36). The different widths of the plates 370-1, 370-2 result in the first stalk roll body 312 having a smaller diameter (as defined by circumscribing a circle around the outermost ends of radially spaced plates 370-1) than the diameter of second stalk roll body 322 (as defined by circumscribing a circle around the outermost ends of radially spaced plates 370-2). This difference in diameters between the first and second stalk roll bodies 312, 322 results in a differential speed between the first and second stalk rolls 310, 320 which produces the desired shredding of the cornstalks 16 during harvesting as described above in connection with the stalk roll assembly 100. It should also be appreciated that the tapered forward most end of the plate segments 370-2 results in a wider spacing between the flutes 340 of the stalk roll bodies 312, 322 at the forward end such that the larger diameter portions of the cornstalks toward the ground surface are able to feed more readily into the stalk roll assembly 300. Additionally, the tapered forward end of the stalk roll body 322 results in less of a differential speed between the first and second stalk rolls 310, 320 at their forward most ends which also allows the cornstalks to enter the stalk roll assembly 300 before the action of the differential speeds becomes aggressive.

For example, referring to FIGS. 33, 35 and 36, it may be desirable for the first and second stalk rolls 310, 320 to have the same diameters or about the same diameters at their forward ends such that there is more space between the opposing flutes at the forward end to receive the larger diameter portion of the cornstalks 16 as they enter the stalk roll assembly 300 and such that there is minimal or no differential speed between the stalk rolls at the initial point of entry. But after the initial entry, the diameter of the second stalk roll 320 increases longitudinally rearwardly, in either a gradually increasing taper or a stepped taper until reaching the desired diameter to produce the desired differential speed between the adjacent stalk roll bodies 312, 322. Accordingly, as best shown in FIG. 36, the forward end of the plate segment 370-2 for the second stalk roll 320 is shown as having an initial width "W2" that is substantially the same as the width "W1" (FIG. 35) of the plate segment 370-1 of the first stalk roll 310, and then the plate segment 370-2 gradually increases in width rearwardly in a stepped taper configuration.

It should be appreciated that if more or less differential speed is desired between the adjacent first and second stalk rolls 310, 320, the widths of the plate segments 370 comprising their main bodies 312, 322 may varied to achieve the desired differential speed ratio of between 1:1.1 and 1:1.6 as previously identified to produce the differential speeds between their respective outer peripheries within a range of about ten percent (10%) to about fifty percent (50%).

Continuing to refer to FIGS. 35 and 36, the outer ends of the body segment plates 370-1, 370-2, 370-3, 370-4 forming the radially spaced longitudinal flutes 340 may include notches or teeth 374 which serve to bite into or grip the cornstalk as the flutes rotate to pull the cornstalk downwardly toward the stripper plates 40, 42 for stripping the ears 14 from the stalks 16. As the teeth 374 grip and bite into the stalks, the differential speeds of the rotating stalk rolls rip, shred and crush the stalks as the stalks pass between the outer peripheries or outer surfaces of the adjacent stalk rolls. As with the previous embodiments, the spacing, width, depth and shape of the notches 374 may vary among the modular body segments so the appropriate body segment may be selected and interchanged depending on crop moisture levels, brittleness of the stalks, weather and other crop conditions. For example rather than square notches, the notches may be v-shaped to form pointed teeth, or the notches may be rounded or any combination thereof. Additionally, the plates may be bent along the length of the notched end thereby forming hooked flutes.

It should be appreciated that in embodiments in which the lateral spacing of the stalk rolls 310, 320 and the size of the respective body segments 370 are such that the flutes 340 of the first and second stalk rolls 310, 320 overlap one another, the number of flutes 340 and the radial spacing of the flutes may be matched and oriented such that the flutes are timed to avoid the flutes contacting or interfering with one another as they rotate. Additionally, or alternatively, the notches 374 of the flutes 340 may be longitudinally offset between the adjacent stalk rolls such that the projecting notches of the flutes 340 of one of the stalk rolls are received within the valleys of the notches of the adjacent stalk roll.

FIGS. 37A-37B and FIGS. 38A-38B show alternative embodiments of the knives 350-1, 350-2 for the stalk rolls 310, 320. In this embodiment, the knives 350-1, 350-2 are split into two half-segments 350-1a, 350-1b and 350-2a and 350-2b, respectively, to permit easier assembly of the stalk roll bodies 312, 322 described below. The respective knives 350-1, 350-2 have an outer diameter that is substantially the same as the outermost diameter of the respective stalk roll bodies 312, 322 for the reasons described in connection with the first embodiment. Each knife 350-1, 350-2 has a flat face 354 and a beveled face 353. As best viewed in FIG. 33, the knives are oriented on the respective stalk rolls such that their flat faces 354 are back-to-back thereby forming a cutting plane. Each knife 350-1, 350-2 has an aperture 356 with an internal periphery 358. The internal peripheries 358 are configured to receive the body segments 370-1, 370-2, 370-3, 370-4. Additionally, the interior peripheries 358 of the apertures 356 may include inwardly projecting tabs 352, which are received in mating slots 379 in the plates 370-1, 370-2. The knife blades 350 are also received within slots 376 of the modular body segment plates 370-1, 370-2, 370-3, 370-4.

It should be appreciated that by splitting the knife blades into two mating half-segments, the stalk roll body segments 312, 322 are easier to assemble, by eliminating the need to insert the modular plate segments through the apertures of the full circle blades and rotating the body segments in place as described in connection with the stalk roll assembly 200 described above. For example, by splitting the blades 350 into two segments, two of the body segment plates 370-1a, 370-1b can be sub-assembled with half-blade segments 350-1a, and then that subassembly can be bolted to the stalk roll shaft 313. Then a second subassembly, comprising the other body segment plates 370-1c, 370-1d can be subassembled with the other half-blade segment 350-1b then bolted to the stalk roll shaft 313. Once bolted to the stalk roll shafts, the tabs 352 within the slots 397 and the blade edges within the slots 376 rigidly fix the half-blade segments in place with the respective stalk roll bodies 312, 322.

It has been found that it may be desirable for the blades 350-1, 350-2 of the adjacent stalk roll bodies 312, 322 to overlap one another back-to-back by ⅛ to ¼ inch (3 to 6 mm), to produce the desired pinch points or cutting planes 130 for cutting or severing the cornstalks 16. It should be appreciated that a plurality of longitudinally aligned knives or blades 350 will form a plurality of pinch points or cutting planes substantially normal to the longitudinal axis 317, 327 of the shafts 313, 323. Referring to FIGS. 33-36, it should be appreciated that the modular plate segments 370-1, 370-2, 37-3, 370-4 include a notch 374-1, to avoid interference of the blades 350-1, 350-2 with the plate segments 370 of the adjacent stalk roll bodies 312, 322.

Figure 39:
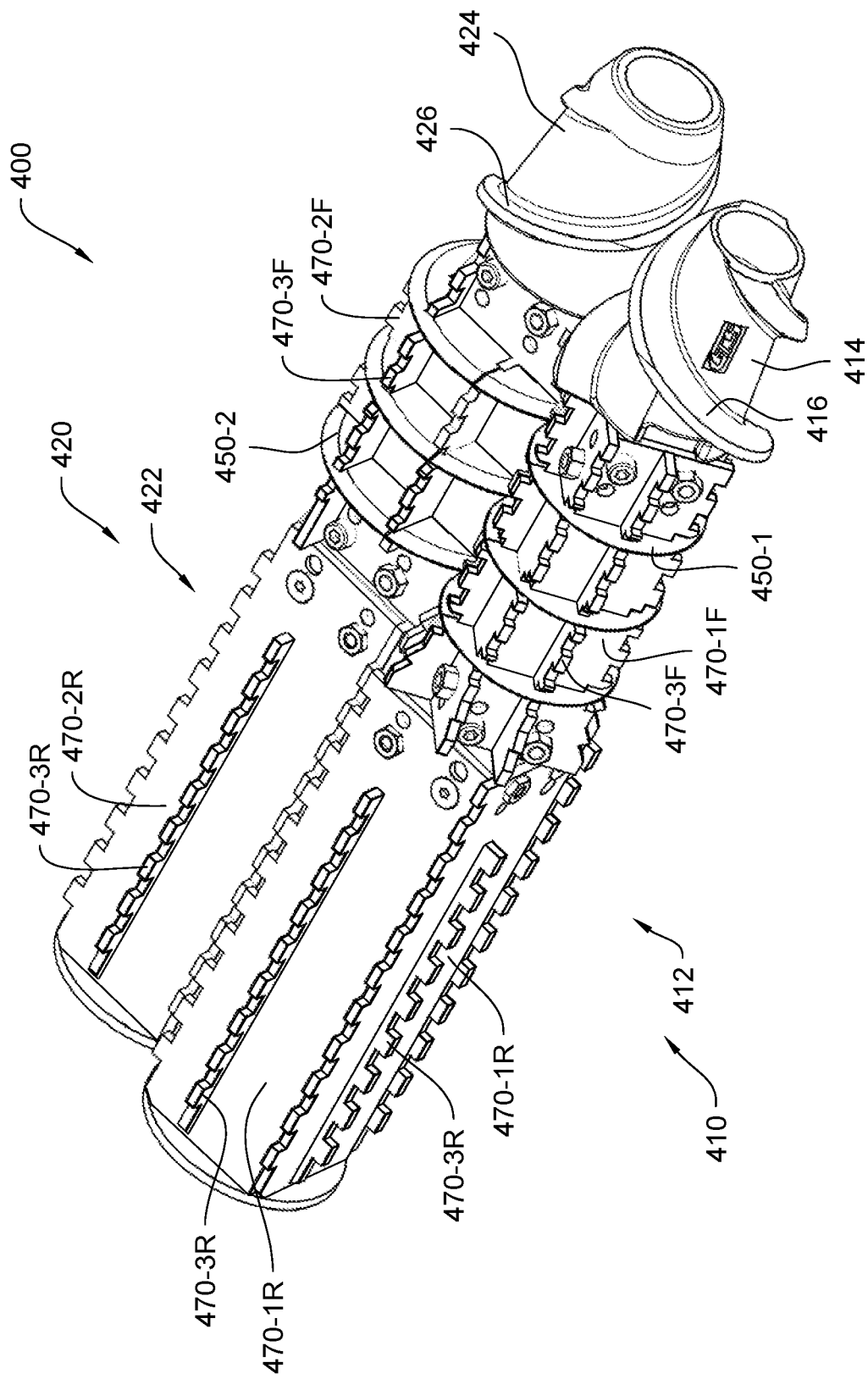
FIG. 39 is a front perspective view of another embodiment of a differential speed stalk roll assembly.

FIG. 39 is a front perspective view of another embodiment of a differential speed stalk roll assembly 400. As with the previous embodiments, this embodiment of the stalk roll assembly 400 comprise laterally spaced first and second stalk rolls 410, 420 each having a main body 412, 422 and a head or nose 414, 424. In this embodiment, the main bodies 412, 422 of the stalk rolls 410, 420 are also comprised of interchangeable modular body segments 470 in the form of steel plates, which when assembled form radially spaced longitudinally disposed flutes 440. As in the previously described embodiments, one or both of the main bodies 412, 422 may include one or more knives 450 spaced longitudinally along their length and defining one or more knife planes normal to the axes of rotation 417, 427 of the main bodies 412, 422.

Figure 40:
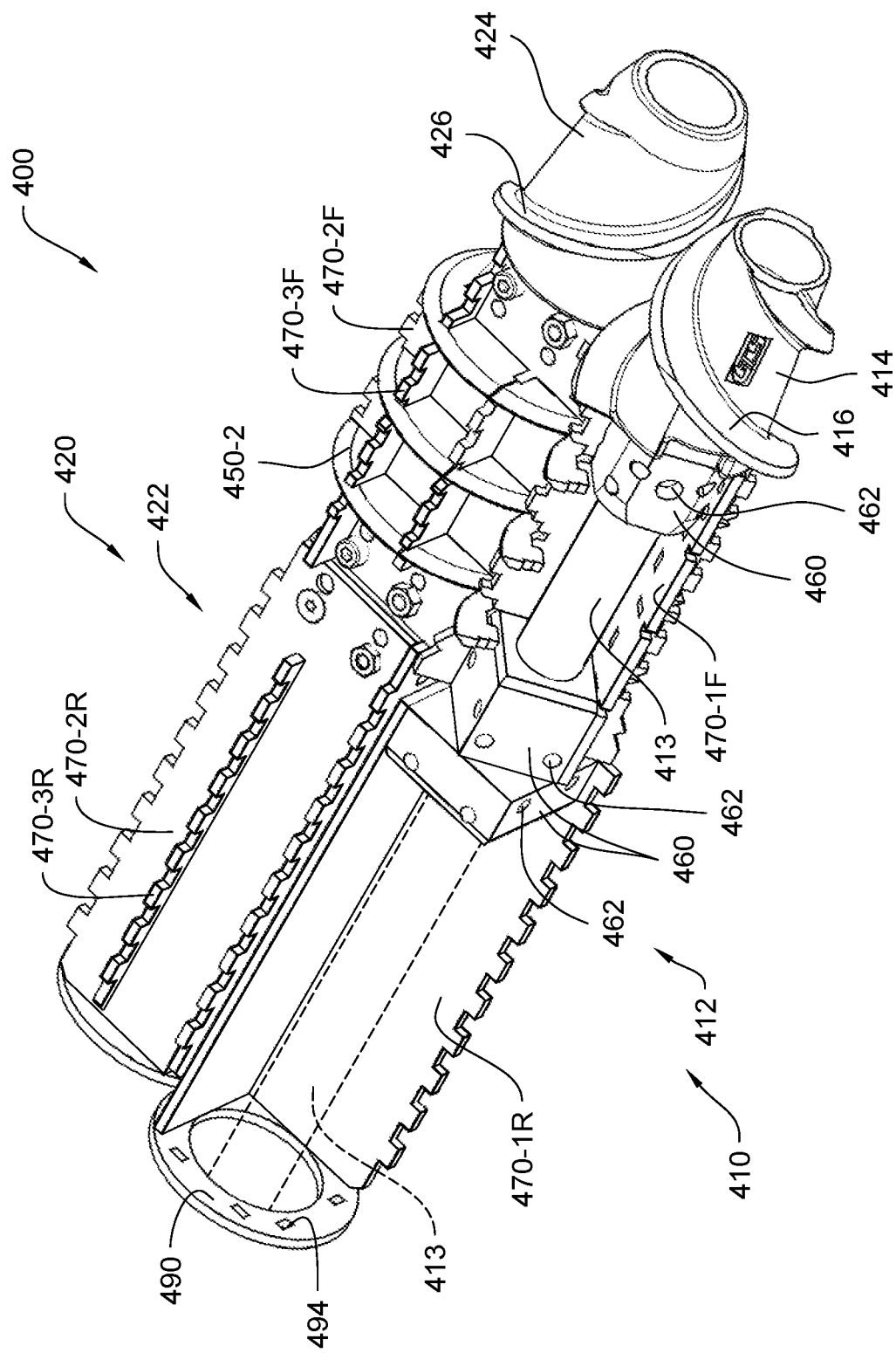
FIG. 40 is a perspective view of the differential speed stalk roll assembly of FIG. 39 with some of the modular body segments removed to show the interior of the stalk rolls.
Figure 41:
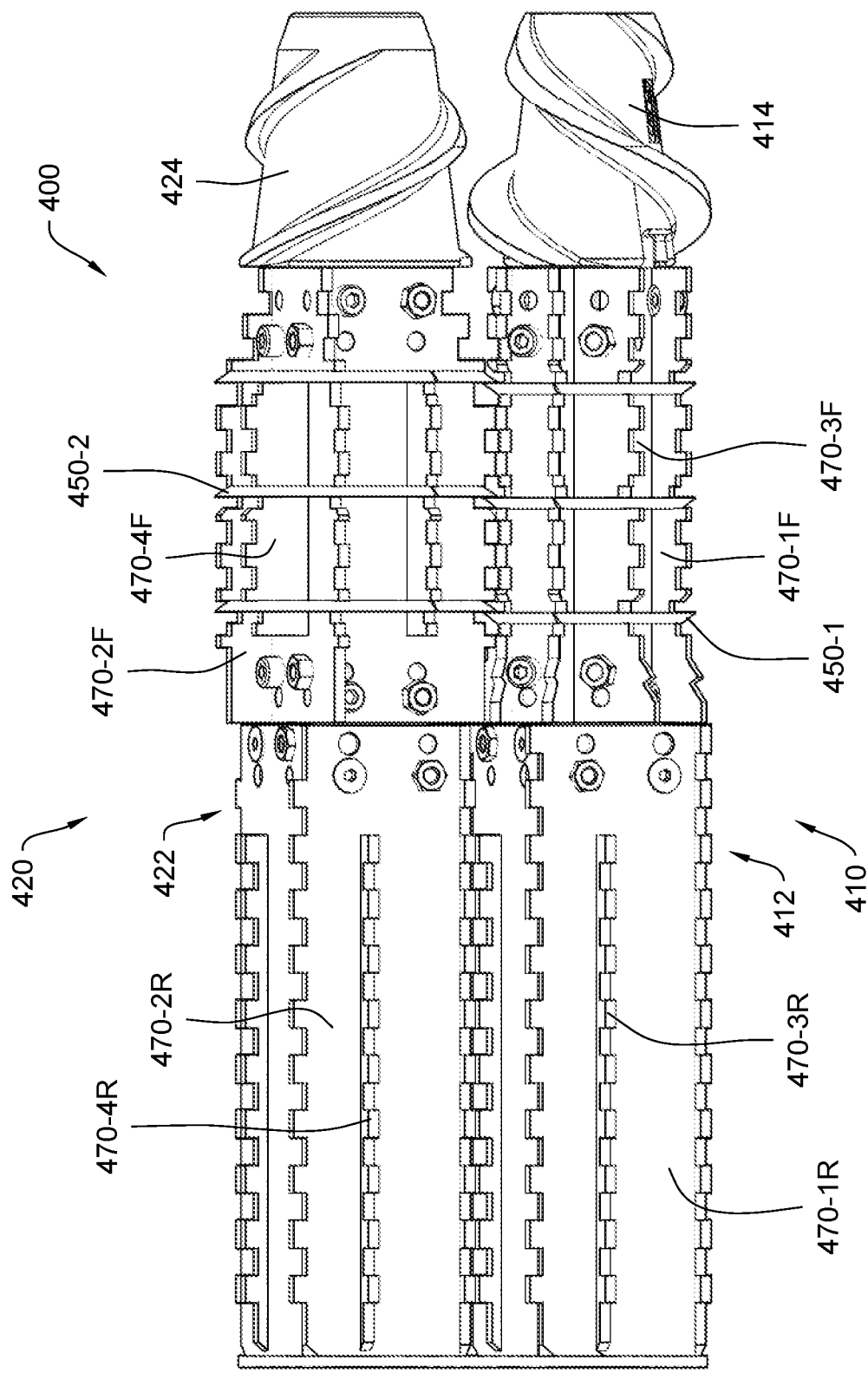
FIG. 41 is a top plan view of the stalk roll assembly of FIG. 39.

The embodiment of the stalk roll assembly 400 is depicted as being adapted for use the type of row unit 30 produced by the OEM, Deere and Company (John Deere), which utilizes cylindrical stalk roll shafts 413, 423 of different diameters (FIG. 40). Again, it should be appreciated that the features of the stalk roll assembly 400 as described in more detail below are suitable for use with any OEM row unit and adapted to the particular stalk roll shaft configurations of such OEM row units.

As in the previous embodiment, the head 414, 424 may have helically arranged flights 416, 426 which function as augers to pull the cornstalk rearwardly between the main bodies 412, 422 as the stalk rolls rotate counter to one another as indicated by arrows 411, 421. As best viewed in FIG. 40, like the previous embodiment, each stalk roll 410, 420 receives and is rigidly secured to laterally spaced shafts 413, 423 coupled to the gearbox 125 which drives rotation of the shafts about their respective longitudinal axis 417, 427.

Continuing to refer to FIG. 40, it should be appreciated that one of the modular body segment plates 470 is removed to show the interior of the first stalk roll 410. The interior of the second stalk roll 420 is the same. Referring to FIGS. 39-46, the body segment plates 470 include apertures 472 which align with mating apertures 462 of internal blocks 460 disposed at the rearward, intermediate and forward ends of the stalk rolls 410, 420. Bolts threadably secure the steel plates 470 to the blocks 460 through the apertures 472, which align with internally threaded apertures 462 in the blocks 460. The rearward ends of the plates 470 are rotationally fixed to the ring 490 via tabs 492 (FIG. 44) projecting from the rearward end of the plates 470 which are received in slots 494 within the ring 490. The blocks 460 may have three, four, five, six or more sides depending on the desired configuration of the stalk rolls 410, 420 and the modular body segments 470 will vary in shape accordingly, likewise the tabs 492 on the plates 470 and slots 494 in the ring 490 will vary.

FIGS. 42-43 are perspective views of an embodiment of the modular body plate segments 470 comprising the first stalk roll 410. The plate segments 470 for the first stalk roll 410 include a rear plate segment 470-1R and a forward plate segment 470-1F. The rear plate segment 470-1R has a substantially uniform rearward width "W1-R" from the rearward end toward the forward end for about ½ the length of the first body 412 (see FIG. 39). The rear plate segment 470-1R may have an intermediate plate 470-3R welded thereto such that when the segment plates 470-1R are mounted to the blocks 460, the outer ends of the plate segments 470-1R and 470-3R are substantially equally radially spaced. The forward plate segment 470-1F has a substantially uniform forward width "W1-F" from its forward end toward the rearward end for about ⅓ the length of the first body 412 before flaring outwardly and rearward to provide an intermediate width "W1-I" as a transition between the narrower forward width W1-F to the wider rearward width W1-R. The forward plate segment 470-1F may have an intermediate plate 470-3F welded thereto such that when the segment plates 470-1F are mounted to the blocks 460, the outer ends of the plate segments 470-1F and 470-3F are substantially equally radially spaced. To aid in proper placement of the intermediate plates 470-3R, 470-3F onto the respective main body plates 470-1R, 470-1F, the intermediate plates 470-3R, 470-3F may include tabs 475 which are received within mating openings 477 in the main body plates 470-1R, 470-1F.

FIGS. 44-45 are perspective views of an embodiment of the modular body plate segments 470 comprising the second stalk roll 420. The plate segments 470 for the second stalk roll 420 include a rear plate segment 470-2R and a forward plate segment 470-2F. The rear plate segment 470-2R has a substantially uniform rearward width "W2-R" from the rearward end toward the forward end for about ½ the length of the second body 422 (see FIG. 39). The rear plate segment 470-2R may have an intermediate plate 470-4R welded thereto such that when the segment plates 470-2R are mounted to the blocks 460, the outer ends of the plate segments 470-2R and 470-4R are substantially equally radially spaced. The forward plate segment 470-2F has a substantially uniform intermediate width "W2-I" that is substantially the same as the rearward width W2-R which continues from its rearward end toward the forward end before tapering inwardly to the forward most end to a forward width W2-F. The forward width W2-F is substantially the same width as the forward width W1-F of the first stalk roll body 410. The forward plate segment 470-2F may have an intermediate plate 470-4F welded thereto such that when the segment plates 470-2F are mounted to the blocks 460, the outer ends of the plate segments 470-2F and 470-4F are substantially equally radially spaced. To aid in proper placement of the intermediate plates 470-4R, 470-4F onto the respective main body plates 470-2R, 470-2F, the intermediate plates 470-4R, 470-4F may include tabs 475 which are received within mating openings 477 in the main body plates 470-2R, 470-2F.

Thus, in this embodiment, because the diameters (as defined by circumscribing a circle around the outermost ends of radially spaced plates 470) along the rearward ½ of the length of the first and second stalk roll bodies 412, 422 are the same (i.e., W1-R=W2-R) there is no differential speed between the first and second stalk roll bodies 412, 422 along their rearward ½ length. However, there will be a differential speed between the first and second stalk rolls 410, 420 across most of their forward length due to their different diameters (as defined by circumscribing a circle around the outermost ends of radially spaced plates 470). It should be appreciated that along the flared transition portion of the first stalk roll 410, the differential in the speed between the first and second stalk roll bodies 412, 422 will reduce as the width of the plate 470-1F transitions from its forward width W1-F to the intermediate width W1-I. Likewise, as the second stalk roll body 422 transitions from its rearward width W2-R to its forward width W2-F, the differential in the speed will decrease to little or no differential speed at the forward most end of the stalk roll bodies 412, 422 where the forward width W1-F of the first stalk roll body 412 equals the forward width W2-F of the second stalk roll body 422. The varying differential speeds along the length of the stalk rolls 410, 420 may better shred or fracture the cornstalks as the diameter of the cornstalk changes as it feeds through the stalk roll assembly 400.

It should be appreciated that if more or less differential speed is desired between the adjacent first and second stalk rolls 410, 420, the widths of the plate segments 470 comprising their main bodies 412, 422 may be varied to achieve the desired differential speed ratio of between 1:1.1 and 1:1.6 as previously identified to produce the differential speeds between their respective outer peripheries within a range of about ten percent (10%) to about fifty percent (50%).

The outer ends of the body segment plates 470 forming the radially spaced longitudinal flutes 440 may include notches or teeth 474 which serve to bite into or grip the cornstalk as the flutes rotate to pull the cornstalk downwardly toward the stripper plates 40, 42 for stripping the ears 14 from the stalks 16. As the teeth 474 grip and bite into the stalks, the differential speeds of the rotating stalk rolls rip, shred and crush the stalks as the stalks pass between the outer peripheries or outer surfaces of the adjacent stalk rolls. As with the previous embodiments, the spacing, width, depth and shape of the notches 474 may vary among the modular body segments so the appropriate body segment may be selected and interchanged depending on crop moisture levels, brittleness of the stalks, weather and other crop conditions. For example rather than square notches, the notches may be v-shaped to form pointed teeth, or the notches may be rounded or any combination thereof. Additionally, the plates may be bent along the length of the notched end thereby forming hooked flutes.

It should be appreciated that in embodiments in which the lateral spacing of the stalk rolls 410, 420 and the size of the respective body segments 470 are such that the flutes 440 of the first and second stalk rolls 410, 420 overlap one another, the number of flutes 440 and the radial spacing of the flutes may be matched and oriented such that the flutes are timed to avoid the flutes contacting or interfering with one another as they rotate. Additionally, or alternatively, the notches 474 of the flutes 440 may be longitudinally offset between the adjacent stalk rolls such that the projecting notches of the flutes 240 of one of the stalk rolls are received within the valleys of the notches of the adjacent stalk roll.

FIGS. 46A-46B and FIGS. 47A-47B show alternative embodiments of the knives 450-1, 450-2 for the stalk rolls 410, 420. Like the previous embodiment, the knives 450-1, 450-2 are split into two half-segments 450-1a, 450-1b and 450-2a and 450-2b, respectively, to permit easier assembly of the stalk roll bodies 412, 422 as described above in connection with the embodiment of the stalk roll assembly 300. The respective knives 450-1, 450-2 have an outer diameter that is substantially the same as the outermost diameter of the respective stalk roll bodies 412, 422 for the reasons described in connection with the first embodiment. Each knife 450-1, 450-2 has a beveled face 453 and a flat face 454. As best viewed in FIG. 41, the knives are oriented on the respective stalk rolls such that their flat faces 454 are back-to-back thereby forming a cutting plane. Each knife 450-1, 450-2 has an aperture 456 with an internal periphery 458. The internal peripheries 458 are configured to receive the body segments 470-1, 470-2, 470-3, 470-4. Additionally, the interior peripheries 458 of the apertures 456 may include inwardly projecting tabs 452, which are received in mating slots 479 in the plates 470-1, 470-2. The knife blades 450 are also received within slots 476 of the modular body segment plates 470-1, 470-2, 470-3, 470-4.

It has been found that it may be desirable for the blades 450-1, 450-2 of the adjacent stalk roll bodies 412, 422 to overlap one another back-to-back by ⅛ to ¼ inch (3 to 6 mm), to produce the desired pinch point or cutting plane 130 discussed above for cutting or severing the cornstalks 16. Accordingly, referring to FIGS. 41-42, it should be appreciated that the modular plate segments 470-1, 470-2, 470-3, 470-4 include a notch 474-1, to avoid interference of the blades 450-1, 450-2 with the plate segments 470 of the adjacent stalk roll bodies 412, 422.

Various modifications to the embodiments and the general principles and features of the apparatus, systems and methods described herein will be readily apparent to those of skill in the art. Thus, the foregoing description is not to be limited to the embodiments of the apparatus, systems and methods described herein and illustrated in the drawing figures.

The invention claimed is:

1. A differential speed stalk roll assembly mountable to a row unit of a row crop head, comprising:
a first stalk roll comprising a first body mountable to a first shaft rotatable about a first axis of rotation at a first shaft RPM, the first body having an outer diameter with an outer periphery;
a second stalk roll comprising a second body mountable to a second shaft in lateral spaced relation to the first shaft, the second shaft rotatable about a second axis of rotation at a second shaft RPM, the second body having an outer diameter with an outer periphery;
wherein the outer periphery of the second body rotates at a speed greater than the outer periphery of the first body; and
wherein at least one of the first body and second body includes at least one knife defining a knife plane normal to the first and second axis of rotation.

2. The differential speed stalk roll assembly of claim 1, wherein the first shaft RPM and the second shaft RPM are substantially the same, and wherein the outer diameter of the second body is greater than the outer diameter of the first body, such that the speed at which the outer periphery of the second body rotates is greater than the speed at which the outer periphery of the first body rotates.

3. The differential speed stalk roll assembly of claim 1, wherein the second shaft RPM is greater than the first shaft RPM, and wherein the outer diameter of the first body is substantially the same as the outer diameter of the second body, such that the speed at which the outer periphery of the second body rotates is greater than the speed at which the outer periphery of the first body rotates.

4. The differential speed stalk roll assembly of claim 1, wherein the outer diameter of the respective first and second bodies and the lateral spacing of the first and second shafts are such that the outer peripheries of the first and second bodies do not interfere during rotation.

5. The differential speed stalk roll assembly of claim 1, wherein the outer peripheries of the first and second bodies are fluted, and wherein the flutes are oriented and radially spaced around the respective outer peripheries of the first and second bodies, such that during rotation, the flutes of the of the first body do not interfere with the flutes of the second body.

6. The differential speed stalk roll assembly of claim 1, wherein the outer peripheries of the first and second bodies are fluted, and wherein the flutes are oriented and longitudinally spaced around the respective outer peripheries of the first and second bodies, such that during rotation, the flutes of the first body do not interfere with the flutes of the second body.

7. The differential speed stalk roll assembly of claim 1, wherein the first body includes at least one knife forming a knife plane substantially normal to the axis of rotation of the first shaft.

8. The differential speed stalk roll assembly of claim 7, wherein the second body includes at least one knife forming a knife plane substantially normal to the axis of rotation of the second shaft.

9. The differential speed stalk roll assembly of claim 1, wherein the first body comprises a plurality of first body segments and the second body comprises a plurality of second body segments.

10. The differential speed stalk roll assembly of claim 9, wherein the at least one knife is disposed between the first body segments of the first body or between the second body segments of the second body.

11. The differential speed stalk roll assembly of claim 1, wherein portions of the first body vary in diameter and portions of the second body vary in diameter.

12. The differential speed stalk roll assembly of claim 9, wherein some of the first body segments have outer diameters larger than other first body segments.

13. The differential speed stalk roll assembly of claim 9, wherein some of the second body segments have outer diameters larger than other second body segments.

14. The differential speed stalk roll assembly of claim 9, wherein the first body segments and second body segments are modular and interchangeable with modular replacement segments.

15. The differential speed stalk roll assembly of claim 14, wherein the modular replacement segments comprise a plurality of different configurations that are interchangeable to produce first and second bodies of variable configurations.

16. The differential speed stalk roll assembly of claim 15, wherein the variable configurations include different flute configurations.

17. The differential speed stalk roll assembly of claim 1, wherein the outer diameter of the second body is between about ten percent and about fifty percent greater than the outer diameter of the first body.

18. The differential speed stalk roll assembly of claim 9, wherein the first body segments and second body segments are cylindrical or frustoconical.

19. The differential speed stalk roll assembly of claim 9, wherein the first body segments and second body segments are plates.

20. A differential speed stalk roll assembly mountable to a row unit of a row crop head, comprising:
a first stalk roll body secured to a first stalk roll shaft of the row unit, the first stalk roll shaft rotatable about a first axis of rotation, the first stalk roll body comprising a plurality of first modular plate segments, the plurality of first modular plate segments defining a first stalk roll body diameter;
a second stalk roll body secured to a second stalk roll shaft of the row unit, the second stalk roll shaft rotatable about a second axis of rotation, the second stalk roll body comprising a plurality of second modular plate segments, the plurality of second modular plate segments defining a second stalk roll body diameter, the second stalk roll body diameter being greater than a laterally adjacent portion of the first stalk roll body diameter; and
at least one annular knife disposed on either said first stalk roll body or said second stalk roll body, the at least one annular knife defining a knife plane normal to the first and second axis of rotation.

21. The differential speed stalk roll assembly of claim 20, wherein the first body includes a first plurality of annular knives spaced longitudinally along a length of the first body, each of the first plurality of annular knives defining a knife plane substantially normal to the first axis of rotation.

22. The differential speed stalk roll assembly of claim 21, wherein the second body includes a second plurality of annular knives spaced longitudinally along a length of the second body, each of the second plurality of annular knives defining a knife plane substantially normal to the second axis of rotation.

23. The differential speed stalk roll assembly of claim 22, wherein the first plurality of knives and the second plurality of knives are longitudinally aligned along the first and second bodies to define a plurality of longitudinally spaced cutting planes.

24. The differential speed stalk roll assembly of claim 20, wherein the second stalk roll body diameter is between about ten percent and about fifty percent greater than the laterally adjacent portion of the first stalk roll body diameter.

* * * * *